(12) United States Patent
Mosley et al.

(10) Patent No.: US 9,311,619 B2
(45) Date of Patent: Apr. 12, 2016

(54) SYSTEMS AND METHODS FOR CONSUMER-GENERATED MEDIA REPUTATION MANAGEMENT

(75) Inventors: Clifford Mosley, Fall City, WA (US); Shawn Rutledge, Seattle, WA (US); Lyman Do, Bellevue, WA (US); Enrico Montano, Redmond, WA (US); Melody Jones, Seattle, WA (US); Jeffrey Vella, Bellevue, WA (US); Nathan Harkenrider, Shoreline, WA (US); Brian Farrell, Renton, WA (US); Nathanial Holcomb, Everett, WA (US); Joseph Kaiser, Bothell, WA (US); Matt Jacobsen, Bellevue, WA (US); Kim Hamilton, Seattle, WA (US)

(73) Assignee: VISIBLE TECHNOLOGIES LLC, Bellevue, WA (US)

( * ) Notice: Subject to any disclaimer, the term of this patent is extended or adjusted under 35 U.S.C. 154(b) by 0 days.

(21) Appl. No.: 13/230,825

(22) Filed: Sep. 12, 2011

(65) Prior Publication Data
US 2012/0179752 A1    Jul. 12, 2012

Related U.S. Application Data

(60) Provisional application No. 61/381,783, filed on Sep. 10, 2010.

(51) Int. Cl.
*G06Q 10/10* (2012.01)
(52) U.S. Cl.
CPC ..................................... *G06Q 10/10* (2013.01)
(58) Field of Classification Search
CPC .......... G06F 17/3012; G06F 17/30377; G06F 17/30424; G06F 17/30607; G06F 17/30696; G06F 17/30719; G06F 17/30867; G06F 17/30991; G06F 19/3493; G06F 17/30286; G06F 17/2217; G06F 17/2264; G06F 17/30017; G06Q 30/0631; G06Q 30/00; G06Q 10/10; G06Q 50/01; H04L 51/00; H04L 51/32; H04L 29/08756; G06T 2200/24; G06T 2207/10024; G06T 5/40
USPC ................. 709/202–204, 212, 217, 227, 231; 707/1–7, 100–102, 104.1
See application file for complete search history.

(56) References Cited

U.S. PATENT DOCUMENTS

| 5,918,222 | A  | * | 6/1999 | Fukui et al. | |
| 6,842,773 | B1 | * | 1/2005 | Ralston et al. | 709/206 |
| 7,162,471 | B1 | * | 1/2007 | Knight et al. | 707/750 |

(Continued)

OTHER PUBLICATIONS

Automated Ingestion of Audiovisual Content by D. Airola, L. Boch Dimino. RAI-Research and Technology Innovation Centre, Italy 2002.*

*Primary Examiner* — Sargon Nano
(74) *Attorney, Agent, or Firm* — P.G. Scott Born; Richard Thomas Black Foster Pepper PLLC

(57) ABSTRACT

A computing system configured to gather social media content includes a memory; a content collection and ingestion system, stored in the memory and configured, when executed on a computer processor, to communicate with one or more computing systems to direct a search of a content source using a received collection request and to ingest the results of the directed search into a data store; and a content management system, stored in the memory and configured, when executed on a computer processor, to display the ingested results on a display.

12 Claims, 51 Drawing Sheets

(56) References Cited

U.S. PATENT DOCUMENTS

| | | | |
|---|---|---|---|
| 7,523,085 B2* | 4/2009 | Nigam et al. | 706/55 |
| 7,593,887 B2* | 9/2009 | Duquette | 705/37 |
| 7,720,835 B2* | 5/2010 | Ward et al. | 707/710 |
| 8,126,882 B2* | 2/2012 | Lawyer | 707/723 |
| 8,150,760 B2* | 4/2012 | Duquette | 705/37 |
| 8,250,613 B2* | 8/2012 | Faulkner et al. | 725/86 |
| 8,447,823 B2* | 5/2013 | Zhang | 709/206 |
| 8,725,717 B2* | 5/2014 | Bernstein et al. | 707/708 |
| 8,838,613 B1* | 9/2014 | Thakur et al. | 707/748 |
| 8,943,071 B2* | 1/2015 | Bishop | G06F 17/30011 707/737 |
| 9,009,126 B2* | 4/2015 | Spivack et al. | 707/705 |
| 9,098,503 B1* | 8/2015 | Johnson | G06F 17/30017 |
| 2002/0038217 A1* | 3/2002 | Young | 705/1 |
| 2002/0062368 A1* | 5/2002 | Holtzman et al. | 709/224 |
| 2005/0125408 A1* | 6/2005 | Somaroo | G06F 17/30286 |
| 2007/0043583 A1* | 2/2007 | Davulcu et al. | 705/1 |
| 2007/0050834 A1* | 3/2007 | Royo et al. | 725/119 |
| 2007/0067297 A1* | 3/2007 | Kublickis | G06Q 30/02 |
| 2007/0168354 A1* | 7/2007 | Ramer | G06F 17/30749 |
| 2007/0208751 A1* | 9/2007 | Cowan | G06Q 30/02 |
| 2007/0294281 A1* | 12/2007 | Ward et al. | 707/102 |
| 2008/0154883 A1* | 6/2008 | Chowdhury et al. | 707/5 |
| 2008/0195664 A1* | 8/2008 | Maharajh et al. | 707/104.1 |
| 2008/0200154 A1* | 8/2008 | Maharajh et al. | 455/414.3 |
| 2008/0201159 A1* | 8/2008 | Gabrick et al. | 705/1 |
| 2008/0201225 A1* | 8/2008 | Maharajh et al. | 705/14 |
| 2008/0201386 A1* | 8/2008 | Maharajh et al. | 707/201 |
| 2008/0207137 A1* | 8/2008 | Maharajh et al. | 455/74 |
| 2008/0207182 A1* | 8/2008 | Maharajh et al. | 455/414.1 |
| 2008/0214148 A1* | 9/2008 | Ramer | G06F 17/30749 455/414.1 |
| 2008/0288286 A1* | 11/2008 | Noreen et al. | 705/2 |
| 2009/0319365 A1* | 12/2009 | Waggoner et al. | 705/14.41 |
| 2010/0205663 A1* | 8/2010 | Ward et al. | 726/7 |
| 2010/0275128 A1* | 10/2010 | Ward et al. | 715/744 |
| 2011/0191445 A1* | 8/2011 | Dazzi | 709/219 |
| 2011/0191446 A1* | 8/2011 | Dazzi et al. | 709/219 |
| 2011/0225417 A1* | 9/2011 | Maharajh et al. | 713/150 |
| 2012/0041918 A1* | 2/2012 | Yu | G06F 17/30864 706/50 |
| 2012/0203683 A1* | 8/2012 | Duquette | 705/37 |
| 2012/0208512 A1* | 8/2012 | Maharajh et al. | 455/414.1 |

* cited by examiner

Manual Scoring Overview

Early Automated Analysis Overview

Mid-Term Automated Analysis Overview

Mature Automated Analysis Overview

Response Overview

User Manager

User Info
- Username: nguadano  Stats
- Password: ********
- First Name: Norman
- Last Name: Guadagno
- Company: ZAAZ
- Title: Chief Marketing Officer
- Email: normang@zaaz.com
- Phone:
- Group Permissions
  - AccountUser     AccountViewer
  - ✓ AccountAdmin Account Access – select all
✓ ZAAZ Username: nguadano

+ New User
▽ Delete
+ Save/Update
Response Authorization Req.

Sorting — 1320

Rule Details

| | |
|---|---|
| Title | Sony VAIO |
| Description | Posts and comments that support Sony VAIO will be scored positive Posts and comments that do not support Sony VAIO will be scored negative. |

Users

Default Rule

Select Data

| | | |
|---|---|---|
| Topic | Is | No Topics Are Available |
| Site | Is | www.livejournal.com |
| Date | Before | 03/26/2007 |
| Engine | Is | No Engines Are Available |
| Author | Is | Frederick Allen |

Scoring Rules

+ new Rule

+ Save/Update

Response Manager

Content View | Thread View

Original Post: Arne Hess at 12/4/2007 3:32:00 AM

Mark:/Space's The Missing Sync for Windows Mobile today received an update to v3.0.2 which improves the usability by no longer requiring Windows Mobile devices to be placed in "flight mode" prior to connecting to the Mac. In addition to other fixes and improvements, the 3.0.2 release also adds support for the Orange M3100 and HP RX 19xx series devices. The Missing Sync for Windows Mobile lets you easily connect and synchronize Pocket PCs and Smartphones with your Apple Mac. Sync with Address Book, iCal, Microsoft Entourage, iPhoto, iTunes and more. The 3.0.2 release is a free update for all owners of The Missing Sync for Windows Mobile v3.0. New licenses cost US 39.95 for download and US$ 49.95 for CD. Owners of qualifying Missing Sync products can upgrade or crossgrade for half price. Please note that The Missing Sync 3.0.2 still not supports Windows Mobile 6. A Windows Mobile 6 compatible version wasn't announced yet.

Cheers ~ Arne [ Share with a

Respond

Personas: miles@ws.com

Your Response

Missing Sync is an amazing addition to the lineup of great 3rd party software for the Windows Mobile platform. Microsoft is working directly with Mark to assist his refactor for the release of a Windows Mobile 6 version. We look forward to his continued success!]

Scores

Site Title:
Site URL: http://theunwired.net/
Current Sorting Rule: No posts match any rule
Total Posts Available: 2135

Site Info

Author            Arne Hess – at Thursday.
Author Posts      15
Author Topics     14
Site
Site Posts        35
Site Topics       38

+ do not respond   + pass   + post & continue   + post & end

Home Depot Marketing ⌄

Searches  Edit                                    Sarah Thomas (Home Sign Out)  Help ▼ Brand—Home Depot
  Home Depot mentions

▷ PR Issue
▷ Market & Industry  Project Motivators
▷ Marketing Campaigns
▷ Authors—Advocates
▷ Authors—Critics
▷ Social Responsibility
  Products—Home Improvement

Customer Issues
Sarah follow-up
Share with customer care
Martha Stewart campaign New Search
New Folder

_3900_

| Dashboard | Search | Monitor | Analyze | Labs |

Focus                                              _3905_
View  Content  Sites  Authors
      List  Volume  Sentiment
Timeframe 7 Days                                _3915_
Add Filter ⌄                                       _3910_  Reset

Content Detail                                         Close

Why I love Home Depot
1 minute ago by Greg Huges on greghughes.net
                                                           Media Type  Blogs
                                                           Published Date  10/22/2010

○Positive | Tags ▼ Promote ▼  Email  Permalink  Export
         ┌─────────────────────┐
         │ ☐ Critical          │ eason why:
I love Hom│ ☐ Issue    _4600_   │
• Even thou│ ☐ Opportunity       │ got one from Home Depot. They have regular promotions (meaning almost all the
 time) that a│ ☐ Important         │ ny $300 purchase over $300 with no payments and no interest for 12 months.
• Internet-o│ ☐ Action Required   │ le, there  was a great special on a BBQ this weekend that I had to jump on.
         │ New Tag             │
         └─────────────────────┘            ← _4410_

• Free shipping specials. Right now if you place an order for more than $49, they ship it for free, as long as its not
 something super heavy or huge.

So, I have $55 on the tools, got free shipping, and no payments and no interest for 12 months. I'll pay it off next
month, but it's nice to know I have the option to spread it out if I want to.

Plus, they're everywhere and easy to find. They're also easy when it comes to returning items that don't fit or don't
work or that you don't like or whatever. I can go there and learn stuff in free.

SYSTEMS AND METHODS FOR CONSUMER-GENERATED MEDIA REPUTATION MANAGEMENT

PRIORITY CLAIM

This application claims priority to and the benefit of U.S. Provisional Application Ser. No. 61/381,783 filed Sep. 10, 2010, which is hereby incorporated by reference in its entirety as if fully set forth herein.

COPYRIGHT NOTICE

This disclosure is protected under United States and International Copyright Laws. ©2006-2011 Visible Technologies. All Rights Reserved. A portion of the disclosure of this patent document contains material that is subject to copyright protection. The copyright owner has no objection to the facsimile reproduction by anyone of the patent document or the patent disclosure after formal publication by the USPTO, as it appears in the Patent and Trademark Office patent file or records, but otherwise reserves all copyrights whatsoever.

BACKGROUND OF THE INVENTION

As used herein, the term "Consumer Generated Media" (hereinafter CGM) is a phrase that describes a wide variety of Internet web pages or sites, which are sometimes individually labeled as web logs or "blogs", mobile phone blogs or "moblogs", video hosting blogs or "vlogs" or "vblogs", forums, electronic discussion messages, Usenet, message boards, BBS emulating services, product review and discussion web sites, online retail sites that support customer comments, social networks, media repositories, audio and video sharing sites/networks and digital libraries. Private non-internet information systems can host CGM content as well, via environments like Sharepoint, Wiki, Jira, CRM systems, ERP systems, and advertising systems. Other acronyms that describe this space are CCC (consumer created content), WSM (weblogs and social media), WOMM (Word of Mouth Media) or OWOM, (online word of mouth), and many others.

As used herein, the term "Keyphrase" refers to a word, string of words, or groups of words with Boolean modifiers that are used as models for discovering CGM content that might be relevant to a given topic. Could also be an example image, audio file or video file that has characteristics that would be used for content discovery and matching.

As used herein, the term "Post" refers to a single piece of CGM content. This might be a literal weblog posting, a comment, a forum reply, a product review, or any other single element of CGM content.

As used herein, the term "Site" refers to an Internet site which contains CGM content.

As used herein, the term "Blog" refers to an Internet site which contains CGM content.

As used herein, the term "Content" refers to media that resides on CGM sites. CGM is often text, but includes audio files and streams (podcasts, mp3, streamcasts, Internet radio, etc.) video files and streams, animations (flash, java) and other forms of multimedia.

As used herein, the term "UI" refers to a User Interface, that users interact with computer software, perform work, and review results.

As used herein, the term "IM" refers to an Instant Messenger, which is a class of software applications that allow direct text based communication between known peers.

As used herein, the term "Thread" refers to an "original" post and all of the comments connected to it, present on a blog or forum. A discussion thread holds the information of content display order, so this message came first, followed by this, followed by this.

As used herein, the term "Permalink" refers to a URL, which persistently points to an individual CGM thread The Internet and other computer networks are communication systems. The sophistication of this communication has improved and the primary modes differentiated over time and technological progress. Each primary mode of online communication varies based on a combination of three basic values: privacy and persistence and control. Email as a communications medium is private (communications are initially exchanged only between named recipients), persistent (saved in inboxes or mail servers) but lacks control (once you send the message, you can't take it back, or edit it, or limit re-use of it). Instant messaging is private, typically not persistent (some newer clients are now allowing users to save history, so this mode is changing) and lacks control. Message boards are public (typically all members, and often all Internet users, can access your message) persistent, but lack control (they are typically moderated by a central owner of the board). Chat rooms are public (again, some are membership based) typically not persistent, and lack control.

|                    | privacy | persistence | author control |
|--------------------|---------|-------------|----------------|
| Chat Rooms/IRC     | no      | no          | no             |
| Instant Messaging  | yes     | no          | no             |
| Forums             | no      | yes         | no             |
| Email              | yes     | yes         | no             |
| Blogs              | no      | yes         | yes            |
| social networks    | yes/no  | yes         | yes            |
| Second Life        | yes     | yes         | yes+           |

Blogs and Social Networks are the predominant communications mediums that permit author control. By reducing the cost, technical sophistication, and experience required to create and administer a web site, blogs and other persistent online communication have given an unprecedented amount of editorial control to millions of online authors. This has created a unique new environment for creative expression, commentary, discourse, and criticism without the historical limits of editorial control, cost, technical expertise, or distribution/exposure.

There is significant value in the information contained within this public media. Because the opinions, topics of discussion, brands and celebrities mentioned and relationships evinced are typically totally unsolicited, the information presented, if well studied, represents an amazing new source of social insight, consumer feedback, opinion measurement, popularity analysis and messaging data. It also represents a fully exposed, granular network of peer and hierarchical relationships rich with authority and influence. The marketing, advertising, and PR value of this information is unprecedented.

This new medium represents a significant challenge for interested, parties to comprehensively understand and interact with. As of Q1 2007 estimates for the number of active, unique online CGM sites (forums, blogs, social networks, etc.) range from 50 to 71 million, with growth rates in the hundreds of thousands of new sites per day. Compared to the typical mediums that PR, Advertising and Marketing businesses and divisions interact with (<1000 TV channels, <1000 radio stations, <1000 major news publications, <10-20 major pundits on any given subject, etc.) this represents a nearly 10,000-fold increase in the number of potential targets for interaction.

Businesses and other motivated communicators have come to depend on software that perform Business Intelligence, Customer Relationship Management, and Enterprise Resource Planning tasks to facilitate accelerated, organized, prioritized, tracked and analyzed interaction with customers and other target groups (voters, consumers, pundits, opinion leaders, analysts, reporters, etc.). These systems have been extended to facilitate IM, E-mail, and telephone interactions. These media have been successfully integrated because of standards (jabber, pop3, smtp, pots, imp) that require that all participant applications conform to a set data format that allows interaction with this data in a predictable way.

Blogs and other CGM generate business value for their owners, both on private sites that use custom or open source software to manage their communications, and for massive public hosts. Because these sites can generate advertising revenue, there is a drive by author/owners to protect the content on these sites, so readers/subscribers/peers have to visit the site, and become exposed to revenue generating advertising, in order to participate in/observe the communication. Because of this financial disincentive, there is no unifying standard for blogs which contains complete data. RSS and Atom feeds allow structured communication of some portion of the communication on sites, but are often very incomplete representations of the data available on a given site. Sites also protect their content from being "stolen" by automated systems with an array of CAPTCHAs, ("Completely Automated Public Turing test to tell Computers and Humans Apart") email verification, mobile phone text message verification, password authentication, cookie tracking. Uniform Resource Locator (URL) obfuscation, timeouts and Internet Protocol (IP) address tracking.

The result is a massively diverse community that it would be very valuable to understand and interact with, which resists aggregation and unified interaction by way of significant technical diversity, resistance to complete information data standards, and tests that attempt to require one-to-one human interaction with content.

BRIEF DESCRIPTION OF THE DRAWINGS

The preferred and alternative embodiments of the present invention are described in detail below with reference to the following drawings.

FIGS. 11-13 show screen shots of a registration and response feature;

FIG. 16 shows an example screenshot of an account manager panel;

FIG. 17 shows an example screenshot of a user manager panel;

FIG. 20 shows an example screenshot of a sorting manager;

FIG. 21 shows an example screenshot of the sorting manager with the user tab activated;

FIG. 24 shows an example screenshot of a response manager;

FIG. 44 shows an exemplary screenshot of a graphical user interface according to an embodiment;

FIG. 45 illustrates an invoked, email message window according to an embodiment;

FIG. 46 shows an exemplary screenshot of a graphical user interface according to an embodiment;

DETAILED DESCRIPTION OF THE PREFERRED EMBODIMENT

Figure 1A:
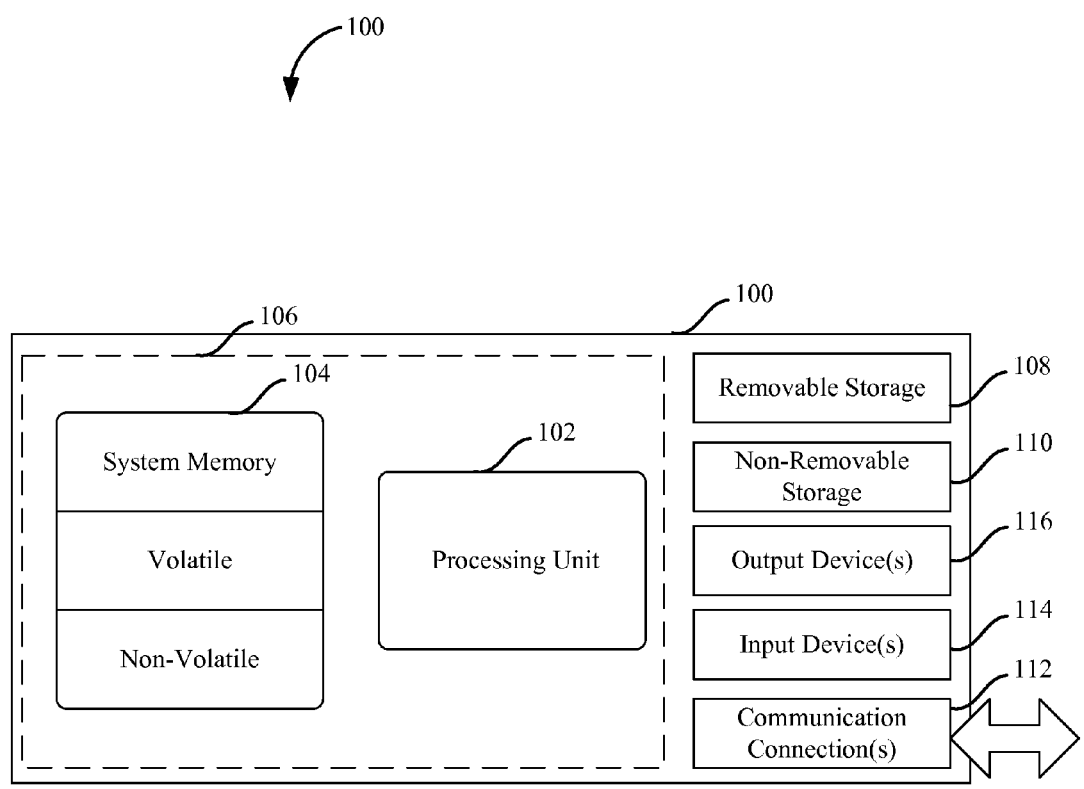
FIGS. 1A-1B shows an example system for consumer generated media reputation management; and, FIG. 2 shows a method for consumer generated media reputation management.

Embodiments described herein provide enhanced computer- and network-based methods, techniques, and systems for maintaining social intelligence of the social media space. Exemplary embodiments provide a Social Intelligence System ("SIS"), which enables users to search, monitor, export, compare, discover, engage, and or manage social media. In one embodiment the SIS includes a content collection and ingestion system, stored in the memory and configured, when executed on a computer processor, to communicate with one or more computing systems to direct a search of a content source using a received collection request and to ingest the results of the directed search into a data store; and a content management system, stored in the memory and configured, when executed on a computer processor, to display the ingested results on a display. One such example of such techniques is described in U.S. Pat. No. 7,720,835, filed May 7, 2007, and entitled "SYSTEMS AND METHODS FOR CONSUMER-GENERATED MEDIA REPUTATION MANAGEMENT," which is incorporated herein by reference in its entirety.

The following sections describe various architectural components, data flows, and other aspects of an example embodiment of a SIS, including various processes used to implement an example SIS. It further describes various alternative or additional techniques that may be employed by various embodiments of an SIS. Other system organizations and process flows could also be used to implement the capabilities of an SIS.

Embodiments include platform and services designed to enable Global 2000 customers, agencies and integration partners to more profitably engage their markets. Embodiments transform masses of unstructured social media data into actionable business insights that drive purchase behavior, improved customer service and brand loyalty.

In one embodiment, social data is collected from blogs, microblogs, social networks, social news sites, message boards & forums, social video sites. This includes the social must-have sites: Twitter, Facebook, YouTube and LinkedIn, Details include, but are not limited to, the following examples:

Twitter—Twitter data may be according to the specific search terms entered into the saved searches.
Facebook—Discussion areas of Facebook.
Blog—access and crawl well over 200 million English-language blogs and 13 million foreign language blogs.
Microblogs
Social Network—discussion and blog areas of Facebook, MySpace, LinkedIn, and other smaller sites.
Forums—nearly 200 k unique discussion boards and the millions of forums they contain.
Video/Photo—YouTube data may be collected directly via YouTube API.
News and MSM (mainstream media).
Bookmarking/Sharing.
Reviews/Shopping—Historical data—dating back to 2005 for blog and forum content.
Content in over 50 languages.
Full post collection—collection of the full thread, or search matched posts on a thread.
Social Video—using Google's video search engine with well over 20 sites covered including all YouTube content (truncated results, pinging like Pulse).
Global News feed—over 35,000 news sources, all languages, includes historical, providing essentially "all" public news content (Moreover/Effyis).
Facebook API Integration—connect to at least one, but preferably four, key Facebook Graph API's to collect wall posts/comments on all public pages.
Global Hotsites—custom collection with our proprietary crawler in priority languages to improve global coverage.

The capability exists for an embodiment to add additional RSS data sources that may be keyword matched.

Data may be collected in languages available for that media type. For example, Twitter is available in English, Japanese, French, Italian, German and Spanish, which is what an embodiment, in turn, is able to collect.

Threaded content is available and includes the original post and all the comments written against that post.

Hyperlinks (aka permalinks) to a video or picture are preferably presented with the post for easy one-click view to the source site.

An embodiment regularly searches the Internet 24×7×365 for keywords to match the saved searches created for each of your workspaces, and also does fall-site collection from popular areas of the social that are hotbeds of social conversation. An embodiment also builds customized templates for sites (aka "hot sites") that are of relevance to you, which may come at additional costs to implement.

An embodiment has the ability to collect from password-protected sites on a case-by-case basis provided (1) the client gives permission to access them with their user name and password (e.g., LinkedIn), and (2) a special template is constructed for that site and user to implement collection.

Data collection is an ongoing process that takes place 24×7×365. Most content is identified and collected within minutes or hours of appearing publicly on the internet. Once the data is in a system according to an embodiment, it is cleaned and enriched, as discussed in greater detail below, and is available to users anywhere from 30 minutes to 5 hours.

All content that an embodiment collects from different media sources goes through a common ingestion and QA process that includes: data normalization, de-duplication, SPAM filtering and auto-scoring.

Filtering options for any search include:
Advanced Boolean Logic, which may include:
Keyword and phrase include/exclude
No limit to size of exact phrases
"AND"/"OR"
Grouping
"NEAR" (user specified distance from keyword)
Wildcard searches (single and multiple wild character searches)
Fuzzy searches
Special characters
Domain
Post title
Author name
Media type
Author—Include/Exclude. Multiple values can be entered separated by commas.
Site—Include/Exclude. Multiple values can be entered separated by commas.
Time
Sentiment Data can be segmented by three principle subjects—author, site and content—and further by sentiment, volume, lists, trend, media type, geo and period. Data can be segmented further with keyword includes and excludes using filters.

In an embodiment, a word cloud identifies the most common word and terms occurring within filtered search results.

The cloud is interactive, and as a user clicks on a word or phrase, the search is (temporarily) revised to include that word or term and narrow the search results. This can be a very useful method to quickly determine growing topic trends within a brand or issue before they become viral and help keep the user's finger on the pulse of what people are talking about in specific time periods.

Influencers can be identified using a number of methods in the tool including the most active authors, authors on top websites.

Analytics provide the ability to identify trends, drill into the drivers behind shifts in the trends and tag appropriate insights to be handled as required by a user's social media team, product innovation team, brand managers and marketing specialists.

Auto-sentiment (aka automated sentiment) is the programmatic review and analysis of status updates, tweets and blog posts through Natural Language Processing and assignment of positive, negative, neutral or mixed sentiment.

An embodiment utilises proprietary algorithms, rich Natural Language Processing and machine learning to provide industry leading sentiment scoring for every piece of content collected. All data may be automatically scored for sentiment (some competitors only score a sample) for positive, negative, neutral (gray circle) and mixed (yellow face).

Searches may include the ability to search based on multi-word phrases (in quotations) and to use compound search operators and wildcards (proximity like "NEAR" may be included) to find the data you are looking for.

Geographical source of data may be identified at the country-level using IP identification (of the hosted domain/URL) and manual site validation for the highest volume sites.

Data may be collected from both localized and global websites. An embodiment collects some specific geographical data at the latitude and longitude level.

In an embodiment, custom tagging provides the ability to define a strategy that works best for a user. These tags can then be added to any post, providing a basis for workflow as tagged posts are filtered and surfaced for users according to the specific tag they are looking for. Any post can also be forwarded as an email from within the application to users that are outside the system, providing exposure to the specific data and enabling action.

Users may engage with Twitter directly through the tool and promote any post to Facebook as well.

Users may promote by clicking the drop down while on a post and then logging in to their selected site, or if logged in, an embodiment copies the body of the post for them with the appropriate @mention or RT notation to help a user save time.

For example, directly from a displayed post, a user may:
Retweet to Twitter
Reply to Twitter
Promote to Facebook
Promote to Drag
Promote to Delicious
Promote to MySpace Additionally, a user can select to email any post they are reviewing. The post body auto fills in their email tool and allows them to enter the "To" address.

In an embodiment, the Monitoring Tab is where a user may view saved searches and drill into the data sets, track changes over time and uncover potential insights and areas for deeper research. There is at least one but preferably at least 27 distinct views that allow a user to drill down from high-level metrics to granular post-level view details. A user can slice and dice data based on multiple pivots:

By Focus areas
Content—what people are talking about
Sites—the places where people are having conversations
Authors—who the people are that are having conversations
By View areas
List
Volume (further drillable with additional pivots like Trend, Geo, Period, Time, Media Type)
Sentiment (further drillable with additional pivots like Trend, Geo, Period, Time, Media Type)

Dashboards can provide the ability to select the Search and Monitor views that are most relevant to the user and combine those views and searches on a single screen view.

When selecting and clicking on a data point, the drill down may show the content (posts) that drove the specific data point value for the respective time frame. So a user may see all of the posts related, to that point, for the selected time period.

An embodiment includes an event detection feature called Intelligent Alerts, that may track volume and tone changes that are out of the "normal" range as defined. It is highly useful for scenarios like monitoring a potential crisis outbreak, forecasting trends and campaign outcomes, etc.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

FIG. 1A illustrates an example of a suitable computing system environment 100 on which an embodiment of the invention may be implemented. The computing system environment 100 is only one example of a suitable computing environment and is not intended to suggest any limitation as to the scope of use or functionality of embodiments of the invention. Neither should the computing environment 100 be interpreted as having any dependency or requirement relating to any one or combination of components illustrated in the exemplary operating environment 100.

Embodiments of the invention are operational with numerous other general-purpose or special-purpose computing-system environments or configurations. Examples of well-known computing systems, environments, and/or configurations that may be suitable for use with embodiments of the invention include, but are not limited to, personal computers, server computers, hand-held or laptop devices, multiprocessor systems, microprocessor-based systems, set-top boxes, programmable consumer electronics, network PCs, minicomputers, mainframe computers, distributed-computing environments that include any of the above systems or devices, and the like.

Embodiments of the invention may be described in the general context of computer-executable instructions, such as program modules, being executed by a computer. Generally, program modules include routines, programs, objects, components, data structures, etc. that perform particular tasks or implement particular abstract data types. Embodiments of the invention may also be practiced in distributed-computing environments where tasks are performed by remote processing devices that are linked through a communications network. In a distributed-computing environment, program modules may be located in both local- and remote-computer storage media including memory storage devices.

With reference to FIG. 1A, an exemplary system for implementing an embodiment of the invention includes a computing device, such as computing device 100. In its most basic configuration, computing device 100 typically includes at least one processing unit 102 and memory 104.

Depending on the exact configuration and type of computing device, memory 104 may be volatile (such as random-access memory (RAM)), non-volatile (such as read-only memory (ROM), flash memory, etc.) or some combination of the two. This most basic configuration is illustrated in FIG. 1A by dashed line 106.

Additionally, device 100 may have additional features/functionality. For example, device 100 may also include additional storage (removable and/or non-removable) including, but not limited to, magnetic or optical disks or tape. Such additional storage is illustrated in FIG. 1A by removable storage 108 and non-removable storage 110. Computer storage media includes volatile and nonvolatile, removable and non-removable media implemented in any method or technology for storage of information such as computer-readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communications connection(s) 112 that allow the device to communicate with other devices. Communications connection(s) 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF), infrared and other wireless media. The term computer-readable media as used herein includes both storage media and communication media.

Device 100 may also have input device(s) 114 such as keyboard, mouse, pen, voice-input device, touch-input device, etc. Output device(s) 116 such as a display, speakers, printer, etc. may also be included. All such devices are well-known in the art and need not be discussed at length here.

Figure 1B:
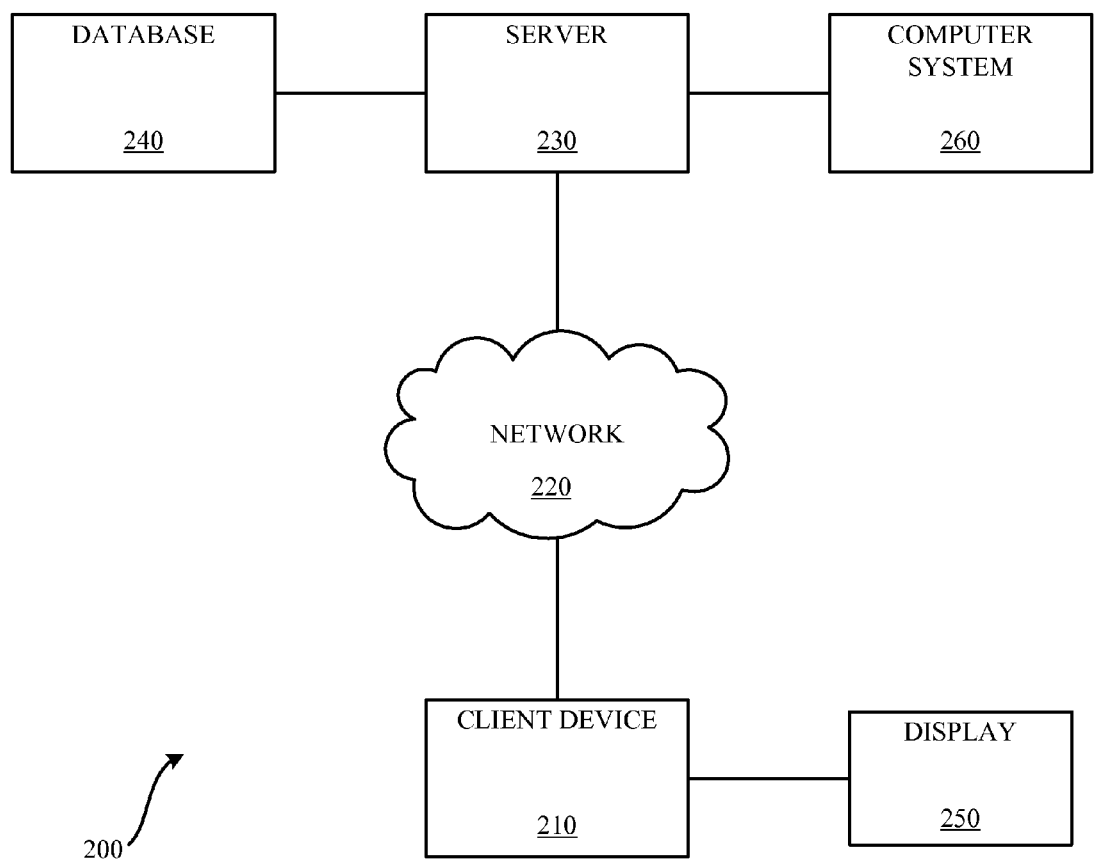

Referring now to FIG. 1B, an embodiment of the present invention can be described in the context of an exemplary computer network system 200 as illustrated. System 200 includes an electronic client device 210, such as a personal computer or workstation, that is linked via a communication medium, such as a network 220 (e.g., the Internet), to an electronic device or system, such as a server 230. The server 230 may further be coupled, or otherwise have access, to a database 240 and a computer system 260. Although the embodiment illustrated in FIG. 1B includes one server 230 coupled to one client device 210 via the network 220, it should be recognized that embodiments of the invention may be implemented using one or more such client devices coupled to one or more such servers.

In an embodiment, each of the client device 210 and server 230 may include all or fewer than all of the features associated with the device 100 illustrated in and discussed with reference to FIG. 1A. Client device 210 includes or is otherwise coupled to a computer screen or display 250. As is well known in the art, client device 210 can be used for various purposes including both network- and local-computing processes.

The client device 210 is linked via the network 220 to server 230 so that computer programs, such as, for example, a browser, running on the client device 210 can cooperate in two-way communication with server 230. Server 230 may be coupled to database 240 to retrieve information therefrom and to store information thereto. Database 240 may include a plurality of different tables (not shown) that can be used by server 230 to enable performance of various aspects of embodiments of the invention. Additionally, the server 230 may be coupled to the computer system 260 in a manner allowing the server to delegate certain processing functions to the computer system.

In one embodiment, the methods and systems are implemented by a coordinated software and hardware computer system. This system is comprised of a set of dedicated networked servers controlled by TruCast. The servers are installed with a combination of commercially available software, custom configurations, and custom software. A web server is one of those modules, which exposes a web based client de UI to customer web browsers. The UI interacts with the dedicated servers to deliver information to users. The cumulative logical function of these systems results in a system and method referred to as TruCast.

In alternate embodiments, the servers could be placed client side, could be shared or publicly owned, could be located together or separately. The servers could be the aggregation of non-dedicated compute resources from a Peer to Peer (P2P), grid, or other distributed network computing environments. The servers could run different commercial applications, different configurations with the same or similar cumulative logical function. The client to this system could be run directly from the server, could be a client side executable, could reside on a mobile phone or mobile media device, could be a plug-in to other Line of Business applications or management systems. This system could operate in a client-less mode where only Application Programming Interface (API) or eXtensible Markup Language (XML) or Web-Services or other formatted network connections are made directly to the server system. These outside consumers could be installed on the same servers as the custom application components. The custom server-side engine applications could be written in different languages, using different constructs, foundations, architectural methodologies, storage and processing behaviors while retaining the same or similar cumulative logical function. The UI could be built in different languages, using different constructs, foundations, architectural methodologies, storage and processing behaviors while retaining the same or similar cumulative logical function.

Figure 2:
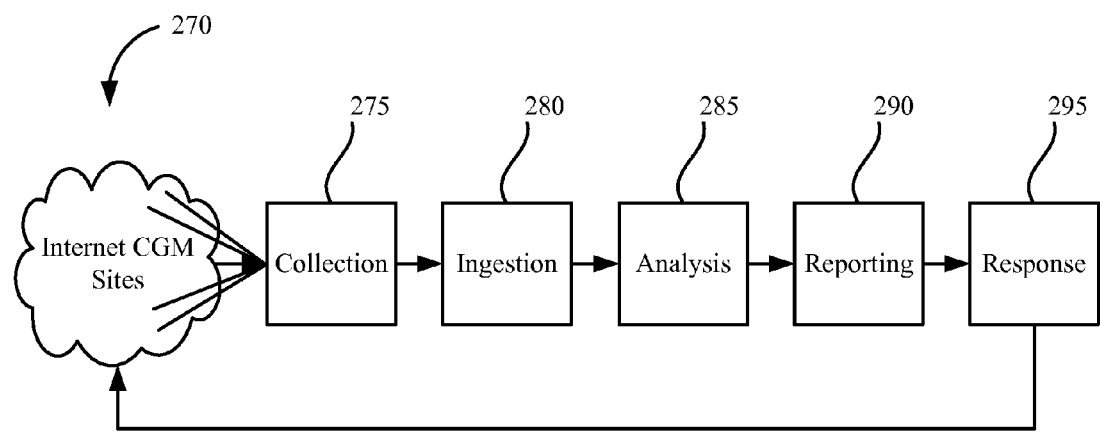

FIG. 2 shows a method for consumer generated media reputation management. The TruCast system can be broken down into elements, the elements are, but are not limited to the following: collection, ingestion, analysis, reporting and response.

Collection

In one embodiment, the Collection system gathers the majority of information about all CGM content online. This is a weighted, prioritized goal because TruCast functions in a weighted, prioritized way. This prioritization system is an optionally advantageous element of the collection system, called the Collection Manager. The Collection Manager receives input from internal and external sources about what sites have information of value, weights that information against a set of pre-described and manipulatable co-factors to allow tuning, and prioritizes the execution of collection against those sites.

In order to collect data from a blog site, an automated web scripting and parsing system called, a robot is built. An individual "robot" is a sophisticated, coordinated script which informs a software engine of how to navigate, parse, and return web information. Every web site is comprised of code in one of several popular languages, which software applications called web browsers "render" or convert to a visually appealing "web site". A robot, similar to a browser, interprets site code to render an output. The desired output is not the "web site" that a browser would create, but are XML document, with columns of information about the content stored on a given site. Because robots are accessing the code, and not the rendered page, they have access to markup structures in the code which identify where specific content of interest is stored the code. Robots use navigation based on Document Object Model (DOM) trees, regular expression pattern matching, conditional parsing, pre-coded transformations, mathematical and logical rules, tags, comments, formatting, and probability statistics to extract the specific content TruCast, in one embodiment, uses from raw web site code. Functions which perform this parsing are abstracted and codified in the robot engine, which is instructed on specific actions by a specific robot script. In pseudo-code, a robot designed to gather all of the blog content on a wordpress site would be scripted thusly: Load X URL, read code "<bodytext>" is found, return all text until "</bodytext>" is found. If it is found create row 1, store this text in column A row 1. Find link with the word "next" in it, follow this link. Read code until "<bodytext>" is found, return all text until "</bodytext>" is found. If it is found create row 2, store this text in column A row 2.

This is a clearly incomplete example, as a plurality of robots have the ability to gather and transform a very complete set of knowable information from every website we visit, including the full body text, author's name, date of the post, permalink to the post, title of the post, it's position on the page, how many comments it has, the full information about those comments, including author, date, order, body, any hyperlinks, graphics, scripts, emoticons, or other multimedia files included in a post, comment or site. Robots can be designed to gather data from only an individual site, or made more general to accommodate variation amongst similar sites. Robots parse the gamut non-structured web site code into XML encoded text that meets a predefined data specification of the design. The system, in one embodiment, collects all posts, all comments, and all desired content from every page that a robot visits.

Robots are not limited to these methods for content parsing, hierarchical temporal memory analysis, probability-based, positive heuristics, and structural inference technologies can be used to make robots are capable of collecting information from a wider variety of sites.

Some sites have full-data RSS or Atom feeds (different than the typically truncated feeds), for which a specific set of robots exist. We also have data vendors who deliver full-data feeds in several formats, these feeds are converted to the XML data spec by another class of robots. Robots are not limited to web content collection, but represent a scriptable system for parsing and transforming incoming and outgoing data based on pre-defined rules.

Figure 3:
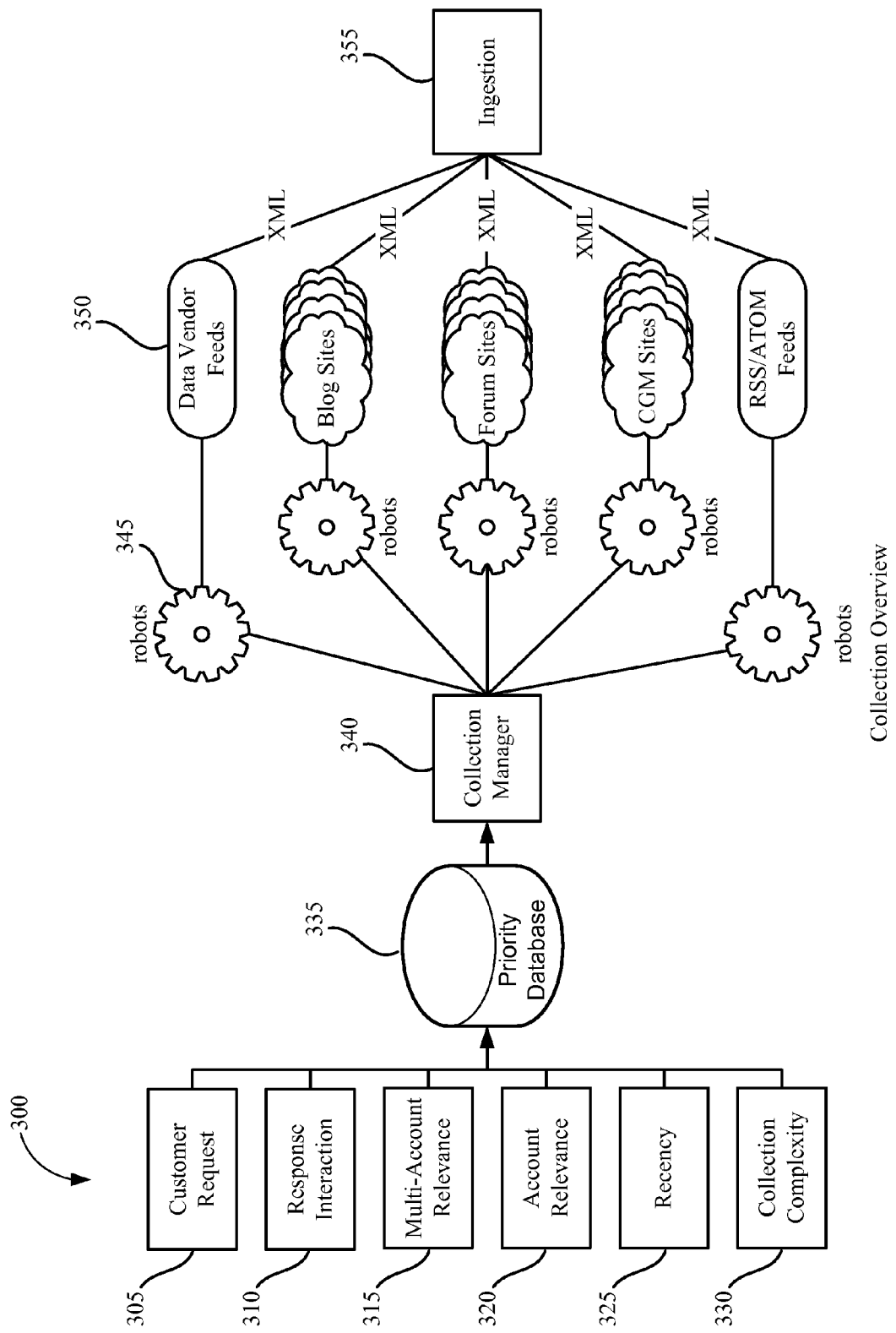
FIG. 3 shows a incoming data from collection being delivered to an ingestion system in one embodiment.

FIG. 3 depicts one embodiment of a CGM data collection system. In one embodiment, the first step of this system is to prioritize possible targets for collection. Inputs to this prioritization include, but are not limited to, sites specifically requested by customers (305) and the number of responses the system is written to a given site (310), the number of accounts that find content from this site relevant (315), the total count of relevant content available on the site (320), the date of the most recent post written on the site (325) and the historical performance of the system at gathering content from this site (330). The priority database maintains an updated list of co-factors which are calculated priorities for each site based on these inputs. When the Collection manager (340) determines that it has excess bandwidth/resources to execute more robots, it polls the priority database (335) to determine which robots (345) and then executes them. The collection manager also stores the records of robot activity so that it can add this information to the priority database (335). Robots, once launched by the Collection Manager, interface with their targets (350) to return XML-formatted CGM content to the Ingestion system (355).

Figure 4:
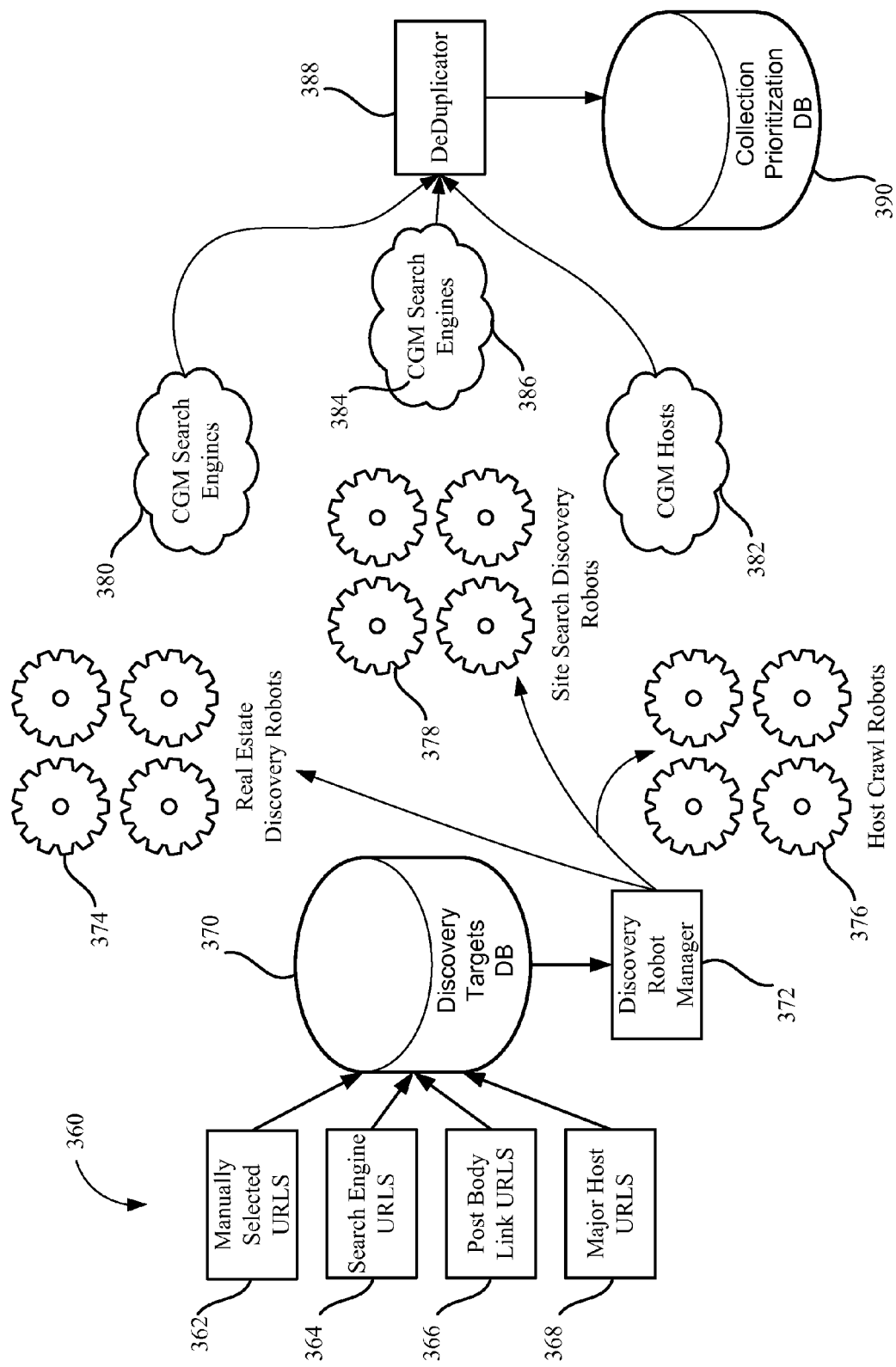
FIG. 4 is a depiction of one embodiment of a CGM site discovery system.

FIG. 4 is a depiction of one embodiment of a CGM site discovery system. Site discovery is the process of finding the URLS of new blog sites on the Internet. The coordination is performed by the Discovery Robot Manager (372). This system retains performance information of the three methods, and determines what percentage of available resources (cpu time, bandwidth) to spend running each of the three methods in order to discover the most new URLs possible. The Discovery Robot Manager receives input from the Discovery Targets DB (370) which stores all of the information required to execute each of the three methods, most notably the URL targets for each method. This system is fed information from customer or internal research discovered URLs (362) URLs of known search engines (364) URLs found in the post bodies of CGM content (366) and the URLs of the directory pages for each of the major blog hosts (368). Each method uses this information and a script for web interaction, called a robot, to discover new CGM URLs. The first method is called the "Real Estate" method. When the Discovery Robot Manager (372) determines that it is efficient to do so, it will launch a Real Estate robot for a specific search engine (374), and supply it with a list of keywords from all account topics which is held in the Discovery Targets DB(370). This robot will visit the search engine and fill in the search form with each keyword, and gather, by way of regular expression pattern extraction, the URLs of the results from the first 4 pages of results. This information will be delivered in XML format to the de-duplicator (388), which will eliminate known URLs, and then be stored in the Collection Prioritization DB (390) for collection. The second method, Site Search, is very similar to the Real Estate method, uses the same robots, but behaves in a different way with different input. The Real Estate robots use keywords from the topics in the accounts. The Site Search method has a pre-determined list of keyphrases designed to be representative of the full gamut of discussion on the web. The Discovery Robot Manager (372) collects this information from the Discovery Targets DB (370) and executes a Site Search robot, which searches the input keyphrases to retrieve the first 20 pages of results. Because of the much larger number of searches, these robots are designed to heavily obfuscate and avoid patterned interaction with Search Engine servers. The URLs discovered by Site Search robots are delivered to the de-duplicator (388), and from there to the Collection Prioritization DB(390). Site Search robots can also alternately be sent input URLs that are blog sites instead of search engines. Within this context they will visit every hyperlink on the site, searching for new links to previously-unknown sites. This be delivered as new URL output similar to the other methods. The third method, called Host Crawl, uses different robots to visit the directory listing pages on major CGM hosting engines. These directory pages' URLs are stored in the Discovery Targets DB(370). The Discovery Robot Manager (372) launches a Host Crawl Robot (376) which visits a CGM Host directory page (382) and visits all of the hyperlinks on that page retrieving all of the URLs that are available. This information is sent to the de-duplicator (388) and on to the Collection Prioritization DB (390).

Ingestion

Figure 5:
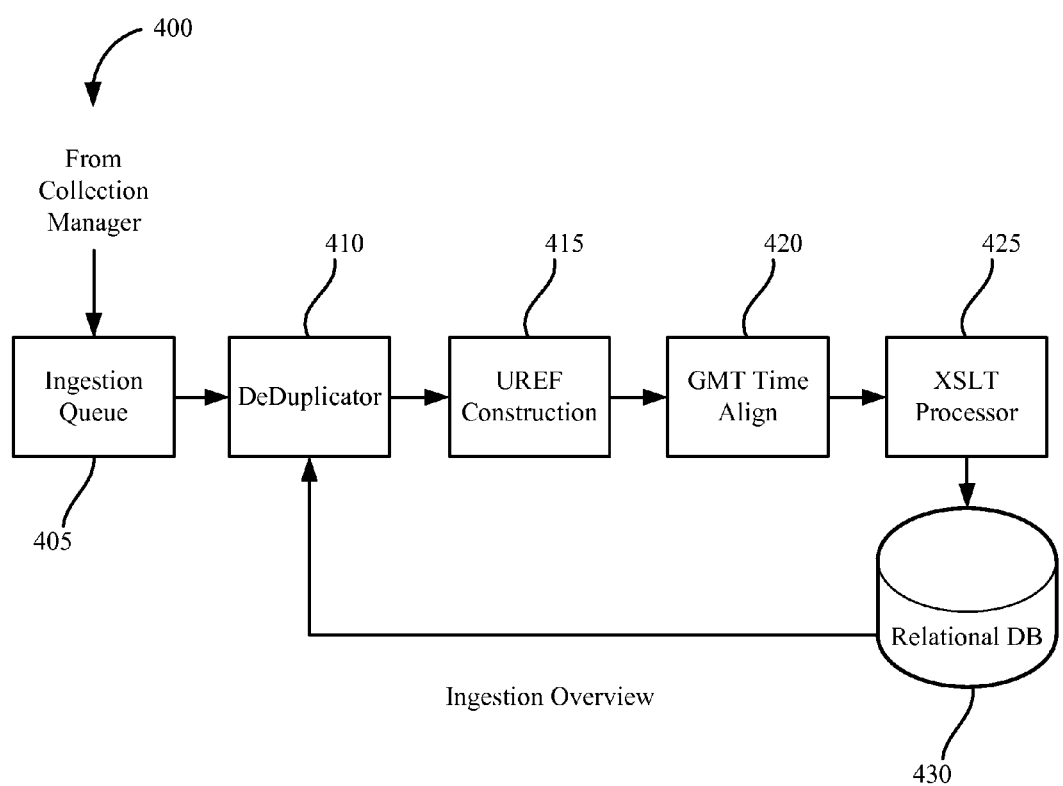
FIG. 5 provides an overview of ingestion in one embodiment.

FIG. 5 depicts one embodiment of a data ingestion system. This system receives input from the XML data outputs of robots launched and administered by the Collection Manager (800). These XML data sources are queued in an Ingestion Queue (805). This queuing process is a buffering function because all of the remaining steps are a stream processing method which requires a steady stream of content to work at maximum efficiency. Due to the dynamic nature of the volume of XML data input, the Ingestion queue holds a backlog of incoming data and outputs it at a steady rate, currently 500 docs/second. This flow of data is delivered first to a system which compares incoming CGM content information to all previously collected content, based on posted date, permalink URL, and post body to ensure that the data does not already exist in the system. This is the de-duplicator (810). Once this system has culled duplicate documents, it hands those documents to a UREF constructor (815) which creates a new uniqueID number to easily index and track unique content within the system in one embodiment of the invention. Next, content is delivered to a GMT time aligner, which converts all date and time stamps to be relative to Greenwich Mean Time (820). Next, this XML format information is transformed using XSLT (825) or eXtensible Style. Language Transformation processor, which reformats the data for rapid delivery into the indexing system and relational DB systems (830). In one embodiment, TruCast performs several cleaning and refining steps upon incoming CGM content enclosed in the XML format. The system eliminates duplicate content using a fuzzy logic comparison between existing stored content and incoming new content based on post body, permalink, and date information. This comparison is tunable and weighted, where positive matches are clear indicators of duplication, but agreement is required across multiple values to confirm duplication. For example, if two posts came from exactly the same date and time to the second, it's unlikely, but possible, that they are truly different unique posts. If, however, the body text is 90% the same, and the URL is 90% the same, it's extremely unlikely that the two posts are unique. On body text, this comparison includes text clustering analysis, to use word counts as a computationally inexpensive way to further evaluate uniqueness. Content that is malformed or incomplete according to the data spec is removed and warnings sent to the responsible collection manager element. Once a document is determined to be unique a UREF (unique reference) value is created and appended to it so that there is a relevant single value to index this information within the system. All incoming post dates are aligned to GMT. In one embodiment, TruCast delivers all prepared content into an indexing system which formats the data in such a way that it can be rapidly searched based on relationships to other data, keyword presence, account relevance, and date. This structure includes storage of data within a distributed indexed data repository as well as several SQL databases. Each SQL database is optimized for a different consuming system: the UI, the visualization systems, the reporting and statistics systems, the collection priority database, and the target discovery database, as well as the individual account level data stores.

Analysis

In one embodiment. TruCast is designed to determine, with a high degree of confidence, the conceptual relevance of a given piece of CGM content to a "topic" or concept space. Topics can be of any breadth ("War" is just as sufficient a topic as "2002 Chevy Silverado Extended Cab Door Hinge Bolt Rust"). Topics are abstract identifiers of relevance information about a given piece of CGM content. Each topic can also be understood as a list of "keyphrases" or keywords with Boolean modifiers. Each topic can contain an unlimited number of keyphrases that work as the first tier of pattern matching to identify content that is relevant to an individual account. Each post discovered by the system, and, in one embodiment, could be relevant to one topic, many topics, many topics across many accounts, or no topics at all.

Figure 6:
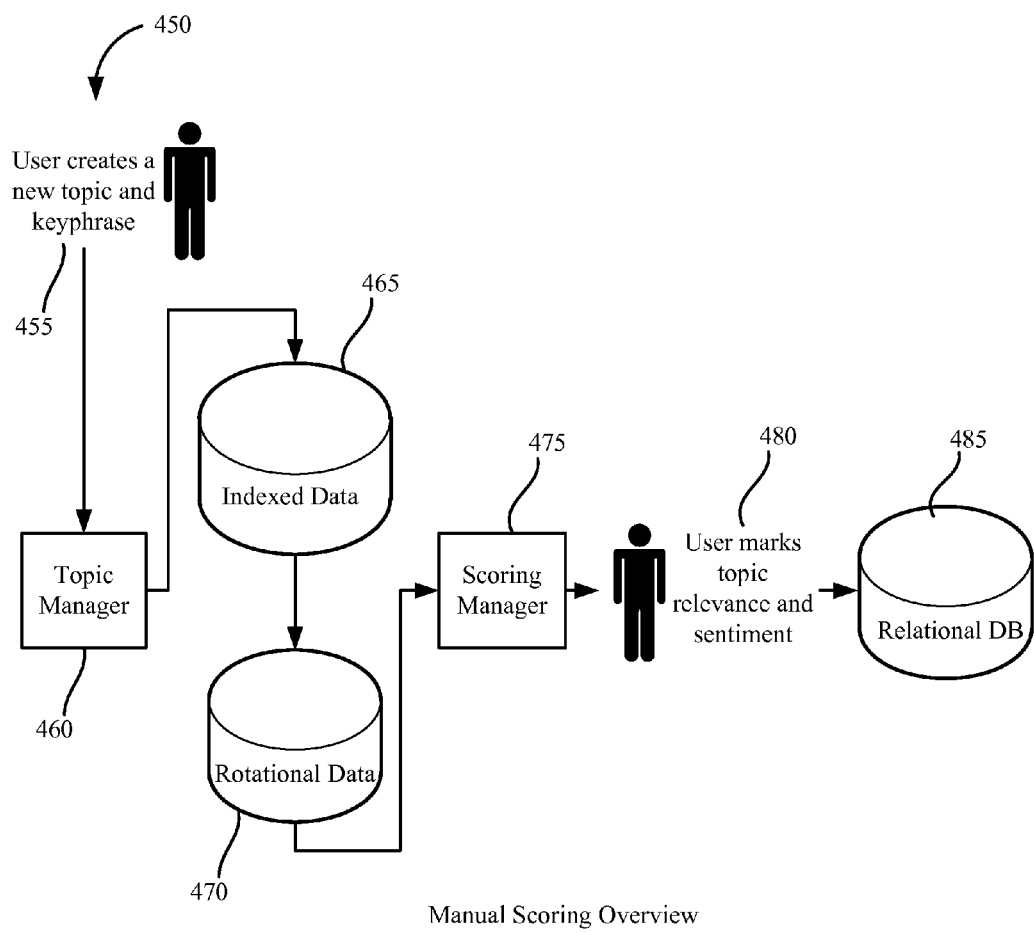
FIG. 6 shows manual scoring in one embodiment.
Figure 38:
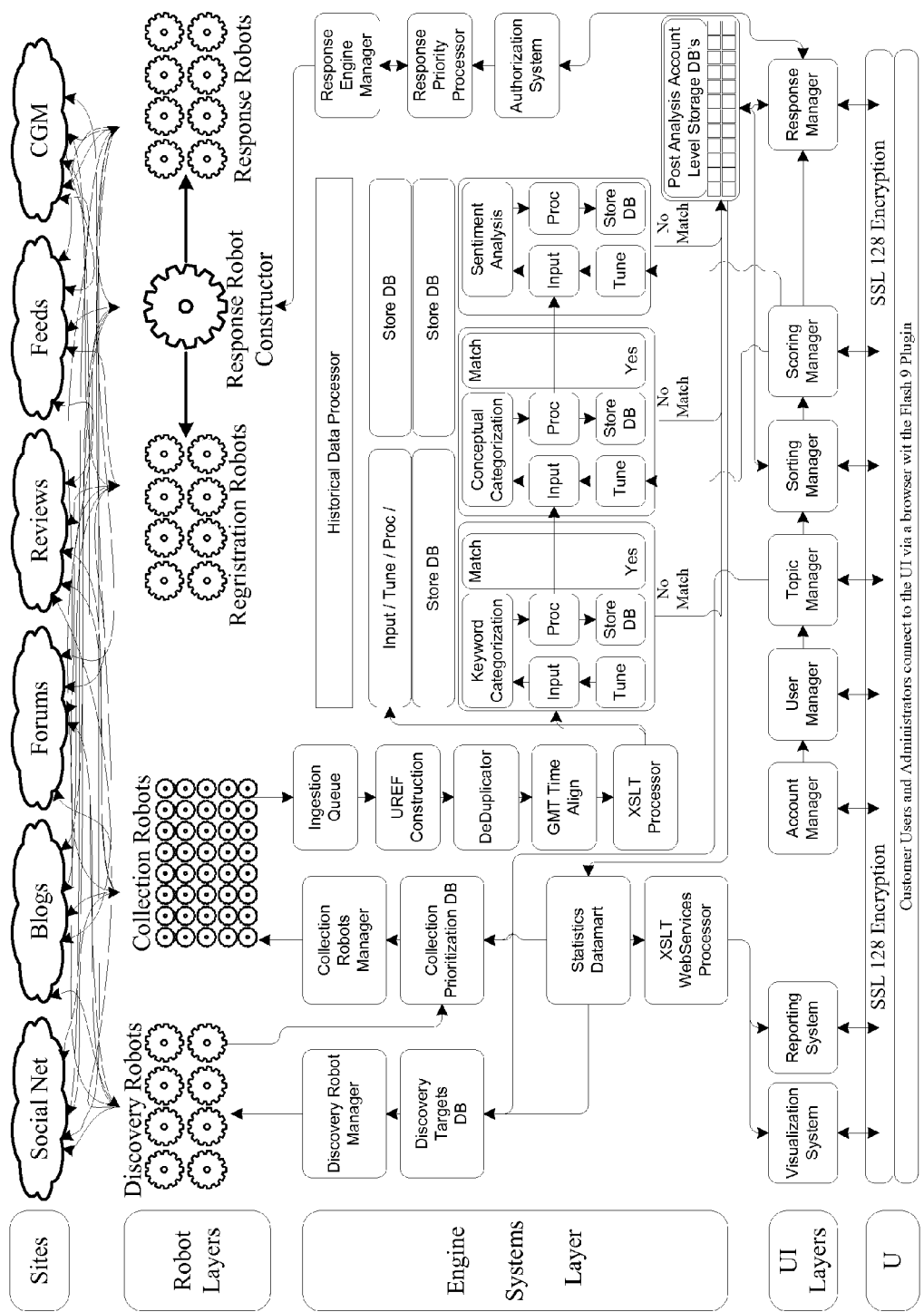
FIG. 38 shows a system overview in detail.

FIG. 6 depicts one embodiment of a system for manually appending topic relevance and topical sentiment to blog posts. This process begins by discovery of potentially relevant content by way of keyphrases. Keyphrases are grouped into topics. Topics and keyphrases are created by users (405) in the Topic Manager panel (410) within the UI. Once a new topic and keyphrase is created, this information is transmitted to the indexing system (415) which begins to examine all incoming data for matches against this keyphrase. The information is also handed to the relational database system (420) which is also the StoreDB component of the Historical Data Processor as illustrated in FIG. 38. This system examines all data that has already been processed to see if it matches this new keyphrase. This separation accelerates both processes because of optimized structure in (415) for stream processing and optimized structure in (420) for narrow, deep searches against a significantly larger dataset. Information from both of these systems are passed in queue form to the Scoring Manager (425) which provides a UI for users to annotate topic relevance and topic sentiment information which is stored in the relational DB (435). In one embodiment, TruCast contains a user interface that allows users to create topics, create keyphrases that are used to search for potentially relevant posts for that topic, place potentially relevant content into a queue for review, review the text and context of individual content, mark that content as relevant to none, one, or many topics, (thereby capturing human judgment of relevance), and store that information in the relational database. This system is called the Scoring Manager.

This method, where a post is matched by keyphrase, scored by humans, and delivered to the outputs of TruCast, in one embodiment (visualizations, reports, and response), is the most basic "manual" behavior of the system.

The behavior of this tiered system of relevance discovery and analysis changes over time to reflect the maturation of the more sophisticated elements of the system as their contextual requirements are much higher. A keyphrase match is absolute; if a post contains an appropriate keyphrase, there is no question as to if a match exists. The Conceptual Categorization system is built to apply a series of exempla based prediction algorithms to determine the conceptual relevance of a given post independent of exact keyphrase match. This makes the system, in one embodiment, more robust and provides more human-relevant information. In an exemplary embodiment a blog post body includes the following text: "I really enjoy looking out my windows to see the vista out in front of my house. Buena! It is so great! I wish my computer was so nice, it is a little broken edgy eft sadly." (EX.1)

A topic for the Microsoft Corporation, looking for the words "windows vista computer" in order to find online discussion about their new operating system would find this post by keyphrase match, despite the fact that the user discusses using "edgy eft" which is a code name for Ubuntu 6.08, a competitor's operating system. A topic for Milgard Windows and Doors Corporation that is looking for discussion about windows in need of repair would find this same post looking for the keyphrase "broken house windows" despite the fact that clearly the writer is enjoying looking out of his unbroken windows. The Disney Corporation, looking for discussion about their film company "Buena Vista" would find this post, which has nothing to do with them at all. A biologist researcher looking for references to immature red newts would search for "Eft" only to be sadly disappointed in another result about Ubuntu's software. In all of these cases keyphrase matches have proven insufficient to successfully match relevant content to interested parties. Boolean modifiers help (vista NOT Buena) but consistently fall far short of expectations, and require non-intuitive and time consuming research and expertise.

Automated Conceptual Categorization

Figure 7:
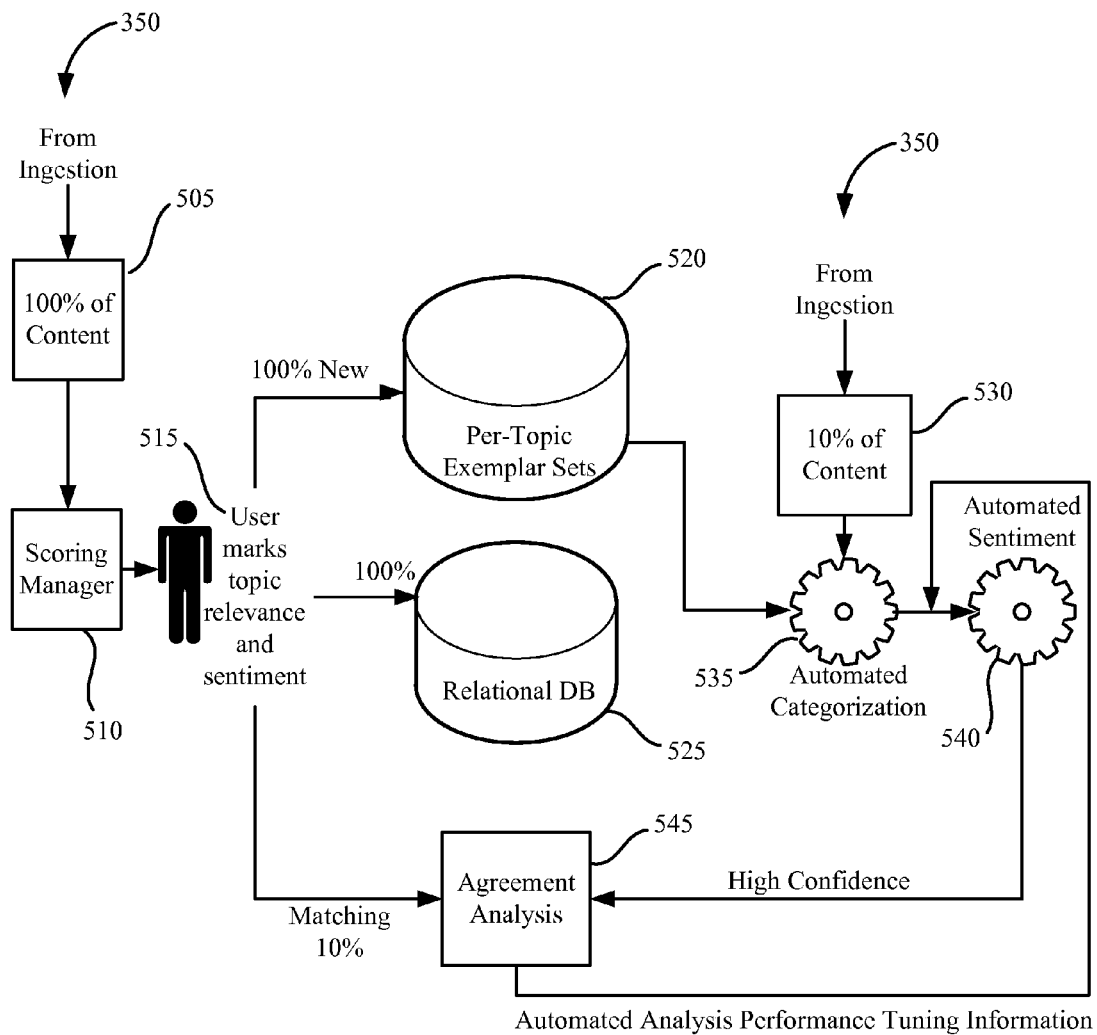
FIGS. 7-9 show the smooth transition between user scoring and automated scoring, in one embodiment.
Figure 8:
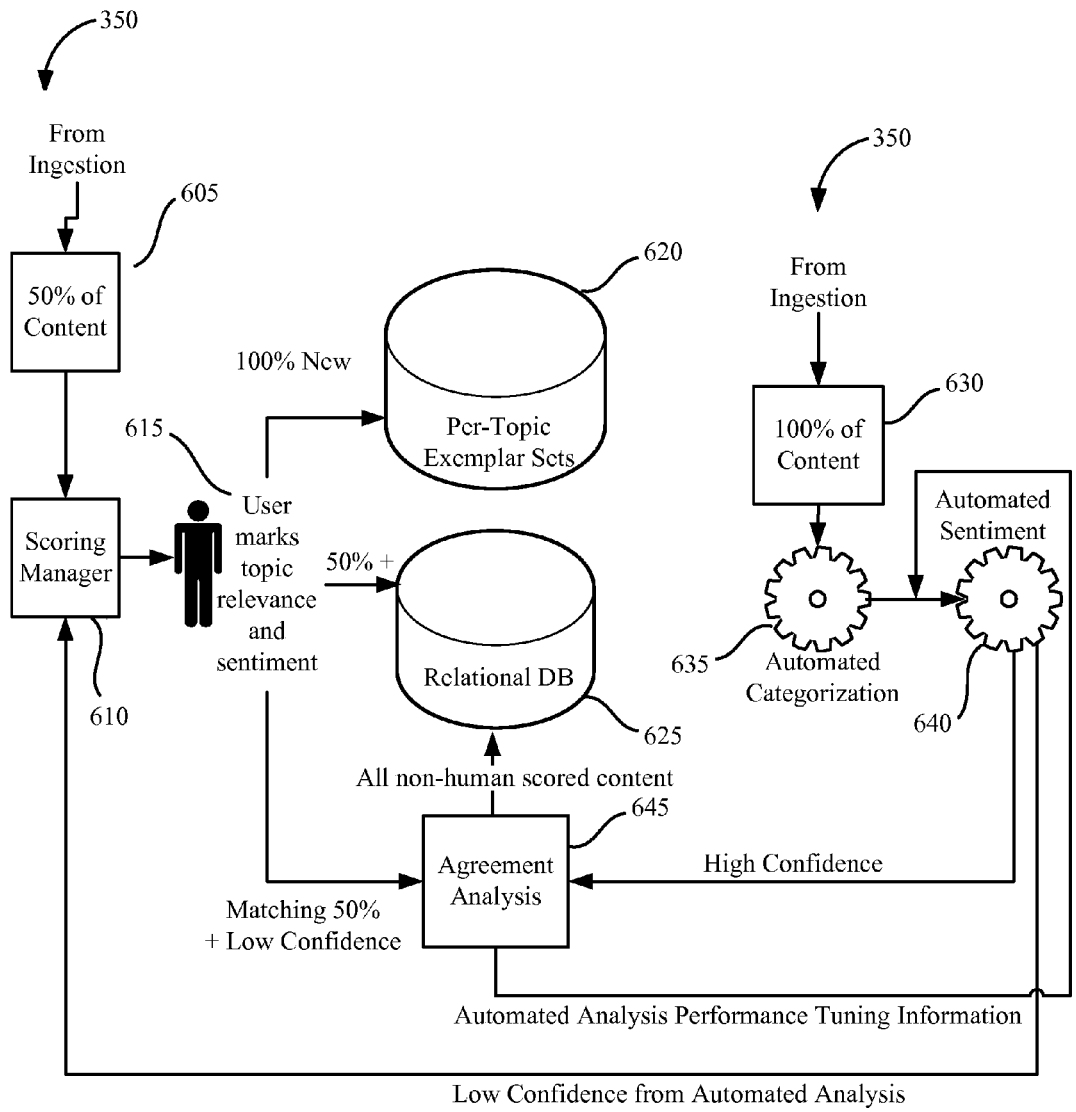
Figure 9:
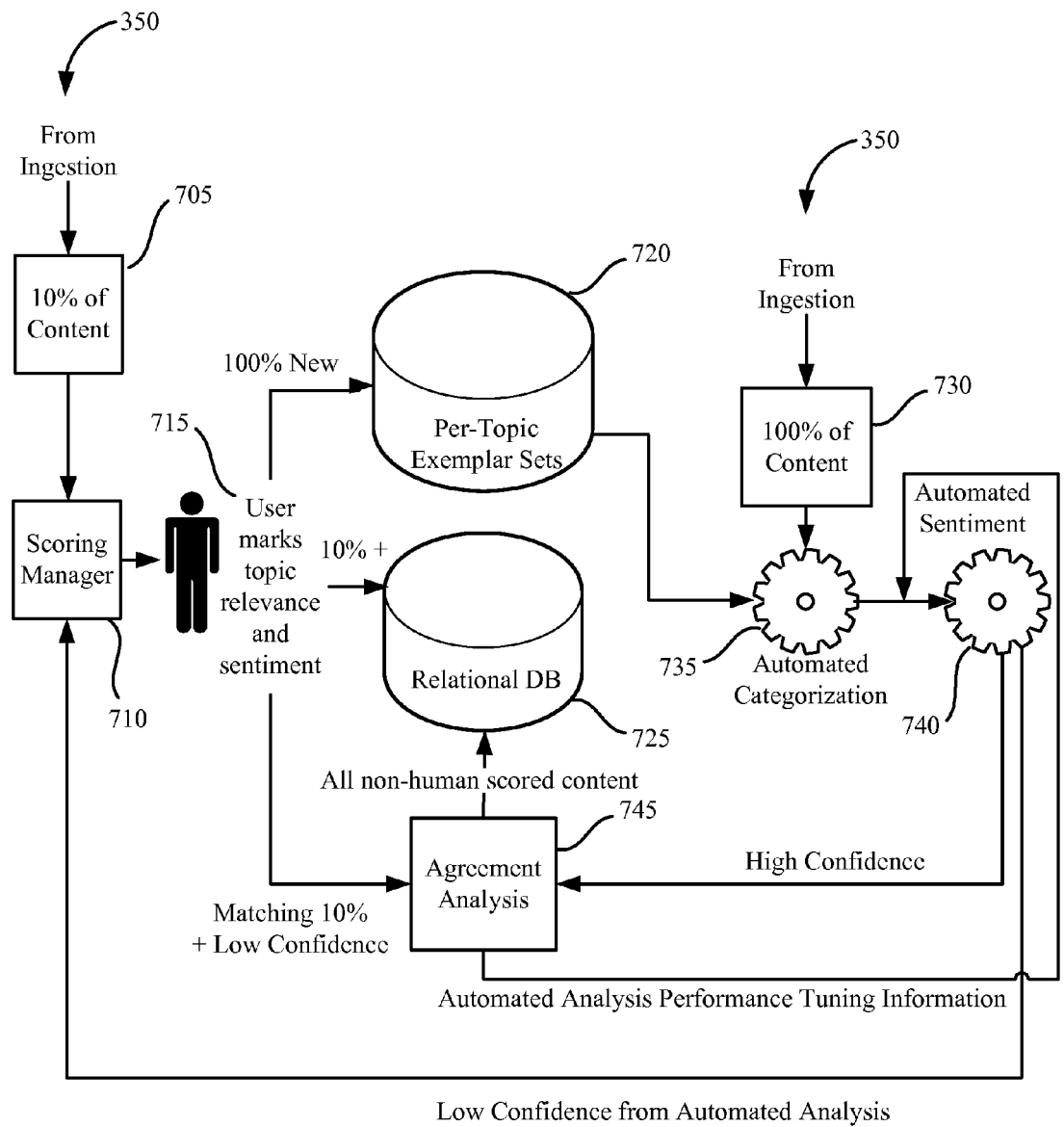

FIGS. 7-9 show the smooth transition between user scoring and automated scoring and depict the progression of the operation of one embodiment for an automated categorization and sentiment analysis system. This progression occurs from the early state, where the automated system performs poorly due to a lack of contextual examples, to a mature state where the automated system performs excellently as a result of robust contextual examples. The system, in one embodiment, reacts to this improvement by reducing the rate of post queue delivery to users and increasing the acceptance of analyzed posts from the automated system as confidence ratings and exemplar set sizes increase. This process accepts input from the ingestion system (350) into two separate queues. The first queue delivers content to the scoring manager (610) where it is scored by humans (615) and then delivered to the per-topic exemplar sets (620) based on topic relevance, the relational database (625) for storage and use in the response, visualization and report sections, and to an agreement analysis system (645). A second queue delivers content to the automated categorization system which accepts input from the per-topic exemplar sets, as well as topic performance and tuning information from the agreement analysis system (645). This system passes conceptually relevant content to the sentiment analysis systems which also has access to the exemplar and agreement analysis tuning data. The automated systems append a "confidence" score to their evaluations, which are used as a threshold to decide trust in the evaluation's accuracy. In the early behavior of the system, due to the lack of examples and agreement analysis tuning data, often this confidence score is very low. As more manual scoring is completed, and agreement analysis improves, the percentage of data flowing into the automated systems increases, and once performance is proven on the full data stream, the flow of data to the manual scoring application begins to decrease. Continual tracking of the agreement analysis system tracks for the varying level of inaccuracy that the automated systems can create as a result of changes within topical vernacular, user vocabulary, or new common phrases, inflections, or other changes in the typical word patterns present in incoming CGM content a elected by the dynamic adjustment of the percentages of data flowing into these two systems. Over time, given sufficient, accurate scoring by humans, the automated systems should be capable of accurate analysis on 100% of incoming documents, which would reduce the role of required human interaction to only providing audit and contemporary vernacular updates by way of minimal scoring. In one embodiment, TruCast, contains a Conceptual Categorization system which has functionality to evaluate posts for relevance by way of statistical analysis on examples provided by humans using the scoring system. Because humans are reviewing the content, from a specific customer's perspective, that content is reliably scored in context. If the above example post (EX.1) was scored by a human scorer for Microsoft, it would be found irrelevant to the Windows Vista operating system. By statistical analysis of hundreds of posts marked relevant or irrelevant to individual topics, the system can utilize not just keywords, but the entire body of the post to determine relevance. This statistics calculation leverages text clustering assisted by stop words exclusion, noun and pronoun weighting, punctuation observation, and stemming near-word evaluations. For non-text categorization analysis, TruCast, in one embodiment can leverage Optical Character Recognition (OCR) image to text conversion, Fast-Fourier Transform (FFT) and Granular Synthesis (GS) analysis based speech-to-text conversion, as well as Hierarchical Temporal Memory (HTM) processing. This comparison, and the resultant threshold filtered probability that a given post is relevant to a given topic allows TruCast, in one embodiment, to assign this meta-information. This method is vastly more accurate to human analysis than keyphrase matching. It also has the optionally advantageous feature of being continually tuned by ongoing scoring within the UI, which provides fresh exemplar data over time.

Automated Sentiment Analysis

When users score content for relevance in the scoring manager, they also may assert the sentiment of the content for each topic that it is relevant, from the perspective of their account. Users will mark, from their perspective (as informed by a set of scoring rules described by user administrators) the sentiment reflected about each topic. This information will be stored for later use in a relational database.

These human markup actions serve two purposes. First is to capture this data for direct use within a response system, and a series of data visualizations that leverage topic and sentiment information to elucidate non-obvious information about the content TruCast collects, in one embodiment. This is the "manual" path for data to flow thru the system, in one embodiment. The second use for these posts is that they serve as example data for an exemplar driven automated sentiment analysis system that mirrors the conceptual categorization system.

Similar to the process of categorization, the system, in one embodiment, leverages an exemplar set of documents to perform an automated algorithmic comparison in order to determine the sentiment, per topic, contained within an individual post. This requires a larger number of examples than categorization analysis, (~100 per sentiment value per topic) due to the four different stored sentiment values, "good", "bad", "neutral" and "good/bad". Due to the significant complexity of sentiment language within human language, additional processing is performed upon each document to improve the accuracy of the analysis. A lexicon of sentimental terms is stored within the system, and their presence has a weighted impact on the analysis. Negation terms and phrase structures also alter the values associated with sentimental terms. A stop words list eliminates connective terms, object nouns, and other non-sentimental terms within the text, reducing the noise the comparison has to filter thru. Sentence detection uses linguistic analysis to subdivide posts into smaller sections for individual analysis. A series of algorithms are compared for accuracy and performance on a per topic basis, to allow the performance of the analysis system to be tuned to each topic.

Automated Analysis Management

Both of these processes work upon the post-ingestion content, directing automatically analyzed documents into the remainder of the system workflow. This process reacts to the number of exemplar documents that are available. If incoming content is keyphrase-relevant to a specific topic, a determination is made if sufficient exemplar documents have been gathered by the system from users. If enough exemplary documents are not available, that post is delivered to the scoring queue which feeds content to the scoring manager interface. If some documents are present as exemplars, the system will attempt automated categorization and sentiment analysis, but still deliver posts to the scoring manager. This creates a pair of analysis results, one from the computer and one from the user. These are compared, and when a sufficient alignment (agreement frequency) is reached, the system starts delivering auto-analyzed content directly to the reporting and response systems, saving human effort.

This is a sliding ratio from 100% being delivered to the UI and 0% being auto-analyzed to only 1-10% being delivered to the UI and 100% being auto-analyzed. Once the ratio of content being reviewed by human scorers reaches 10%, and accurate performance of the automated analysis is maintained, mature operation of the automated systems has been achieved. This is the most efficient operation of the system, in one embodiment.

The system utilizes an aging and auditing system to ensure that the oldest human scored posts are ejected from the exemplar set and replaced by new human scored posts over time. The system also performs internal cluster analysis and ejects significant outliers from the system. Both of these processes are tunable by administrative control panels. The result of this aging and auditing should be that as the vernacular, word usage, and issues discussed internal to a given topic change over time, exemplar documents continue to reflect that change and accurately map relevance.

Reporting

The system, in one embodiment, of databases which receive topic relevant, analyzed content is connected to a series of web-based visualizations to allow users of the UI to understand valuable information about the discussions captured by the system, in one embodiment. Visualizations are shown in FIGS. 27-38.

Response

Figure 10:
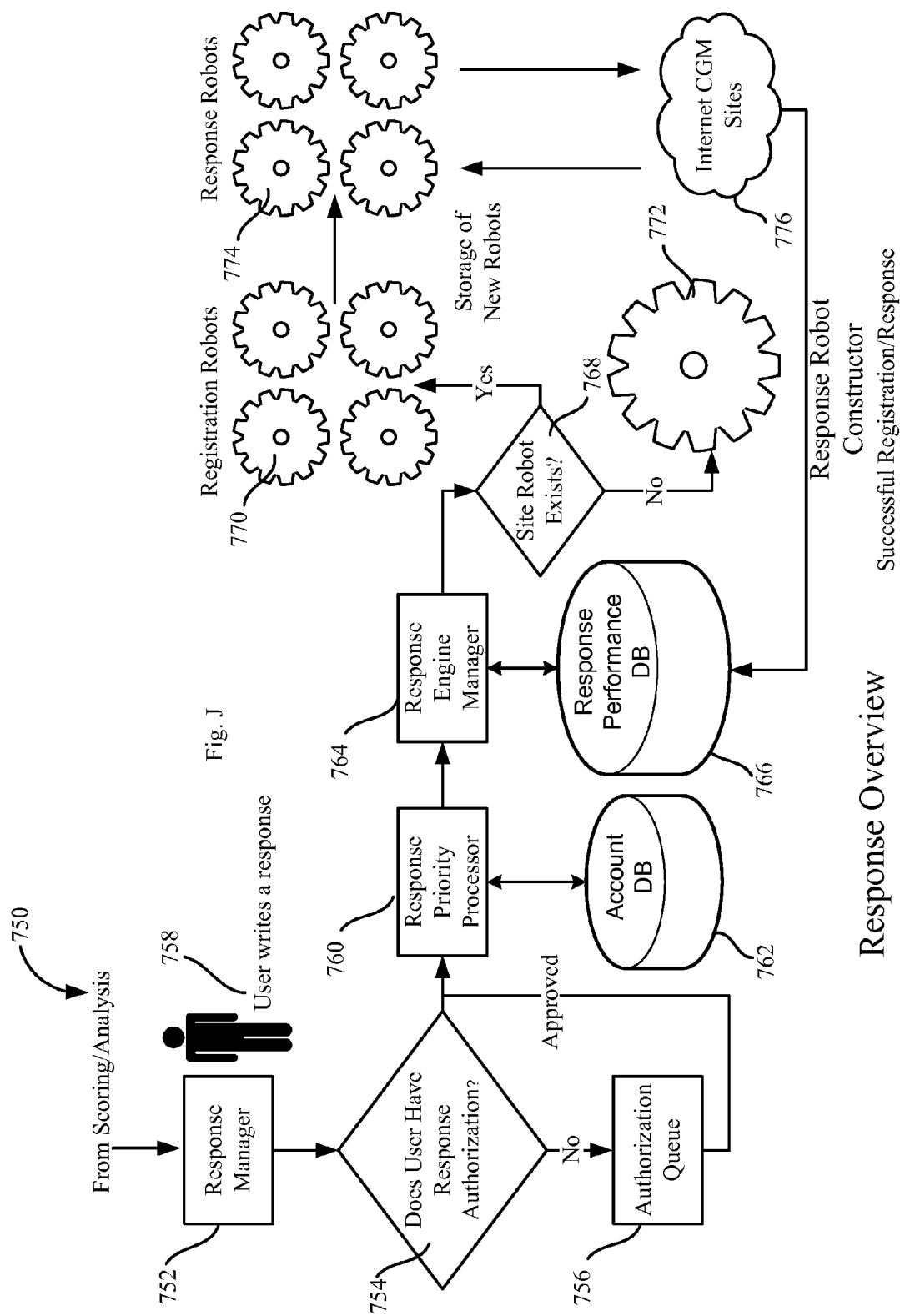
FIG. 10 is a depiction of one embodiment of a CGM response engine.

FIG. 10 is a depiction of one embodiment of a CGM response engine. In this embodiment the Response Manager UI (752) is populated with a written response by a user (758). This user is evaluated for authorization permissions against a stored value in the Account Database (754). If the user does not have appropriate authorization, their response will be delivered to an authorization queue(756) to be approved by an administrator. If a response is not approved it is deleted. If a responder has authorization, or their response is approved, it will be delivered to the Response Priority Processor (760) which determines if any delay or promotion is required for a given approved post. It also observes the original posted date of the content that is being responded to and prioritizes based on most recent posted dates. The Response Engine Manager (764) requests responses from the Response Priority Processor(760) to deliver to the registration and response robots. The Response engine manager checks the response performance DB (766) to see if a given URL has a response robot that has already been created or not. If it has not, the response and all associated information is sent to the Response Robot Constructor (772). This tool provides an interactive UI to allow semi-automated interaction with a target CGM site's registration and response systems to deliver the response to the site, and record the interaction. These interactions include loading pages, following hyperlinks, assigning input data to site form fields, navigating to web mail systems for authentication messages, completing CAPTCHA tests, interacting with IM and SMS systems, performing sequential interactions in correct order and submitting forms. The result of these actions should be a newly registered user (if required by the site) and a response written to the blog site. The interaction is recorded and stored in the Registration and Response Robot sets (770, 774). If, when the Response Engine Manager is sent a response, it determines that a robot already exists, it will execute that robot without human interaction. This has the same effect, creating a new registration if required, and writing the response to the CGM site. Success or failure of robots and robot constructor actions are recorded in the Response Performance DB for evaluation and manual code re-work if required.

The response manager is a system to convert into a manageable, scalable business process the task of responding to CGM content by way of comments. All CGM systems that allow interactivity (>90%) have a web based system for allowing readers of content to respond by way of a comment, note, or other stored message. This often requires that users register themselves on the site, by providing a username, password, and other personal details. Sometimes this requires providing an e-mail address, to which an activation link is sent, or an instant messenger account which is sent a password. This isn't too difficult for casual users to maintain, especially if they only interact with a few sites. Professional users however often have to interact with thousands of different sites. The system, in one embodiment, aims to reduce this workload for responders by automating the registration and response process.

Response Workflow

In one embodiment, the TruCast UI system facilitates a workflow for many users to interact in a coordinated, managed way with CGM content. Once a post as been successfully analyzed by either a user in the scoring manager, or the automated analysis systems it becomes available within the response manager. This is a UI system for a user to write a comment in response to relevant posts. The UI two halves, one which shows information about the post being responded to (author, date, body text, and other comments from within the thread, as well as stats about the author and site responsible for the content), and the second that contains the new response the user is writing. The system provides an interface called the response vault for managers to pre-write message components, fragments of text, names, stats, and pieces of argument that they'd like responders to focus on. These snippets can be copied into the response body during authoring.

Once a user is done writing a response, the can click a "send" button which delivers the newly written response to the relational database.

Response Automation

Figure 11:
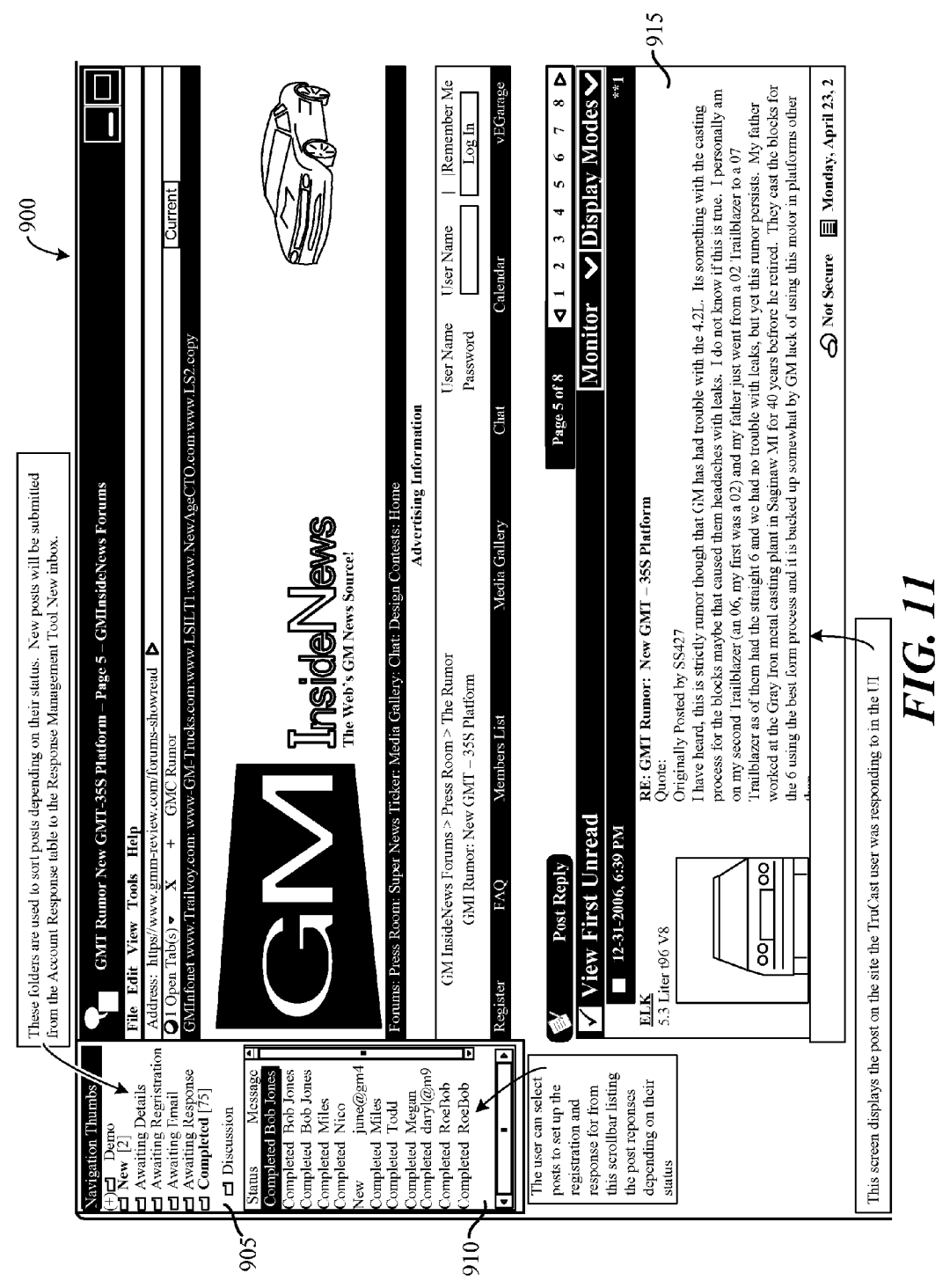
Figure 12:
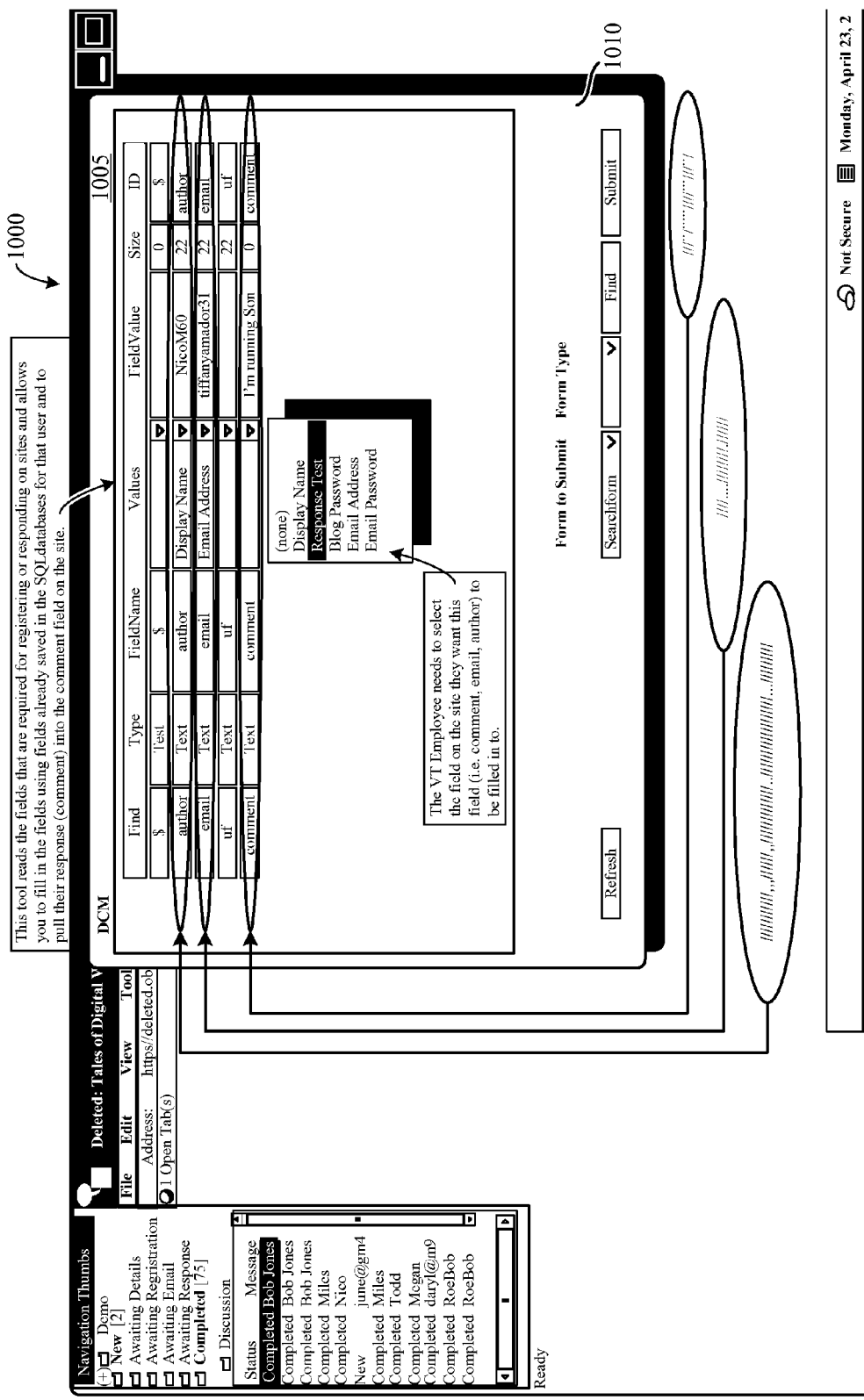
Figure 13:
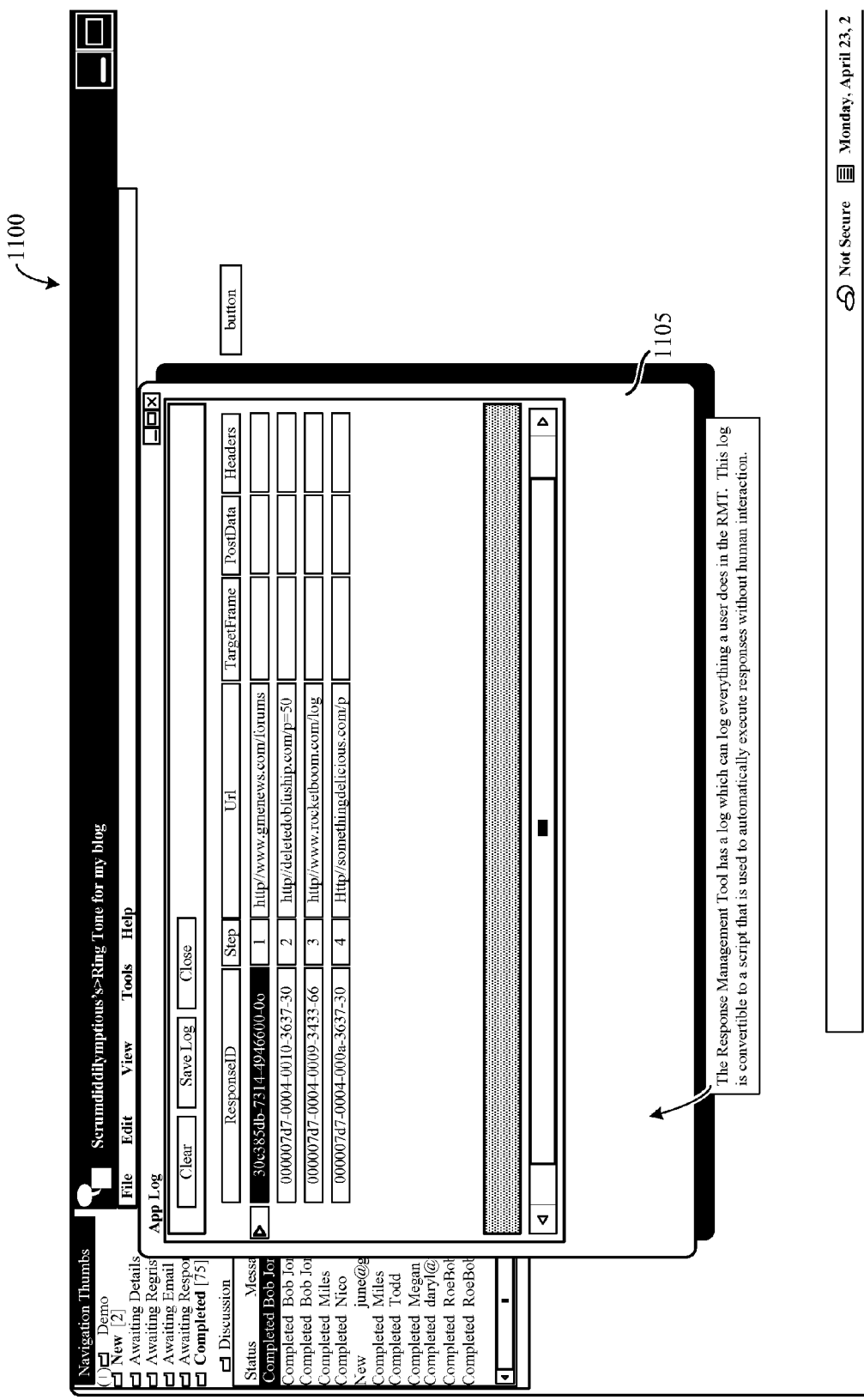
Figure 14:
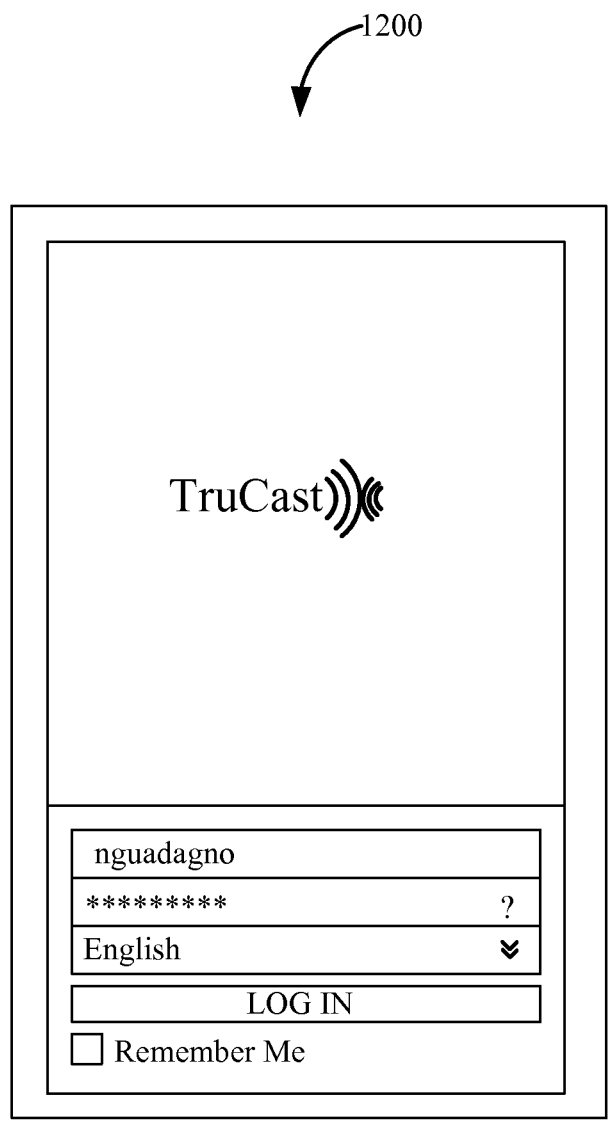
FIG. 14 shows an example screenshot of the TruCast Login Authentication screen.

FIGS. 11-13 show screen shots of a registration and response feature. Once the system, in one embodiment, receives a response record from the response manager, it determines which blog site contains the original message, and the link to the response page for that site and message. If the system, in one embodiment, has never written a response to that site before, the record is delivered to the response interactor UI or Response Robot Constructor, which is run by company employees. This UI allows an employee to visit the appropriate site, navigate to the appropriate fields, and assign the information from the record to fields on the site that will cause the site to record a response. This action recorded, and converted into a script, which is stored as a new robot for later re-use. If TruCast has already written a response to a given site, this script will be used eliminating the need for repeated human interaction.

This system utilizes a similar engine and scripting methodology as the collection system. Registration and Response robots are scripted automations, which interpret the code of CGM content pages, web pages, pop3 or web based e-mail systems, and other data structures, and perform re-determined, probabilistic, or rule driven interactions with those structures. By interpreting page code and scripted instructions, they can imitate the actions of human users of these structures, by executing on screen navigation functions, inserting data, gathering data, and reporting success or failure. An example registration robot would be given as a data input the registration information for an individual user of the system, in one embodiment, and given the URL to a site that the user wishes to register on . The robot would visit the site, navigate by markers pre-identified in the page code to the appropriate form locations to insert this information, confirm its insertion, and report success, as well as any output information from the site. An example response robot would accept as input the registration information for a given user of the system, in one embodiment, the blog response they've written, and the URL to the site that the user wishes to respond to. The robot would load the site into memory, navigate the page by way of hyperlinks or pre-determined, probabilistic or rule driven information, examine the page source code to discover the appropriate form fields to insert this input data into, do so, and report success. Other embodiments of this solution could include purpose built scripts that perform the same assignment and scripted interaction with CGM sites to perform registration and response tasks. Smaller scale systems would have users perform the manual field entry and navigation tasks, but captures these interactions for conversation involvement identification and maintenance by the analysis systems.

Once the system, in one embodiment, receives a response record from the response manager, it determines which flog site contains the original message, and the link to the response page for that site and message. If the system, in one embodiment, has never written a response to that site before, the record is delivered to the response interactor UI, which is run by company employees. This UI allows an employee to visit the appropriate site, navigate to the appropriate fields, and assign the information from the record to fields on the site that will cause the site to record a response. This action is recorded, and converted into a script for later re-use. If TruCast has already written a response to a given site, this script will be used eliminating the need for repeated human interaction.

This system utilizes a similar engine and scripting methodology as the collection system. Other embodiments of this solution could include purpose built scripts that perform the same assignment and scripted interaction with CGM sites to perform registration and response tasks. Smaller scale systems would have users perform the manual field entry and navigation tasks, but captures these interactions for conversation involvement identification and maintenance by the analysis systems.

There are several sophisticated systems for preventing automated interaction with registration and response forms on CGM sites. Because TruCast is engine and script driven, and each transaction happens by way of a modular execution system, we can tie the process to outside support modules to defeat these automation prevention systems. The response automation system has a complete pop3 e-mail interaction system which can generate e-mail addresses for use in registration, check those addresses for incoming mail, and navigate the mail content as easily as more typical web content. The response automation system uses advanced OCR processing along with human tuning to defeat CAPTCHA protections. The system has access to jabber protocol interactions to create automated IM accounts and interact by SMS with mobile phone systems. TruCast also stores a significant body of information, in contact card format, about responders so more complex registration questions can be correctly answered.

Conversation

The response system within TruCast delivers posts to blog sites, which are the target for the collection system. As the system, in one embodiment, collects content it matches incoming content to evaluate if that content belongs to a thread that the system has interacted with. When the system discovers posts that were written after a response that TruCast wrote, it is returned to the queue of posts assigned to the user who wrote the response, with a maximum priority. This way a conversation can be facilitated. We also allow review of conversations by way of an Audit Panel, which gives a timeline of interaction for a conversation between a blogger and a TruCast user.

Transparency

Given the volatility of the CGM space, the value it represents, and the danger of negative publicity for any companies or other interested parties who choose to interact by way of responding by comment, it is very important to maintain the appearance of correct attribution. The users are responsible for the content they generate. Because of the sophisticated analysis tools available for CGM site owners to evaluate the source of incoming comments, it's important that the system, in one embodiment correctly portrays correct attribution. While using the TruCast system to automate response delivery to blog sites, correct attribution of content origination is retained.

Indicators of origination include: (1) E-mail address used in registration/response process; (2) Owner of e-mail address domain's as reported by the WHOIS information; (3) Receipt of e-mail sent to this address by the correct customer to the system, in one embodiment; (4) IP Address used in the response/registration process; (5) Reverse DNS lookup on the IP Address used in the response/registration process, and the resultant WHOIS information; and/or (6) Internal consistency of blog user registration information.

Any given customer or user will direct a domain name that's appropriate for blot post response, connect this domain (and its MX record) to web accessible server. This server should make available the e-mail addresses hosted on it via a pop3 connection. This resolves issues 1 and 2 by placing ownership of the domain from which the e-mails for registration are generated into the hands of the users.

A forwarding system between e-mail addresses created by a robot and the e-mail address listed in the User Manager exists. Forwarding messages from this TruCast controlled site to the customer's e-mail ensures that customers receive any messages from bloggers that reply by e-mail. This resolves issue 3.

The Response Automation tool receives port 80 from the IP address used for the e-mail server installation, and the server hosts the Response Automation Engine for use in executing the scripting that is created to perform automated response. This resolves issues 4 and 5 by aligning the IP source of the comments with the e-mail source of the comments.

The tool collects significantly more information about responders than is typically necessary. This includes obscure information like birth date, favorite car, mother's maiden name, favorite popsicle flavor, user picture, etc, to ensure that registrations are complete, feature rich, and transparent. The manual response app and robots accept this data in the response and registration steps. This resolves issue 6.

By way of this unified approach to transparency, attribution accuracy should always be retained.

If customers or other users desire misattribution of message source, IP and e-mail anonymization features can be enabled. This obfuscates the source of output messages by way of a rotating IP proxy environment which leverages P2P and onion topologies for maximum opacity.

Administration

It is valuable to keep blog-focused workers on message, saying appropriate things, making persuasive arguments, and being considerate participants in the community. In order to facilitate this, the system, in one embodiment, has a set of authorization features. Administrators have access to a per-user toggle which forces the posts that users write to be delivered to a review queue instead of the response automation system when they press the "send" button. This queue is accessible by administrators to allow review, editing, or rejection before messages are submitted.

Administrators can also create and manipulate sorting rules which prioritize content within user scoring and response queues based on topic, site, engine, author, and date information. This forces users to work on appropriate content, and allows administrators to segment scoring and responding tasks to SME's who have the most context for a given topic, site, engine or author.

Accounts

Users in the system, in one embodiment, are members of accounts, and afforded permissions within the system based on the role assigned to them by administrative users on a per account basis. Roles are pre-bound permission sets. Administrators can create, edit, and delete everything within the system, except accounts. Group administrators, who have access to multiple accounts, can create accounts, and can edit and delete accounts that they've created or been given access to. System administrators can add, edit, and delete all accounts, so this permission role is reserved for internal support use only. Users within the system, in one embodiment, are intended to perform the majority of the scoring and responding work, and as such have only access to the scoring manager, response manager, and their own user manager to review their own performance. Group users can do these tasks for multiple assigned accounts. Viewers within the system, in one embodiment, have read only access to all UI controls. Group Viewers can review multiple accounts. Accounts as a whole can be enabled or disabled, which blocks users from accessing the system if their account is disabled, and stops any account specific collection, analysis or processing tasks.

Figure 15:
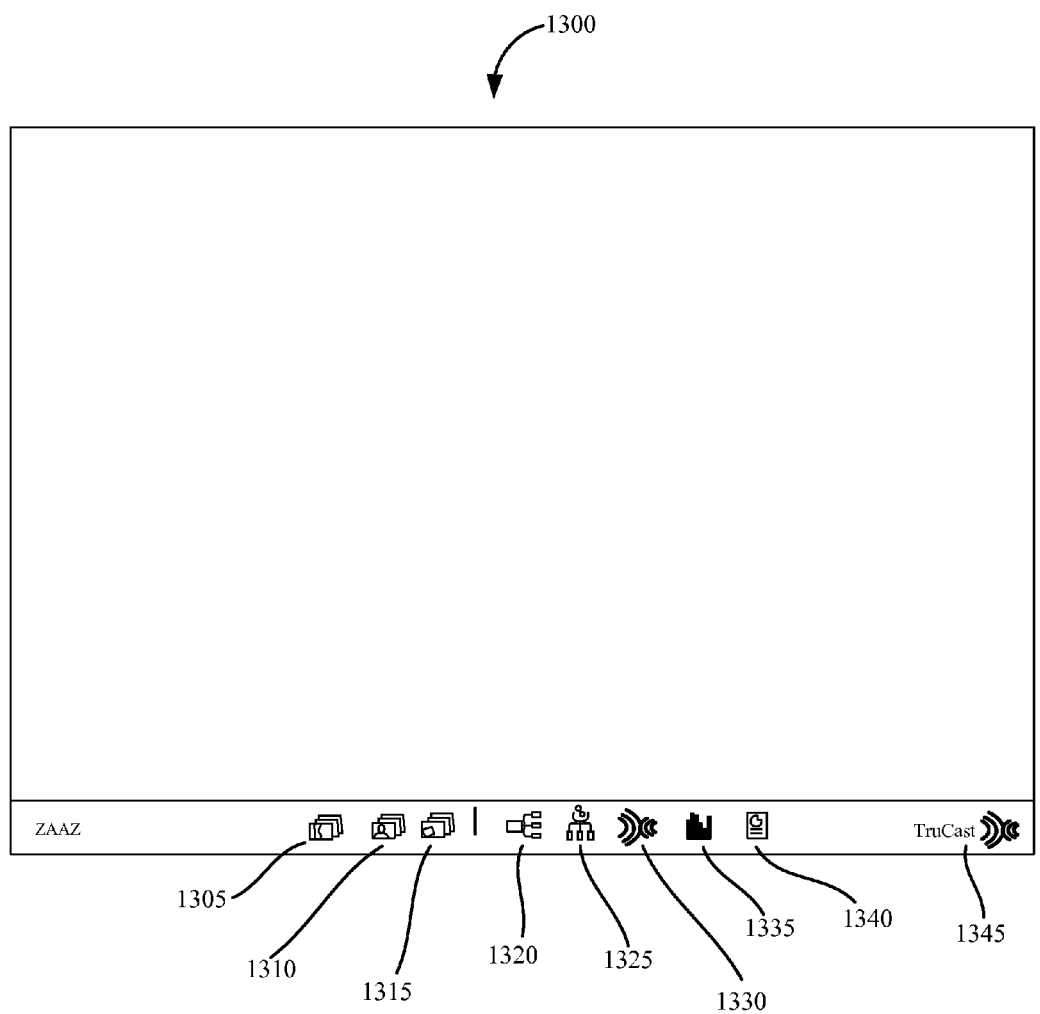
FIG. 15 shows an example screenshot of a user interface homepage.

FIG. 15 shows an example screenshot of the user interface homepage 1300. The homepage 1300 enables a user to navigate through the different functions of the UI. The toolbar is located, at the bottom of the screen and features two menus (account menu and control panel) and a row of eight icons: Account Manager 1305, User Manager 1310, Topic Manager 1315, Sorting 1320, Scoring Manager 1325, Response Manager 1330, Dashboards 1335, and Reporting 1340. The account manager 1305 is used to create/set-up accounts and deactivate/reactivate accounts. The user manager 1310 is used to set-up/create users, establish group rights and permissions, and to review user activity. The topic manager 1315 is used to set-up/create topics and to set-up/create key phrases. Sorting, 1320, is used to set-up/create scoring and responding rules for a topic, site, author, engine, and/or date and assign rules to a specific user. The scoring manager 1325 is used to read/score posts and create new topics while scoring a post. The response manager 1330 respond to posts in near real time and create/save personas and pre-determined responses. Dashboards 1335 is used to map and graph sentiment, impact, authority and data. Reporting, 1340 is used to display statistical charts. Finally a control panel 1345 is used to log out of TruCast and allows email to be sent directly to user support.

Figure 16:
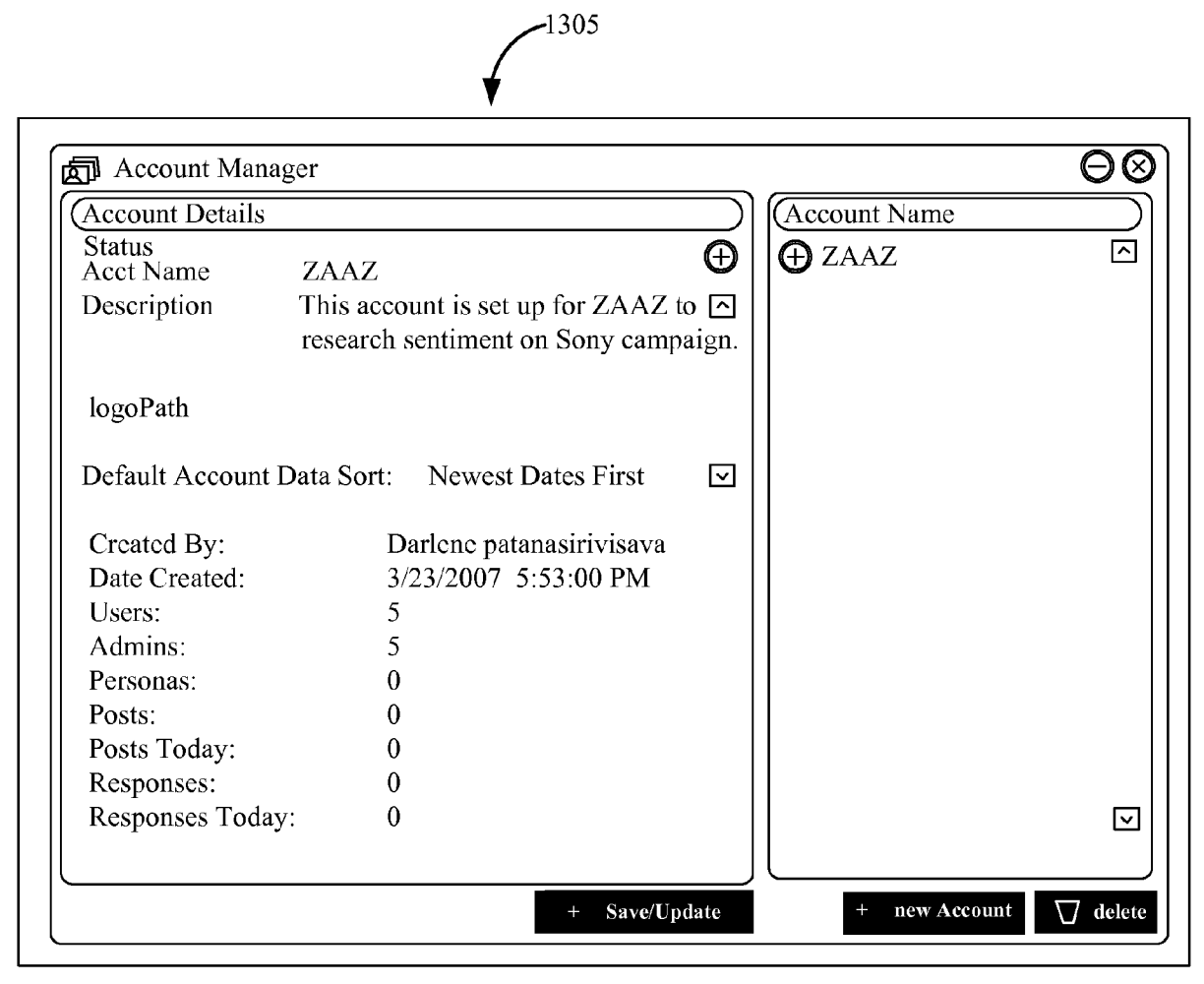

FIG. 16 shows an example screenshot of the account manager 1105. The account manager is accessed by a user through button 1305 in FIG. 15. The account manager 1305 creates and manages accounts in TruCast. Accounts serve as the logical groups of related users, topics, and other system elements. This creation action establishes a new GUM identified accountID that is used by the backend systems to identify data pertinent to this account. Account is often synonymous with customer for TruCast.

FIG. 17 shows an example screenshot of the user manager 1310. The user manager 1310 allows administrators to set-up users, to assign specific rights/permissions to them and to evaluate their activity in TruCast. This is how a work team is created to address a specific target issue within the CGM space. Each new user is assigned a userID value to track their activities, and identify their actions at the database level, enforce permissions and limit access. All users who login to TruCast already have a userID. The response authorization required flag determines if a user's responses need to be approved by an administrator via the authorization system.

Figure 18:
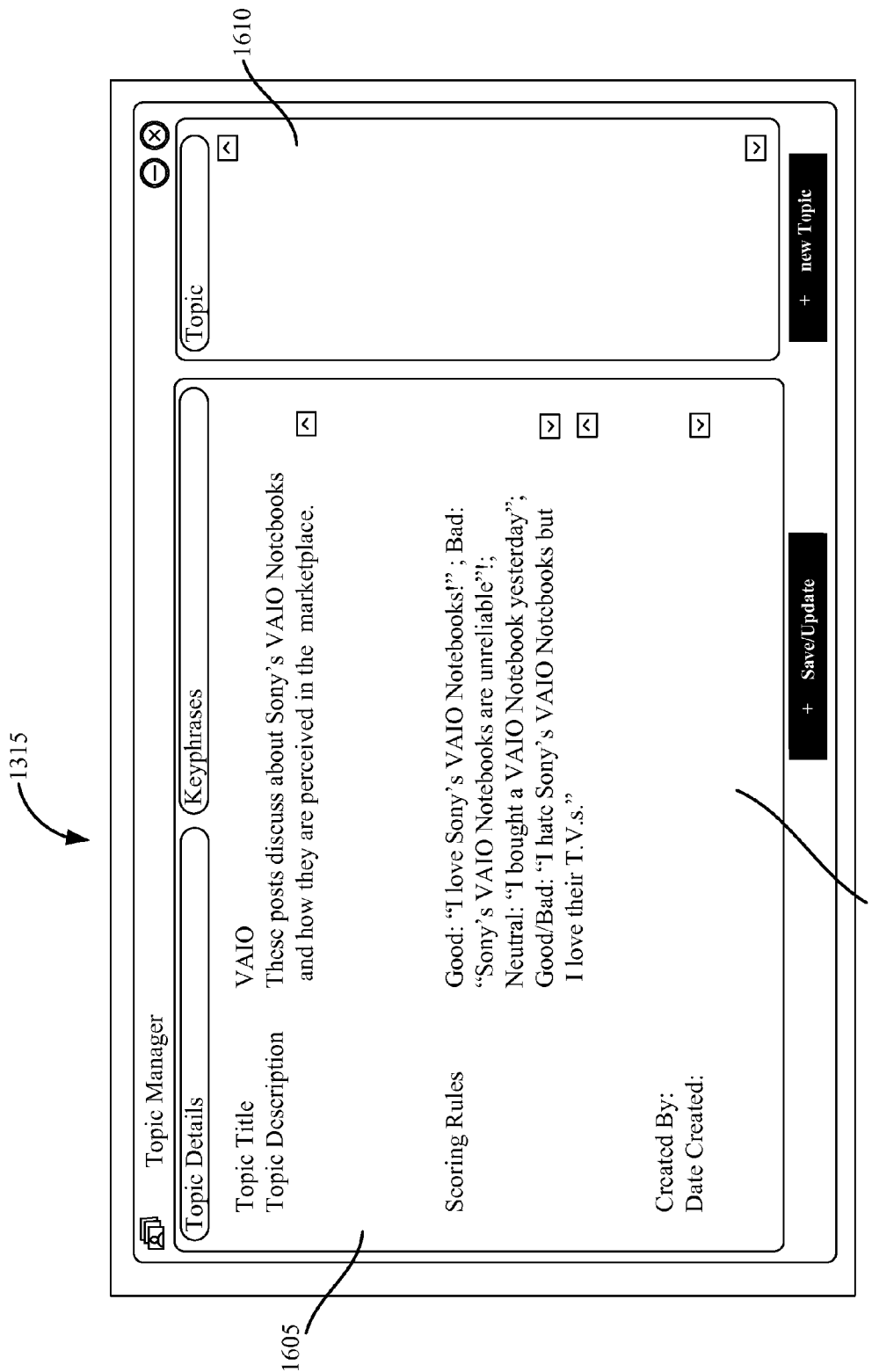
FIG. 18 shows an example screenshot of a topic manager panel.
Figure 19:
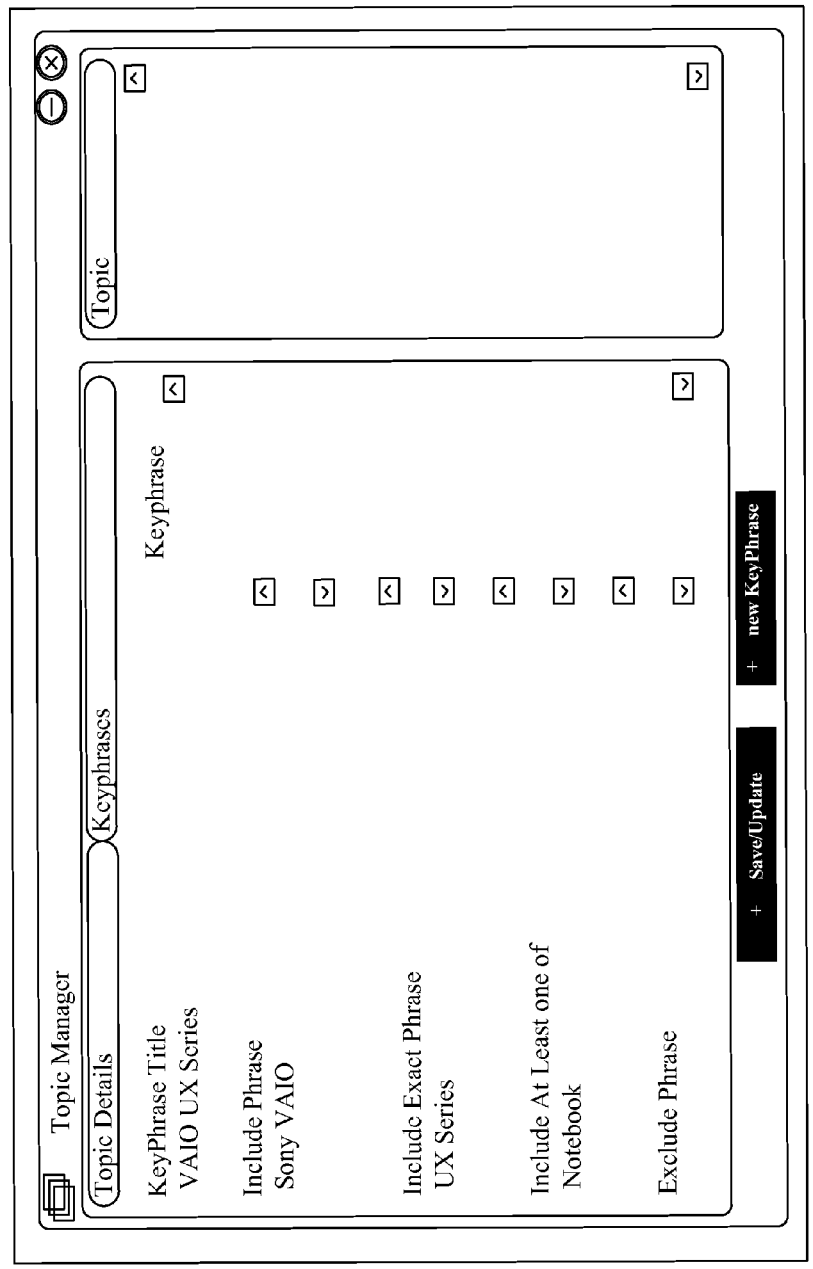
FIG. 19 shows an example screenshot of a topic manager panel with the keyphrase tab activated.

FIG. 18 shows an example screenshot of a topic manager 1315. FIG. 19 shows an example screenshot of the topic manager 1315 with the Keyphrases tab activated. The Topic Manager 1315 is where administrators define topic titles, create topic descriptions, determine key phrases, and exclude specific phrases from the assumed topic. This will determine the content that is matched by the keyphrase tier of relevance analysis in TruCast. Topics are also analysis points, so they're used later to compare and contrast in the visualization systems. Each topic and keyphrase has a GUID value distinguishing it within the database systems.

Figure 21:
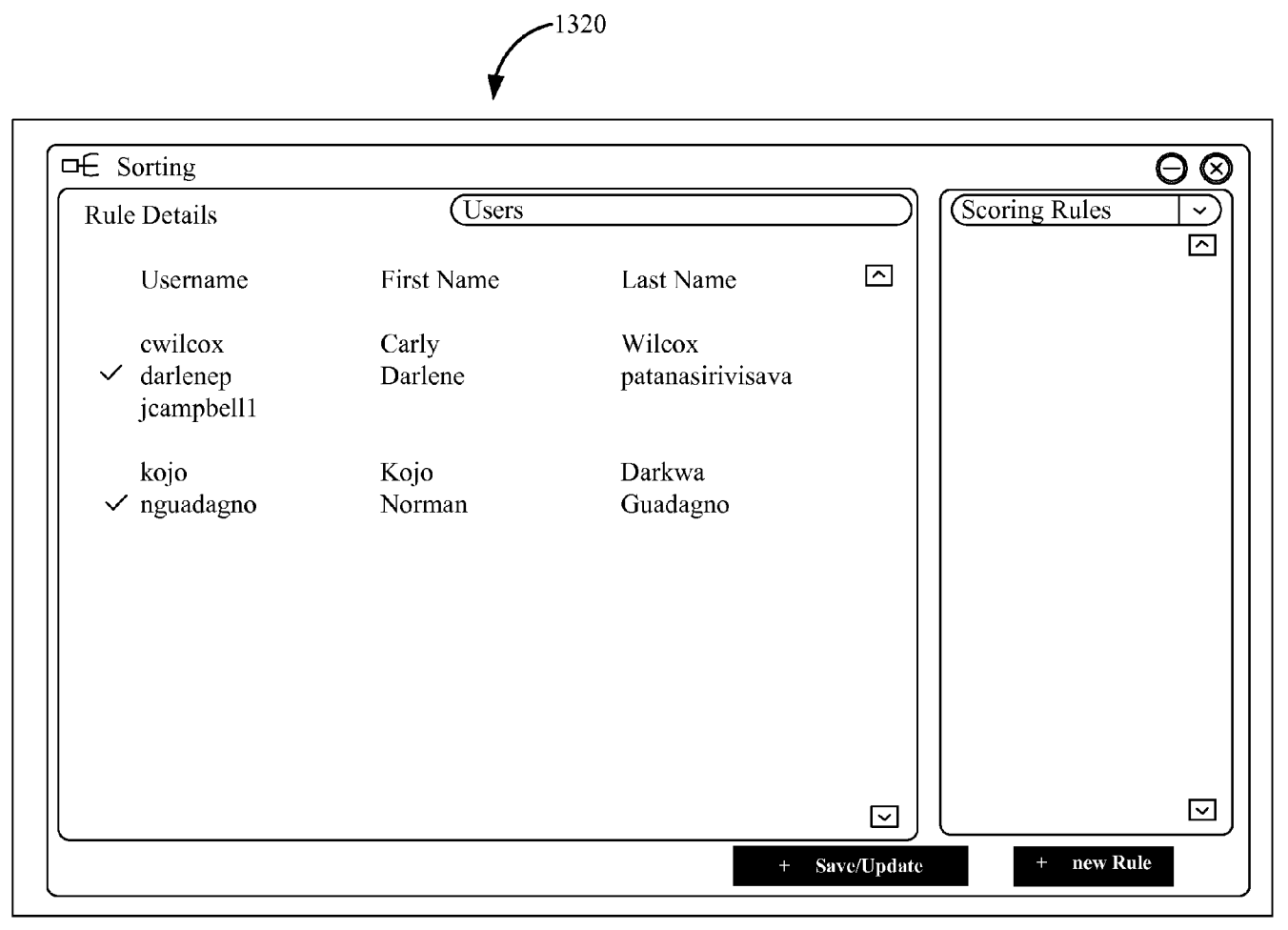

FIG. 20 shows an example screenshot of a sorting manager 1320. FIG. 21 shows an example screenshot of the sorting manager with the users tab activated. Sorting 1320 enables administrators to define scoring and responding guidelines. Administrators can create rules that either impacts all users or a specific user's scoring or responding queue will be sorted. These sorts impact the queue by matching, so all posts that match the rule are sorted to the top of the queue, which allows users to score items that are of general importance after completing scoring the posts that were specifically assigned to them by an administrator.

Figure 22:
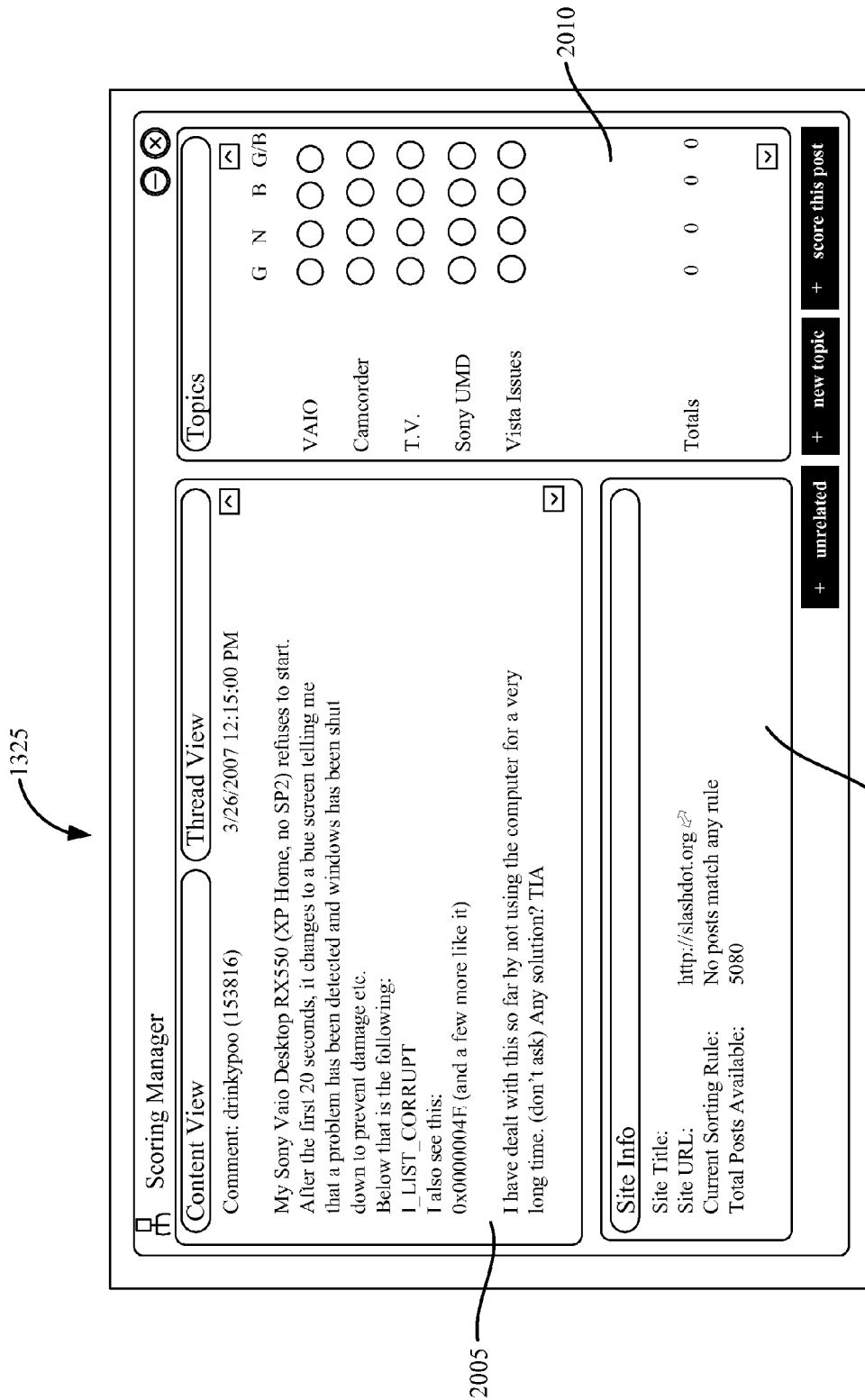
FIG. 22 shows an example screenshot of a scoring manager.

FIG. 22 shows an example screenshot of a scoring manager 1325. The analysis system, having determined that a post matching either keyphrase or conceptual categorization, filtered by the sorting system, delivers posts in a sequential queue to the scoring system. Scoring is the central method for users to impact the function of the automated systems, providing examples and context for their operation and it's the shortest path for a post to make it from ingestion to visualizations and response. The post is placed in text box 2005, the topics that the post relates to are in box 2010, which a user will rate using the radio buttons presented. Finally the site information related to the post is placed in box 2015.

Figure 23:
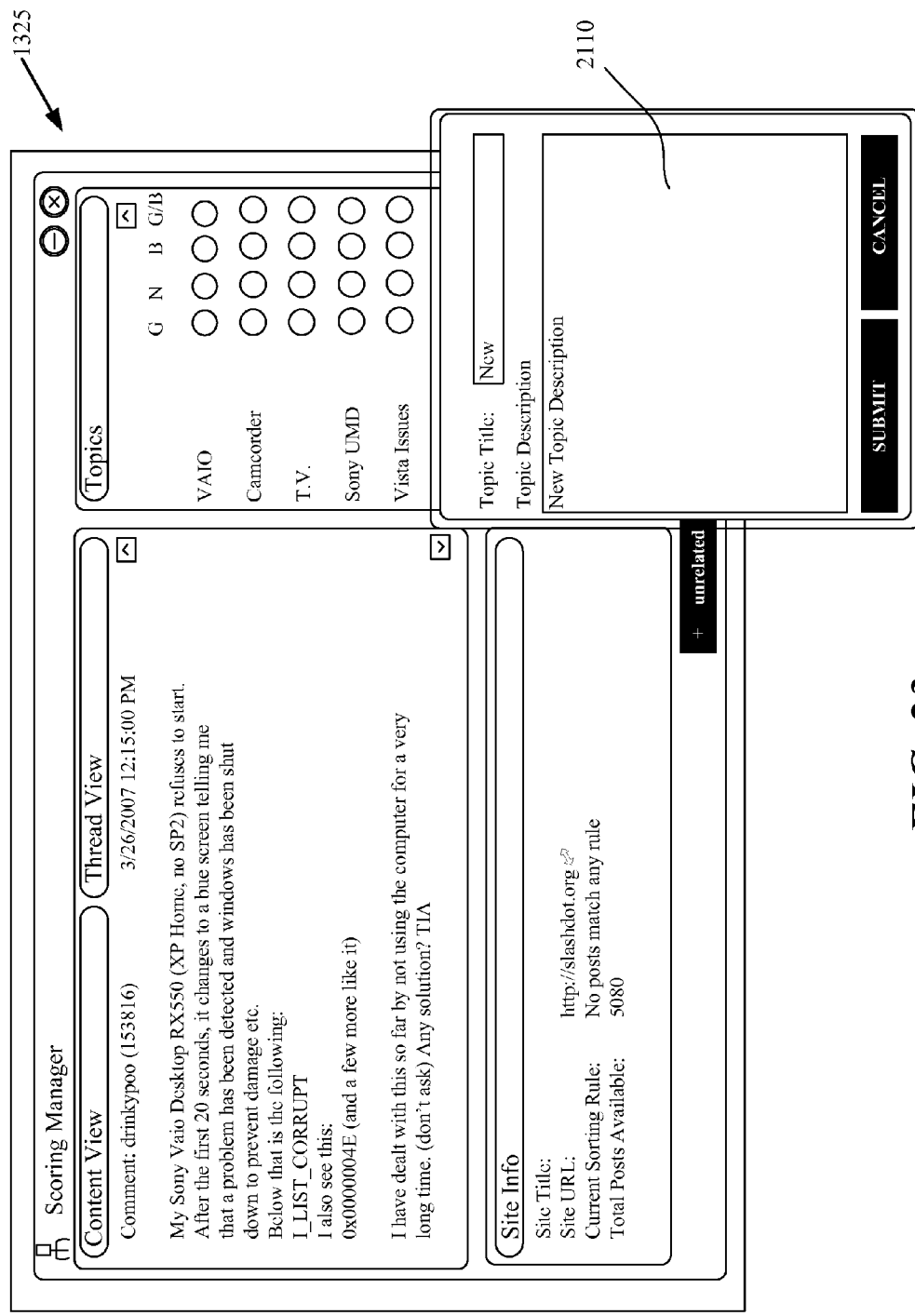
FIG. 23 shows an example screenshot of a scoring manager with a new topic creator screenshot activated.

FIG. 23 shows an example screenshot of creating a new topic 2110 in the scoring manager 1325. Because pre-determined topics may not cover the scope or issues that exist in the discussion discovered by TruCast, TruCast allows scoring users to create topics, in the new topic text box 2110, on the fly to capture the observation that a new loci of discussion exists. These topics are not populated with keyphrases at this step. Instead, administrators have the capability to merge and delete topics from the Topic manager to ensure that all the team members who may have simultaneously discovered this new topic can receive direction from the administrator as to what the final topic title will be, and instructions by way of descriptions and scoring rules about how to interpret it.

FIG. 24 shows an example screenshot of a response manager 1330. The output from the analysis system and the scoring manager 1325 feed into the response manager 1330 based on applicable sorting rules as assigned by administrators. Writing the response, in block 2210, and clicking "post" is all that's required to ensure that the message you typed makes it out as a comment on the target site. Your writing process is supported by significant contextual information, from the topic relevance and sentiment score information to stats about the original author and the site they posted on. Once you submit one response, the next item for your review is available immediately in the same panel, no need to navigate to other pages or sites to find the next place to communicate.

Figure 25:
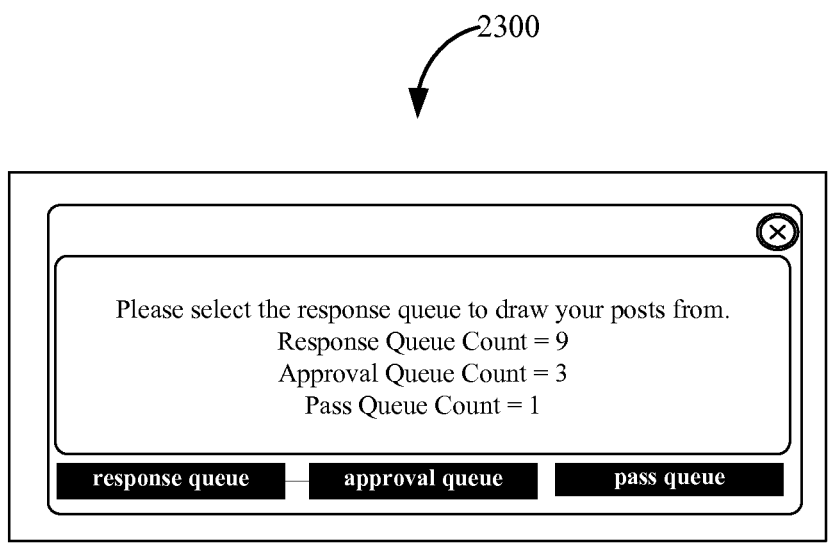
FIG. 25 shows an example screenshot of an administrative queue.

FIG. 25 shows an example screenshot of an administrative queue 2300. The administrative queue tools allow administrators to exercise control over User response activities. These queues can be used for managerial oversight, legal review, tactical analysis, training, feedback and performance auditing. They create the framework for administrative authority over the response process.

Figure 26:
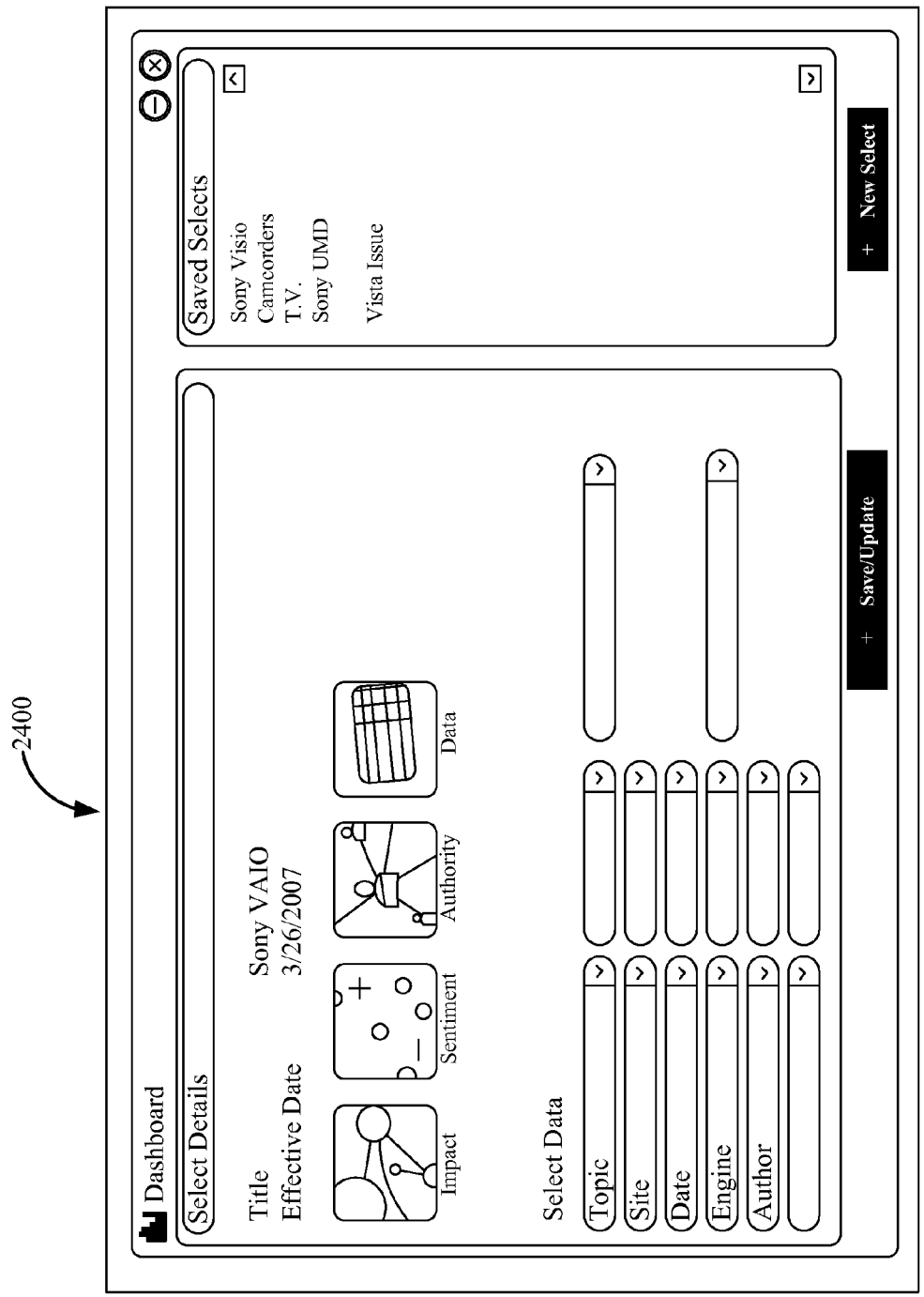
FIG. 26 shows an example screenshot of a dashboard launcher.

FIG. 26 is an example screenshot of a dashboard manager 1335. The Dashboard displays data in dynamic graphical charts and graphs. It maps and reports information based on impact, sentiment, authority and data. This allows users to easily identify critical issues, compare topics of discussion for volume, breadth, depth, tone and interconnectedness of CGM discussions, as well as other useful insights about the CGM space.

Figure 27:
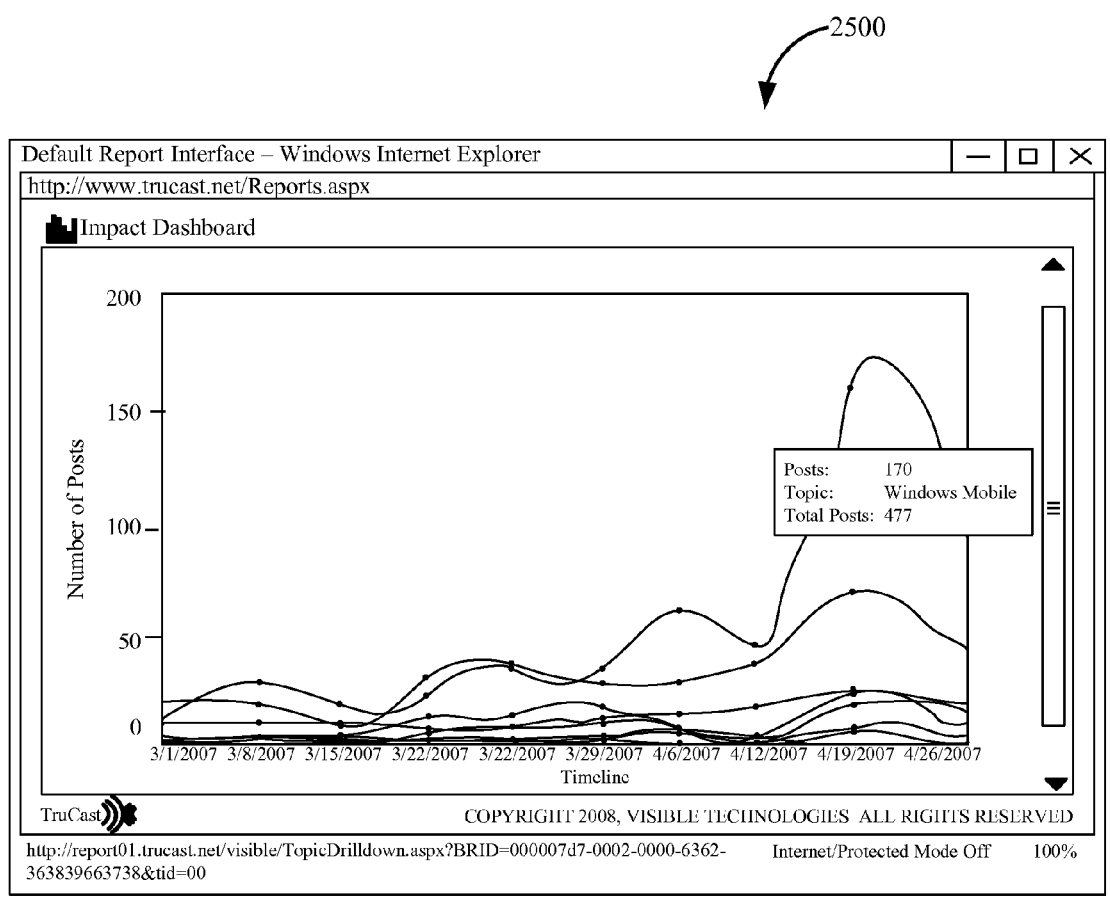
FIG. 27 shows an example screenshot of an impact dashboard.

FIG. 27 is an example screenshot of an Impact Dashboard 2500 and it refers to a set of three line graphs which show daily totals over time that depicts the breadth, depth, and participation of the discussions contained within one or many topics. This information is combined with a polar chart that shows the combined values of the three graphs for one period.

Figure 28:
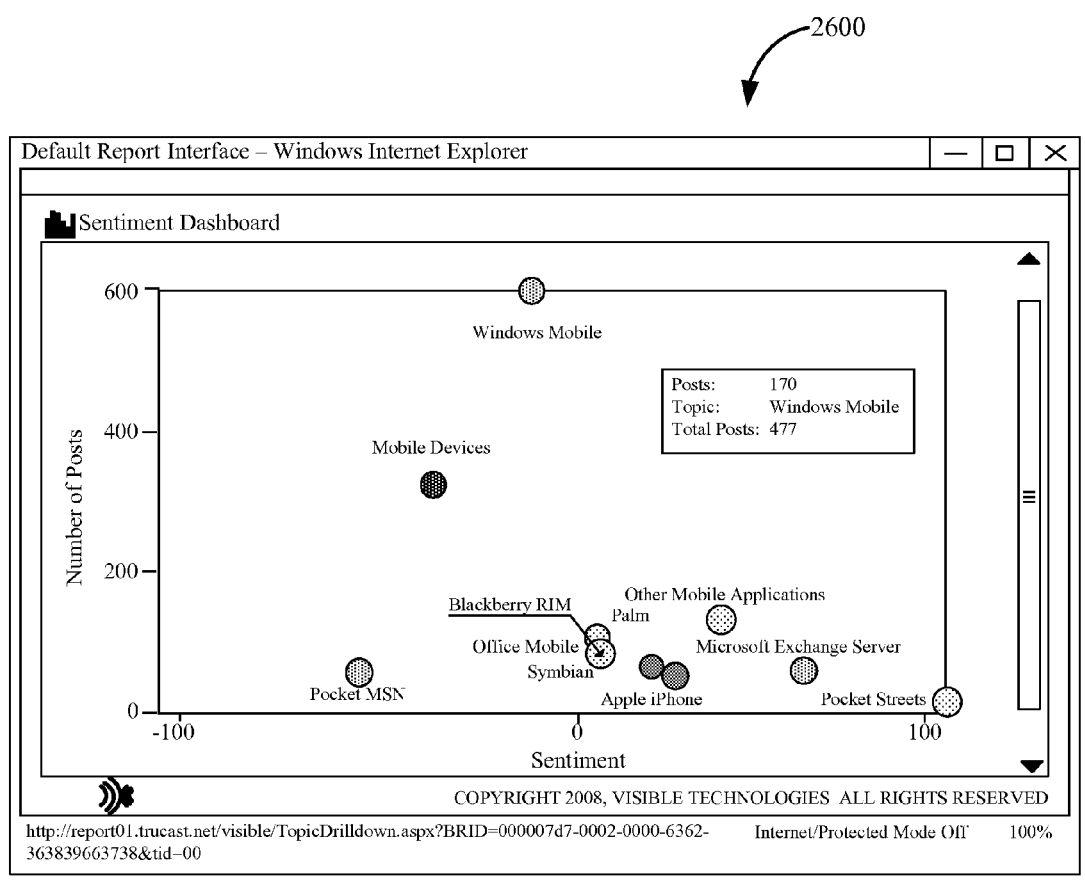
FIG. 28 shows an example screenshot of a sentiment dashboard.
Figure 29:
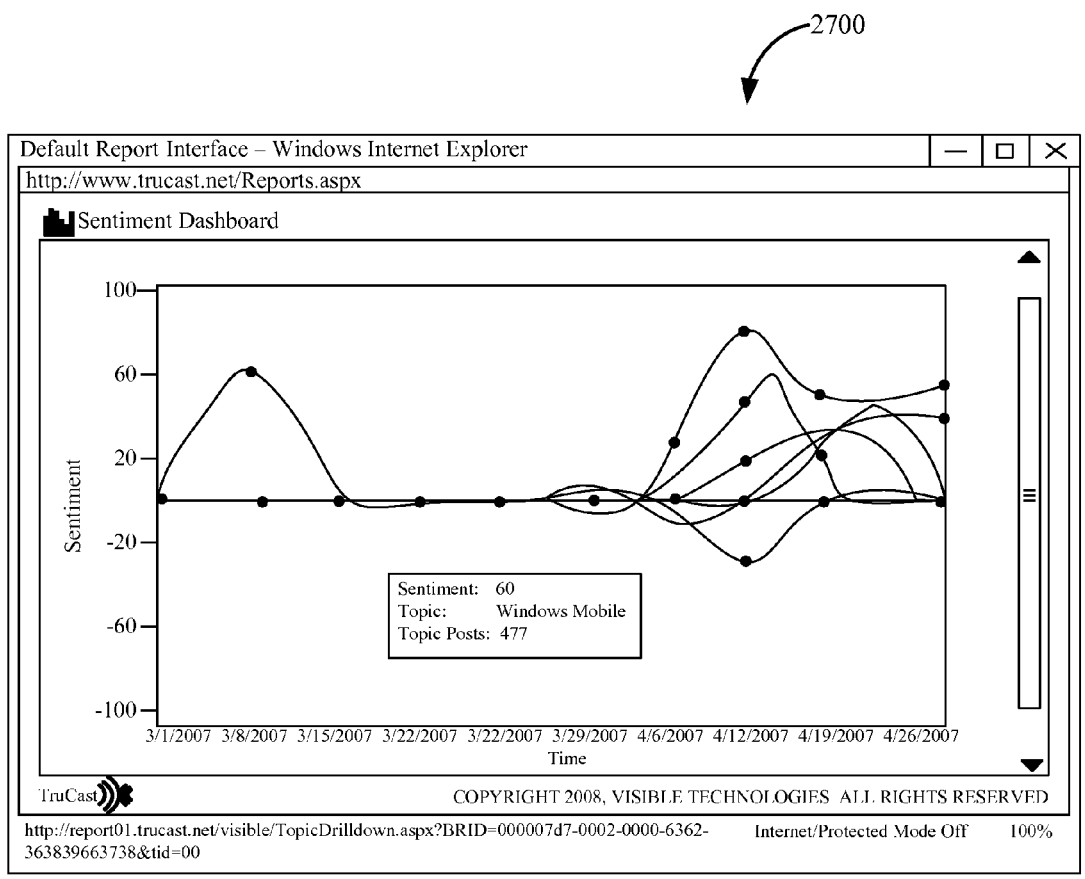
FIG. 29 shows an example screen shot of a sentiment history dashboard.

FIG. 28 is an example screenshot of a Sentiment Dashboard: refers to a snapshot view of a single period, showing the relative post volume versus the average sentiment of your selected topics. FIG. 29 is an example screenshot of a Sentiment History Dashboard. This display is connected to a history view which displays this information over time.

Figure 30:
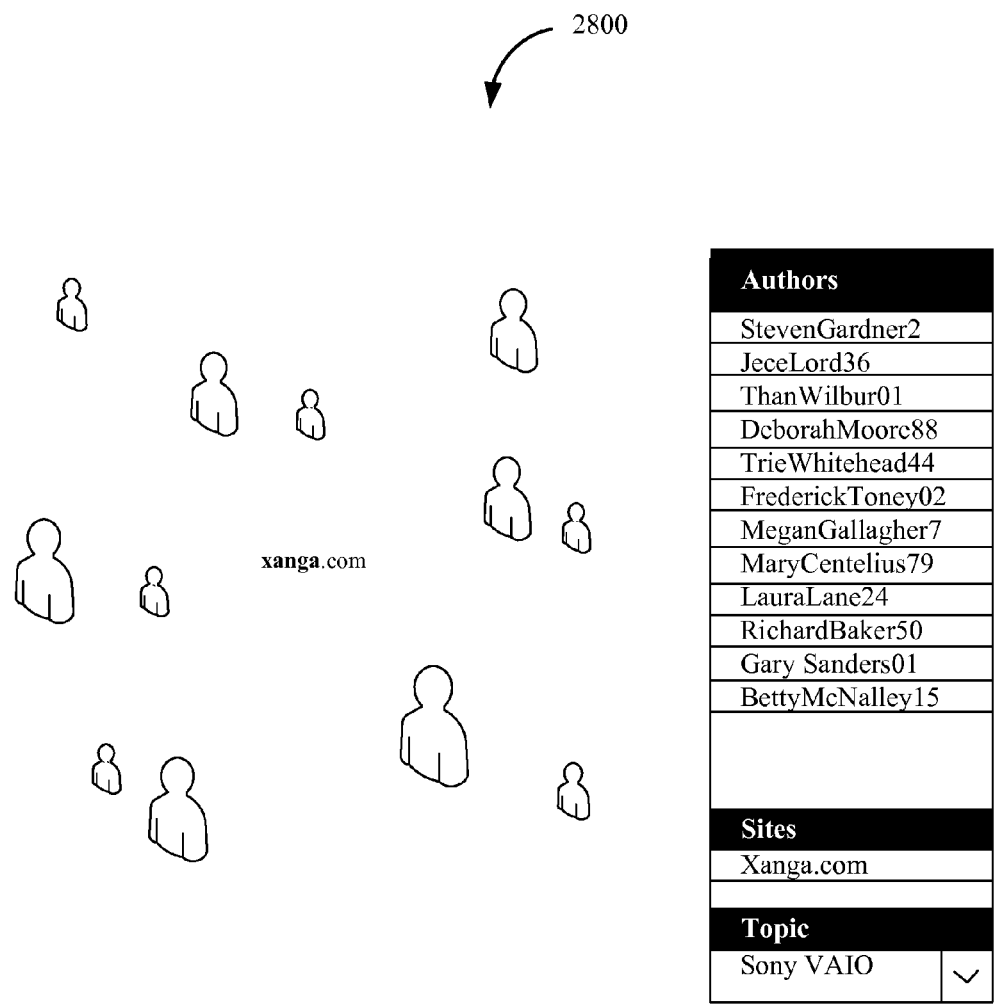
FIG. 30 shows an example screenshot of an authority map dashboard.

FIG. 30 is an example screenshot of an Authority Map Dashboard: refers to a node and edge style interactive display which shows the interconnectedness and relative authority of individual authors within a given topic. It shows topic as the center node, sites that contain relevant content as first edge nodes, and authors as second edge nodes. Edges between authors connote comments, links, quotes, and trackbacks as methods of identifying connection and communication. A list view on the right side of the screen allows you to quickly find specific authors or sites within the display. Adjustable level of depth controls allow users to establish constraints (show only authors with more than 2 links, show only positive authors, etc.) that effect the visibility of nodes in the display.

Figure 31:
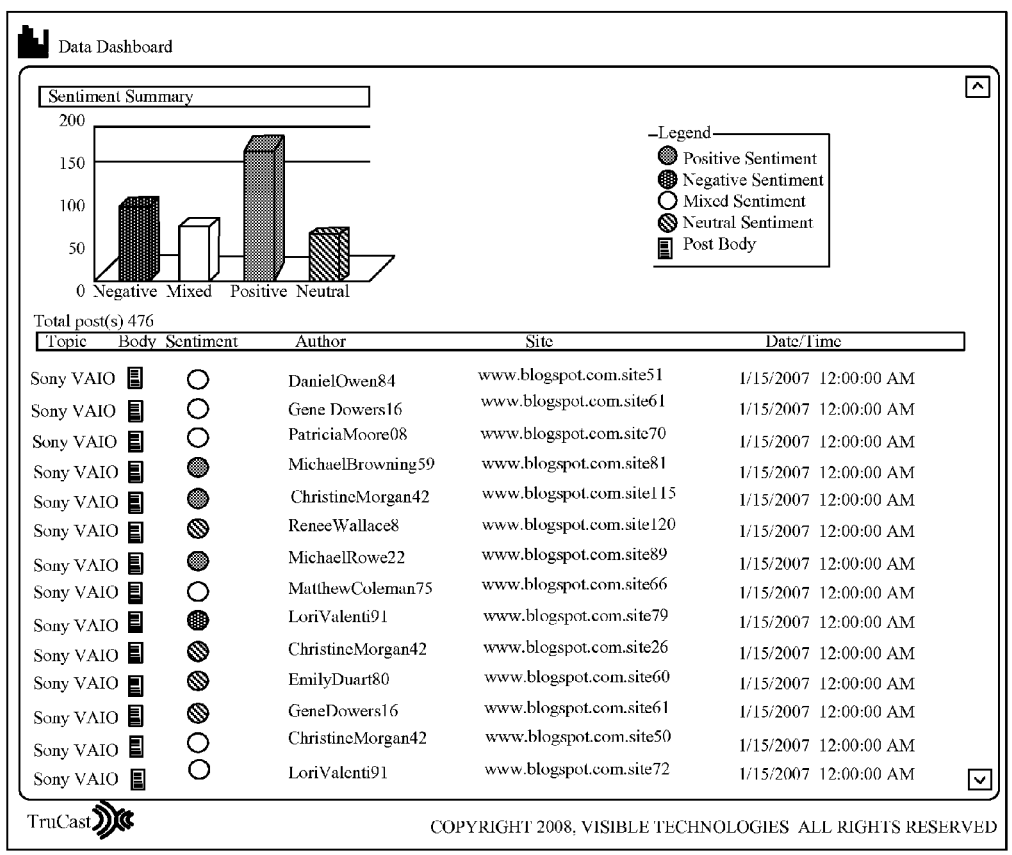
FIG. 31 shows an example screenshot of a data drilldown dashboard.

FIG. 31 is an example screenshot of a Data Dashboard: refers to a display that shows a tabular result set of posts that matched the topics selected. This table shows one post per row with columns for date, author name, permalink, site name, sentiment and topic. This view can show only information based on key-phrase-relevance, or full analyzed relevance, or show those two together. In several other dashboards there are links to more information about a given topic or author. Those links point to this display.

Figure 32:
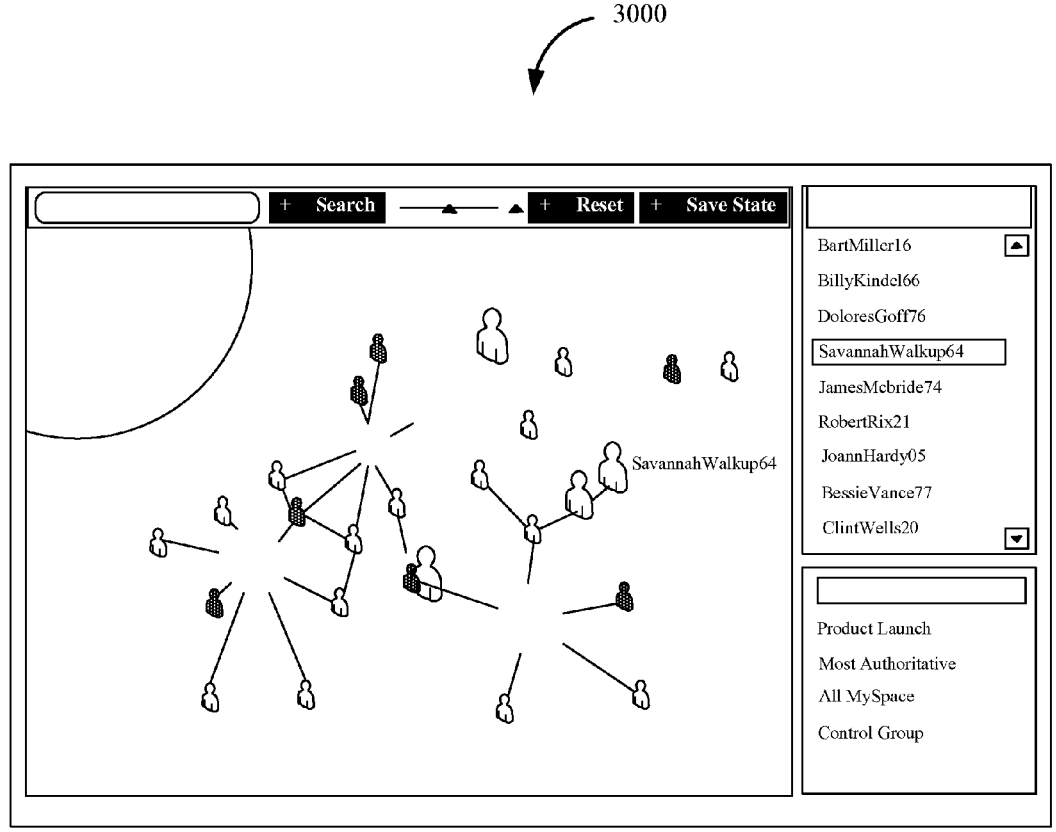
FIG. 32 shows an example screenshot of an ecosystem map dashboard.
Figure 33:
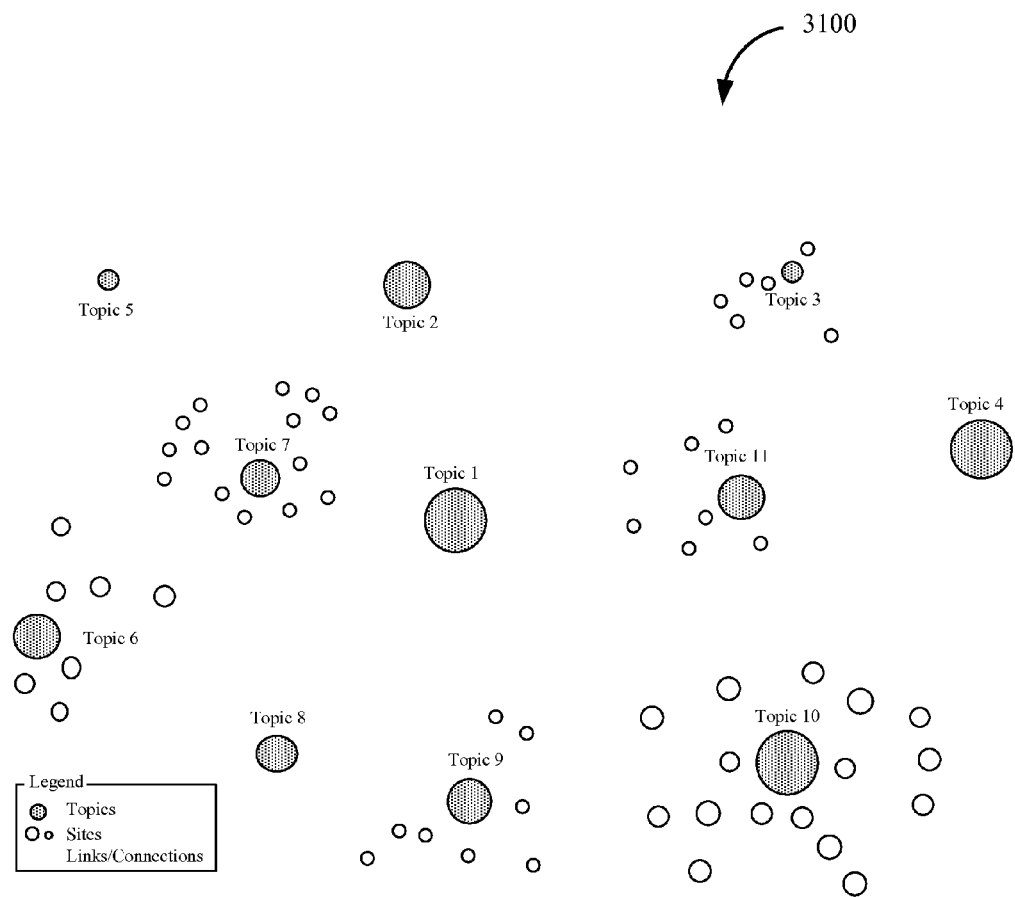
FIG. 33 shows an example screenshot of an ecosystem map zoom out view.
Figure 34:
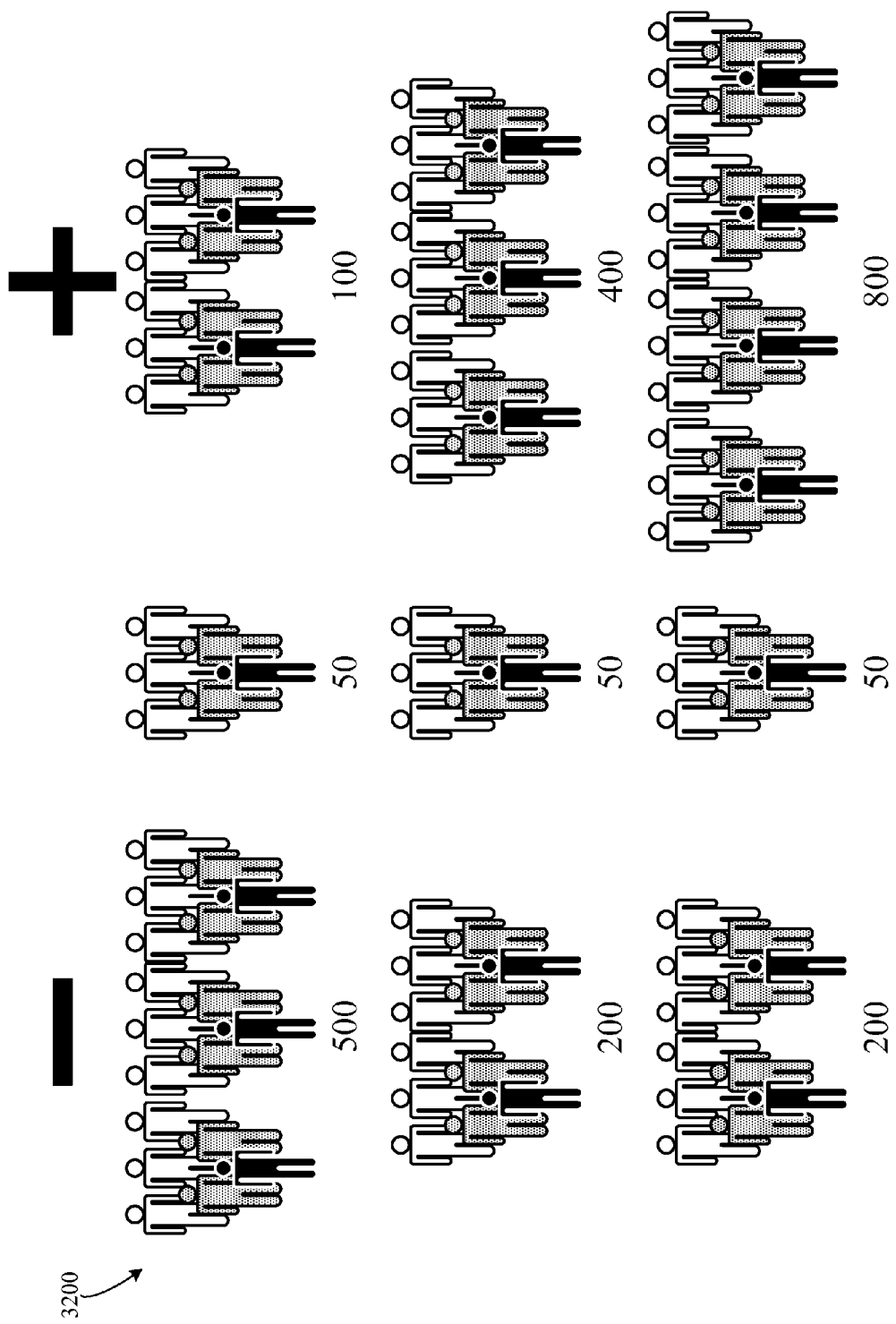
FIG. 34 shows an example screenshot of a sentiment summary.

FIG. 32 is an example screenshot of an Ecosystem Map: refers to an Ecosystem map is a node and edge style display of all of the sites that make up the discussion ecosystem for a given topic or topics. It shows a node for each site that contains posts or comments relevant to the topics selected and date ranges selected in the dashboard launcher panel. Between nodes, there should be an edge for each link that connects nodes together.

FIGS. 31-32 show example screenshots of Nodes and are size scaled depending on how many posts/relevant posts they have, and colored by average sentiment. Edges are thicker depending on how many links exist between two nodes, and have size scaled arrows showing the predominant direction or ratio of links. Nodes, if clicked on should show the site name, # of posts total, # of relevant posts, and sentiment %. The name is a hyperlink to the site. By selecting an individual topic a more detailed display with the sites and authors most important to a given topic displayed. Double click on the node would lead to the data dashboard with a list of all the titles and permalinks to the relevant posts on that site. Edges, if clicked on, show the # of links represented, % directionality.

Figure 35:
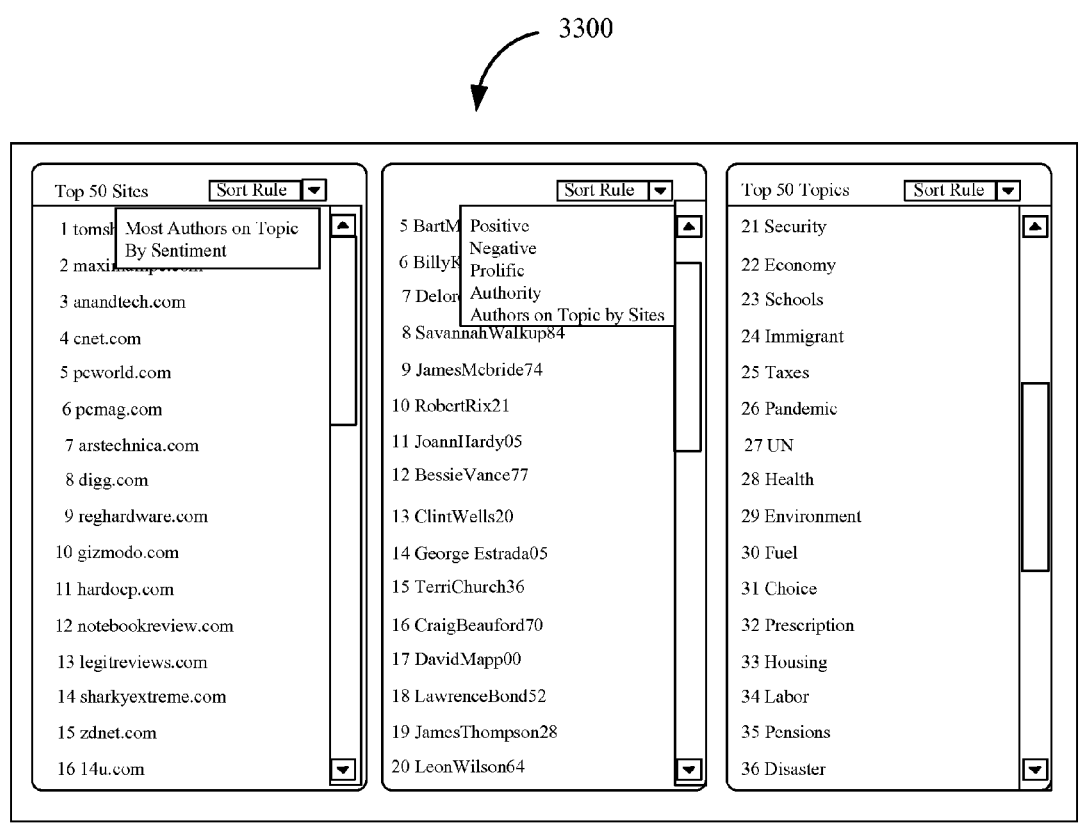
FIG. 35 shows an example screenshot of a set of top lists.

FIG. 35 is an example screenshot of a Sentiment Summary: refers to a single topic display that shows the number of authors per sentimental category on a given topic or sum of topics.

Figure 36:
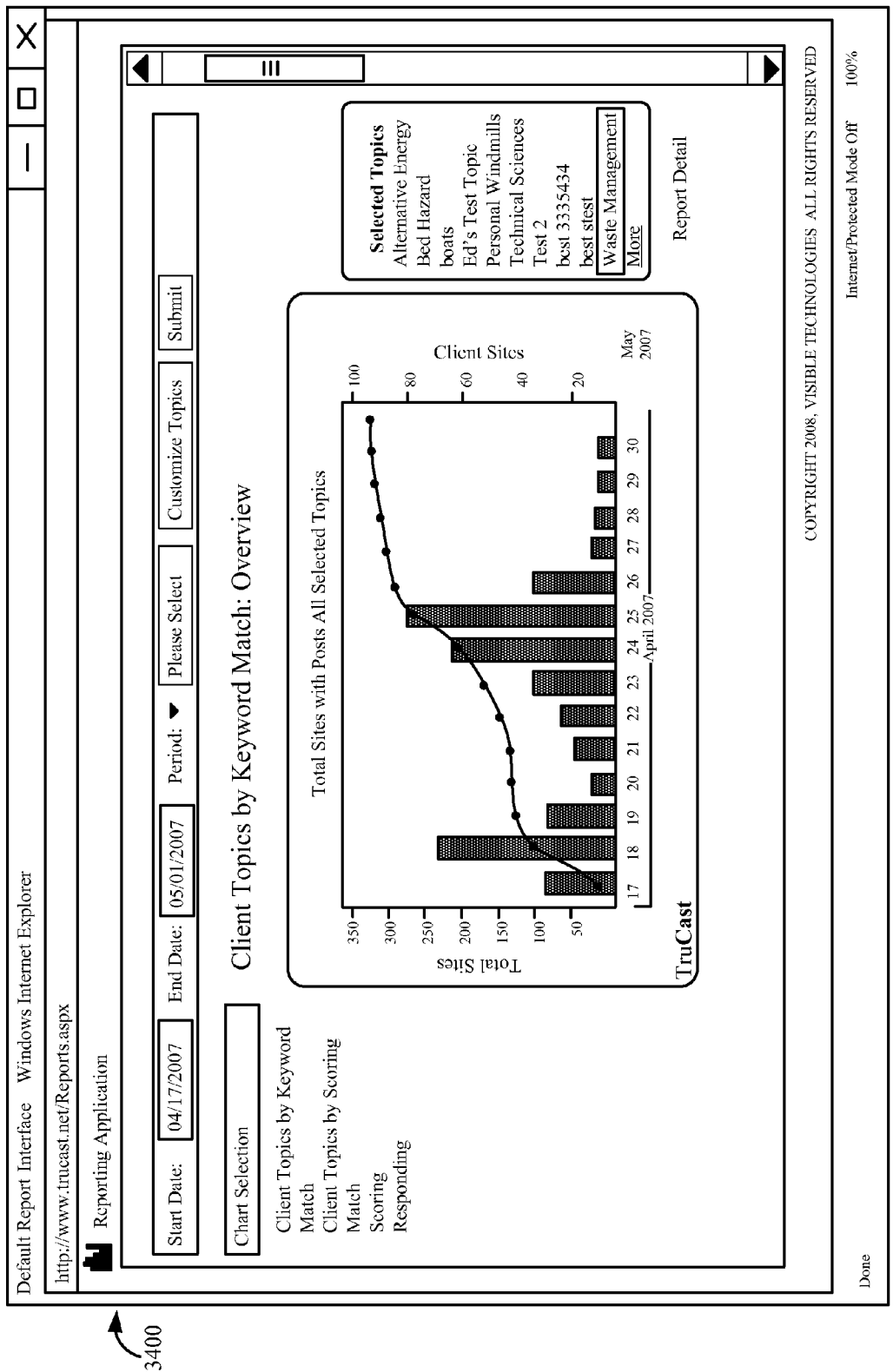
FIG. 36 shows an example screenshot of reporting.

FIG. 36 is an example screenshot of Top Lists: This provides users with a set of ranked lists of sites, authors, and posts that are the most relevant, most popular, most negative, most positive, most authoritative, most influential, most linked to, most commented on, or most responded to depending on user selection.

Figure 37:
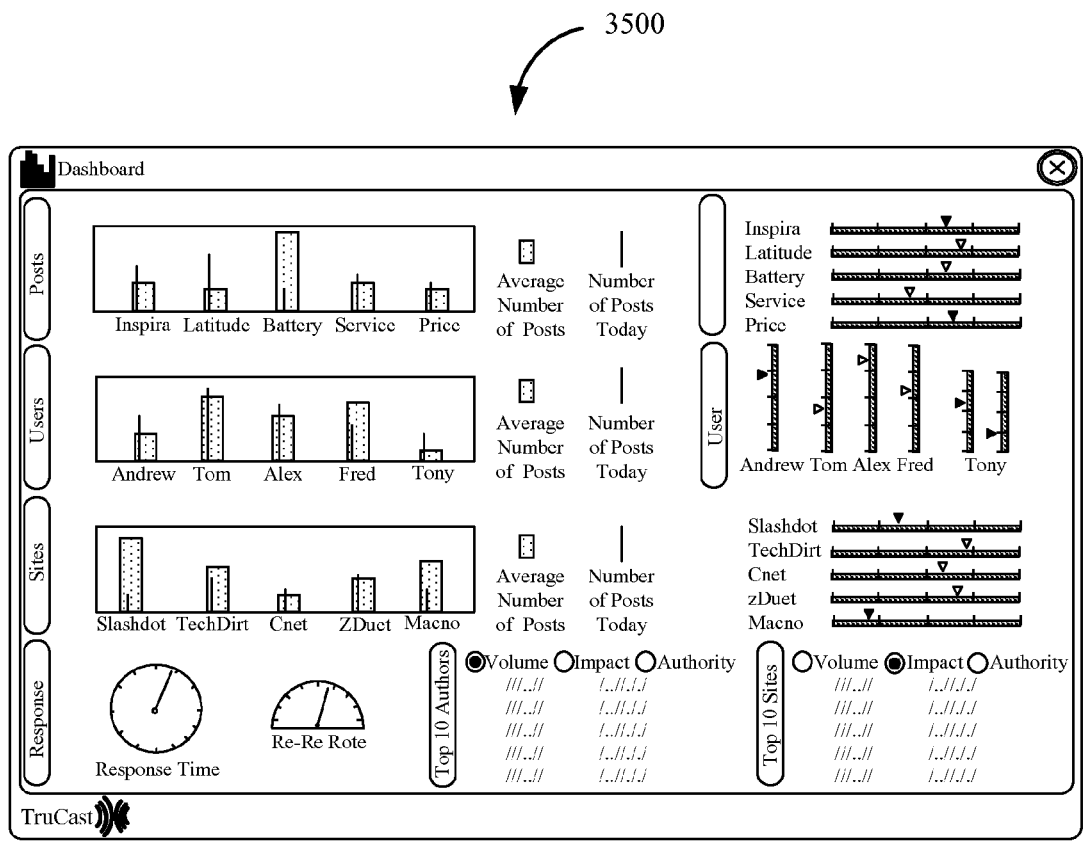
FIG. 37 shows an example screenshot of an aggregate performance dashboard.

FIG. 37 is an example screenshot of a Reporting: The reporting system provides a series of charts based on selection criteria revolving around CGM content. Daily or total values of posts by keyphrase match or post-analysis match, per topic or topics, site, author, by date range. Performance metrics on scorers and responders are also available, per site, topic, or date range.

FIG. 38 is an example screenshot of an Aggregate Performance Dashboard: This dashboard supplies a cluster of configurable widgets for tracking the relationships between several KPI's associated with the data available within TruCast, in one embodiment.

Figure 39:
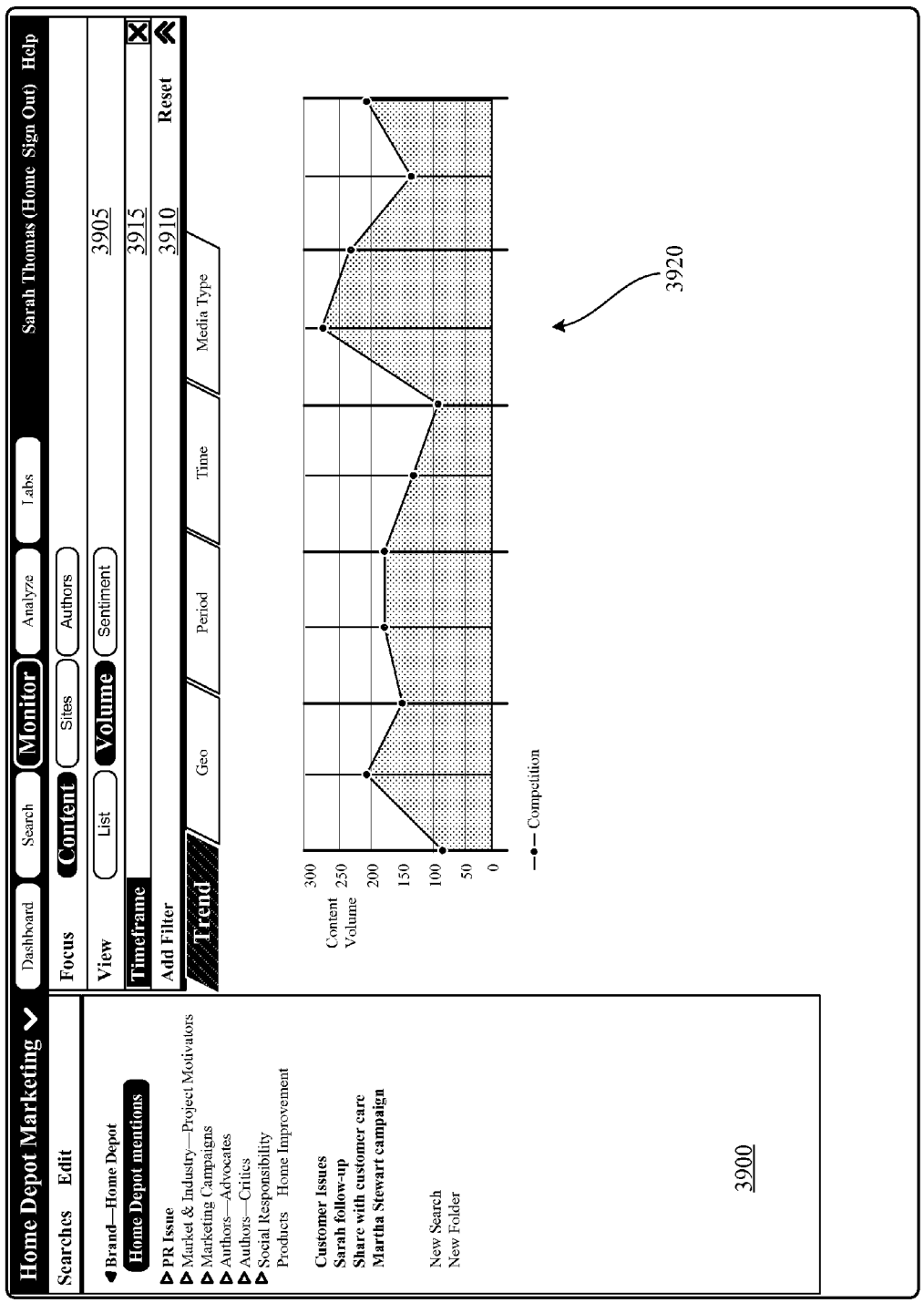
FIG. 39 shows a graphical user interface generated in accordance with an embodiment.

FIG. 39 is a graphical user interface 3900 generated in accordance with an embodiment. The interface 3900 includes a view selection menu 3905, a filter selection menu 3910 and a timeframe selector 915. As illustrated in FIG. 39, selection from the view menu 3905 of the "volume" setting, the timeframe selector 3915 of the "7 days" setting, and the filter menu 3910 of the "trend" setting yields a graph 3920 of the number of times a user-selected search term/phrase has been mentioned, as determined by a system according to an embodiment described herein, over a seven-day span.

Figure 40:
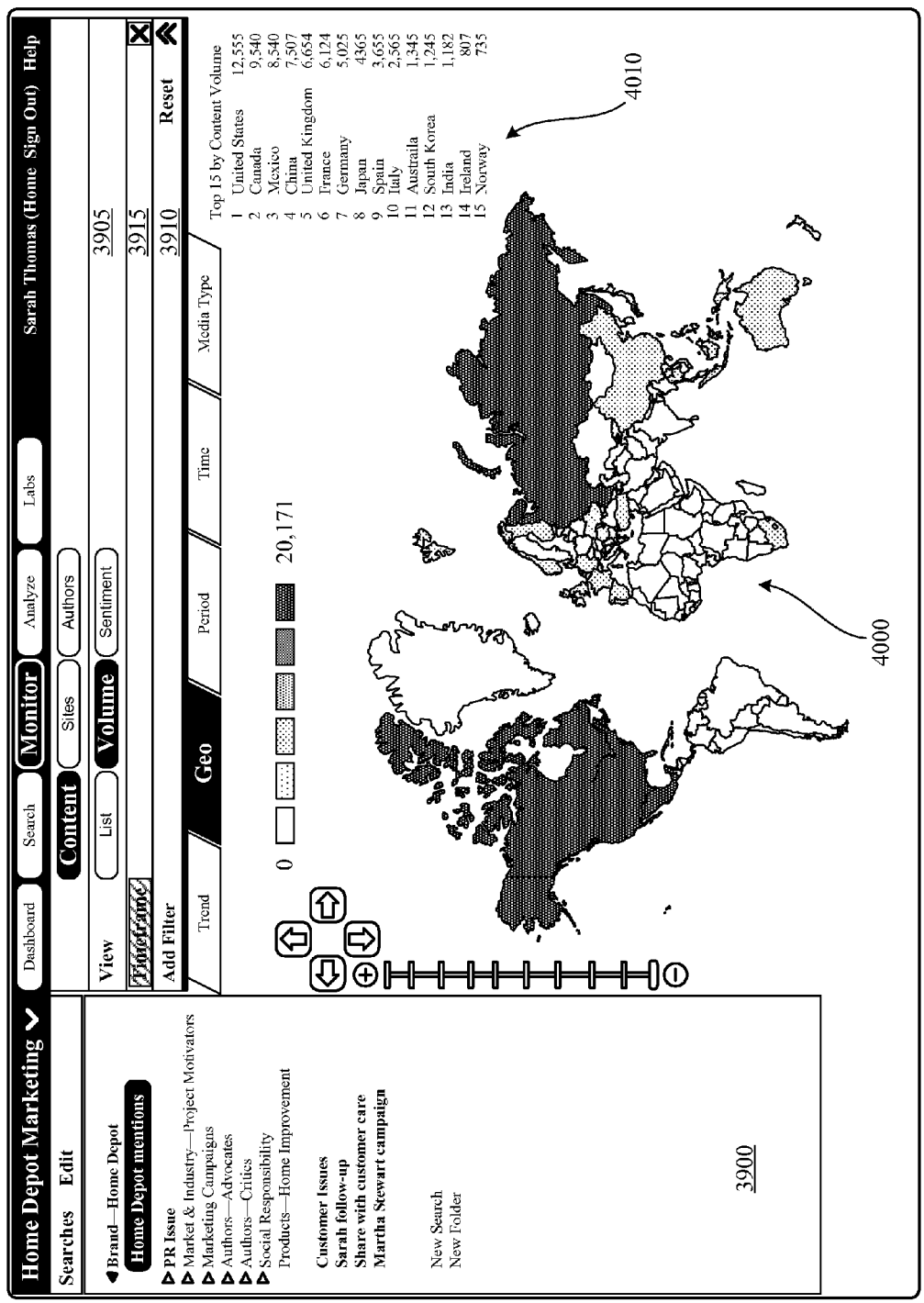
FIG. 40 shows an exemplary screenshot of a graphical user interface according to an embodiment.

FIG. 40 is an exemplary screenshot of the graphical user interface 3900 according to an embodiment. As illustrated in FIG. 40, selection from the view menu 3905 of the "volume" setting, the timeframe selector 3915 of the "7 days" setting, and the filter menu 3910 of the "geo" (i.e., geographical illustration) setting yields a graphical illustration 4000 indicating in color coding, in the illustrated embodiment, the number of times a user-selected search term/phrase has been mentioned, as determined by a system according to an embodiment described herein, over a seven-day span according to pre-defined geographic regions. A textual table 4010 indicating the number of times a user-selected search term/phrase has been mentioned over a seven-day span according to pre-defined geographic regions may also be generated.

Figure 41:
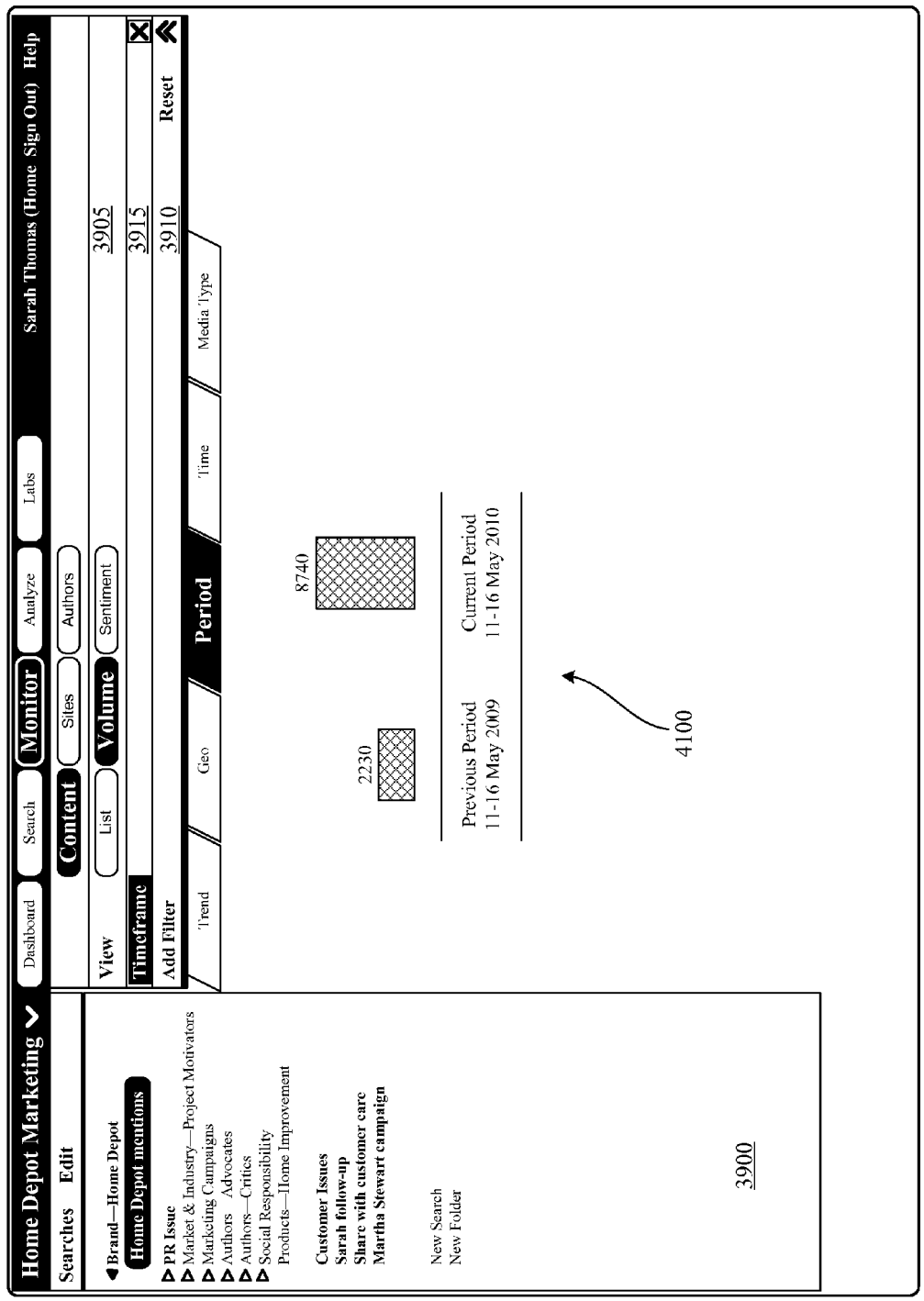
FIG. 41 shows an exemplary screenshot of a graphical user interface according to an embodiment.

FIG. 41 is an exemplary screenshot of the graphical user interface 3900 according to an embodiment. As illustrated in FIG. 41, selection from the view menu 3905 of the "volume" setting, the timeframe selector 3915 of the "7 days" setting, and the filter menu 3910 of the "period" setting yields a bar graph 4100 illustrating a comparison of the number of times a user-selected search term/phrase has been mentioned, as determined by a system according to an embodiment described herein, over two different user-selected seven-day spans.

Figure 42:
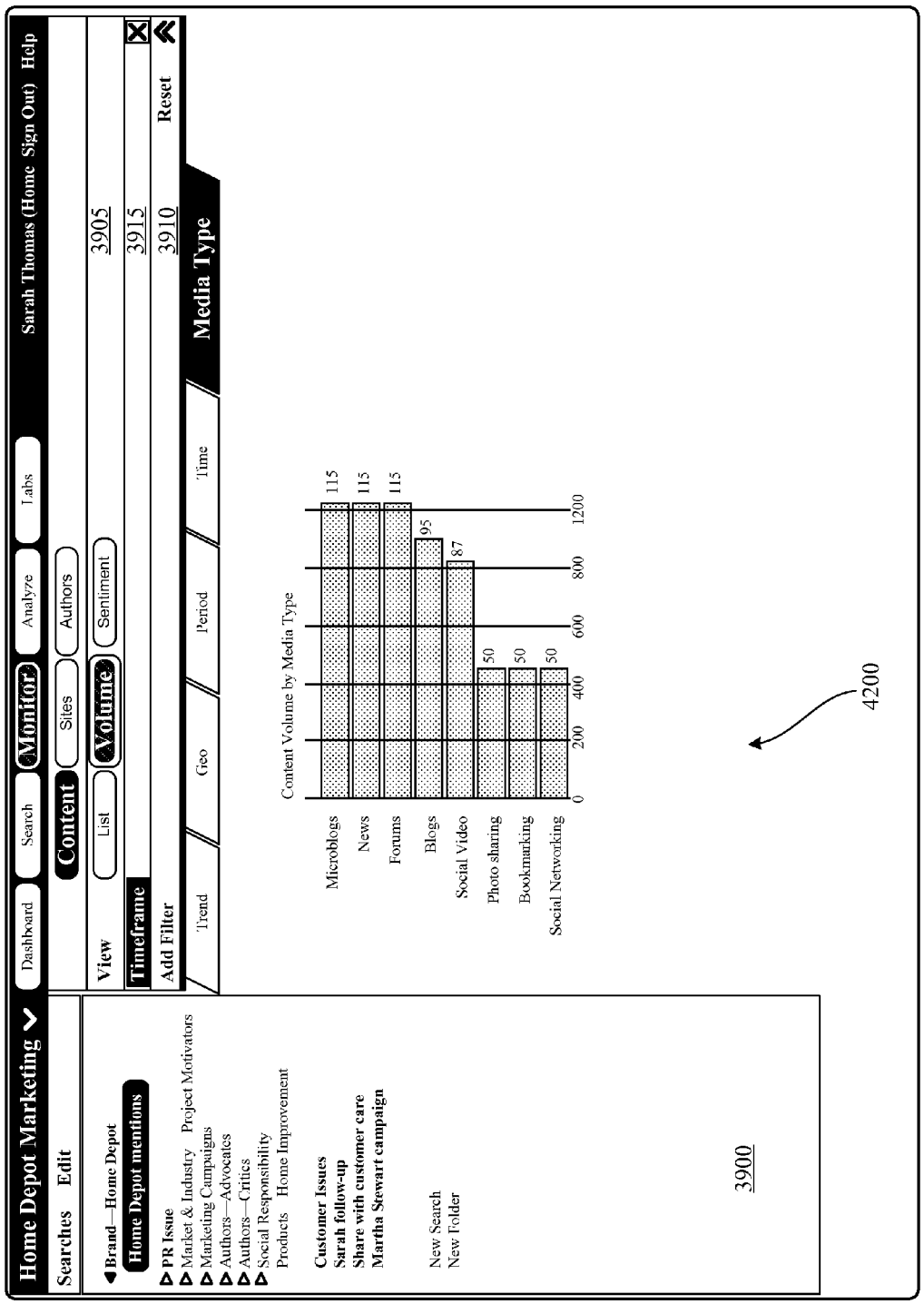
FIG. 42 shows an exemplary screenshot of a graphical user interface according to an embodiment.

FIG. 42 is an exemplary screenshot of the graphical user interface 3900 according to an embodiment. As illustrated in FIG. 42, selection from the view menu 3905 of the "volume" setting, the timeframe selector 3915 of the "7 days" setting, and the filter menu 3910 of the "media type" setting yields a bar graph 4200 illustrating a comparison of the number of times a user-selected search term phrase has been mentioned, as determined by a system according to an embodiment described herein, according to the type of pre-defined social or other media over a seven-day span.

Figure 43:
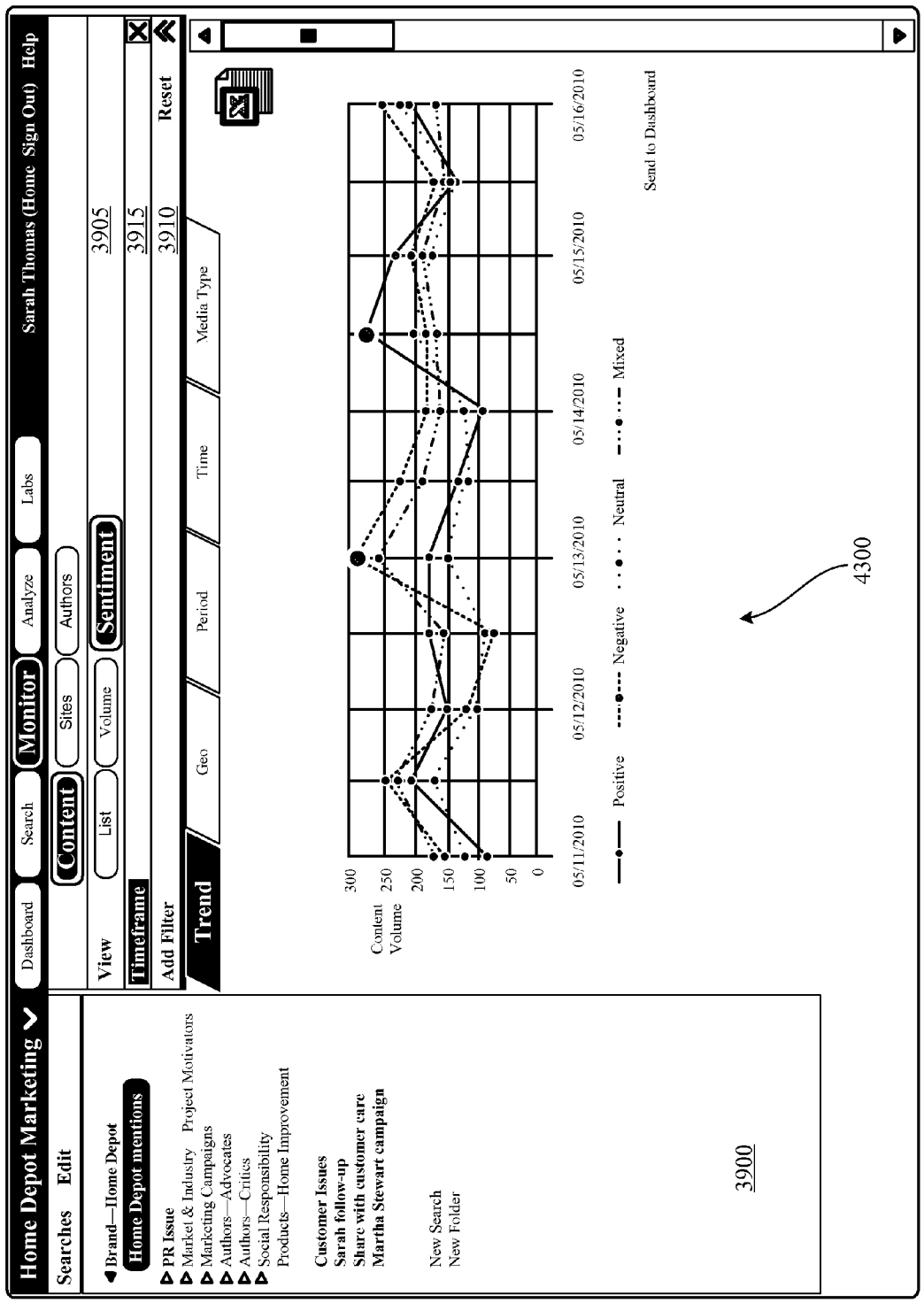
FIG. 43 shows an exemplary screenshot of a graphical user interface accord in to an embodiment.

FIG. 43 is an exemplary screenshot of the graphical user interface 3900 according to an embodiment. As illustrated in FIG. 43, selection from the view menu 3905 of the "sentiment" setting, the timeframe selector 3915 of the "7 days" setting, and the filter menu 3910 of the "trend" setting yields a graph 4300 illustrating a comparison, giver a user-selected seven-day span, of the number of times a user-selected search term/phrase has been mentioned, as determined by a system according to an embodiment described herein, according to the sentiment expressed in connection with the search term/phrase.

Figure 44:
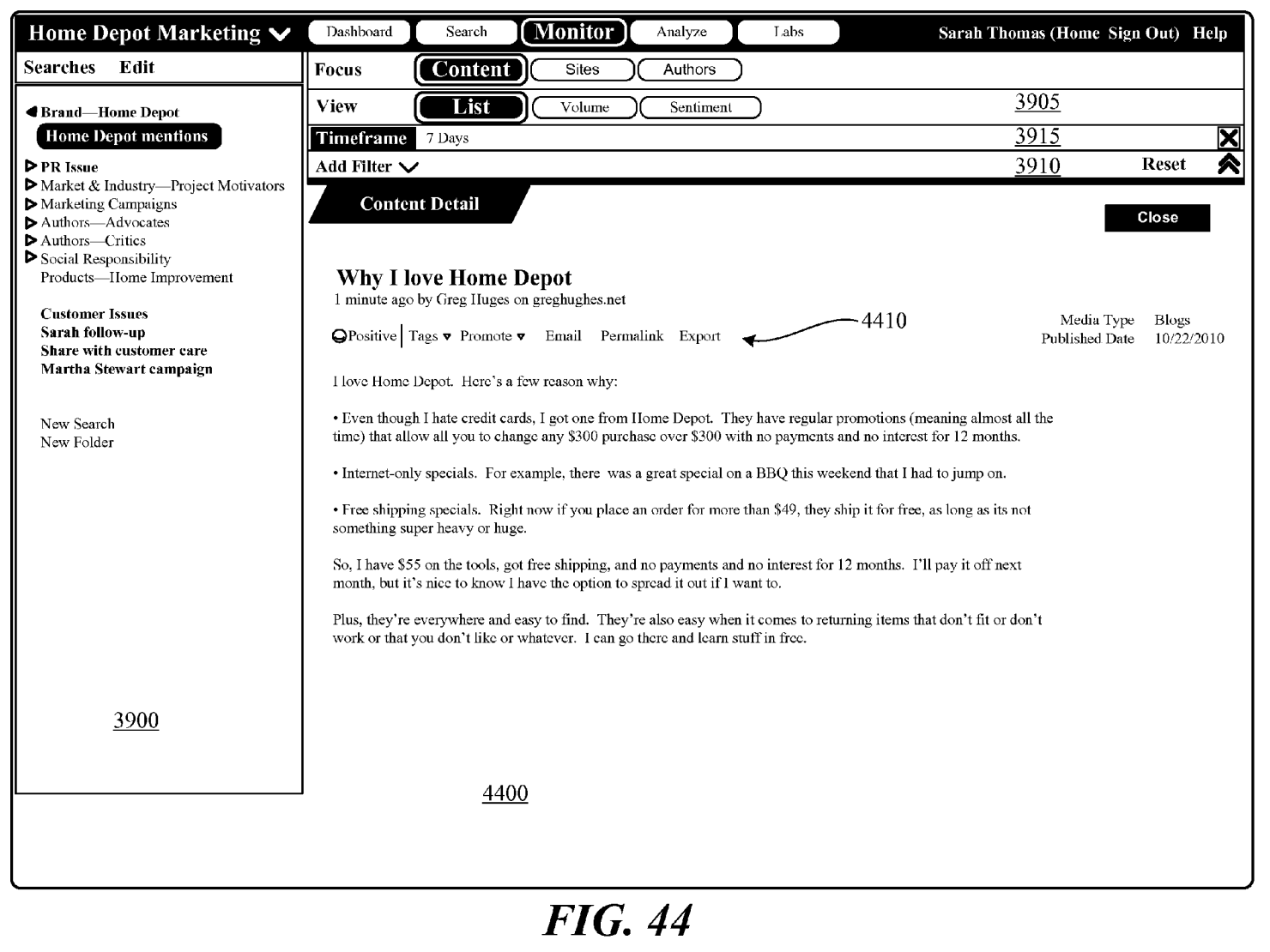

FIG. 44 is an exemplary screenshot of the graphical user inter 3900 according to an embodiment. As illustrated in FIG. 44, selection from the view menu 3905 of the "list" setting, the timeframe selector 3915 of the "7 days" setting, and the filter menu 3910 of the "content detail" setting yields a user-selected message 4400 of a plurality of messages, posted within a user-selected seven-day span, concerning a user-selected search term/phrase. In an embodiment, the message 4400, as as any other user-selected message of the plurality, is displayed to include an actions menu 4410.

Figure 45:
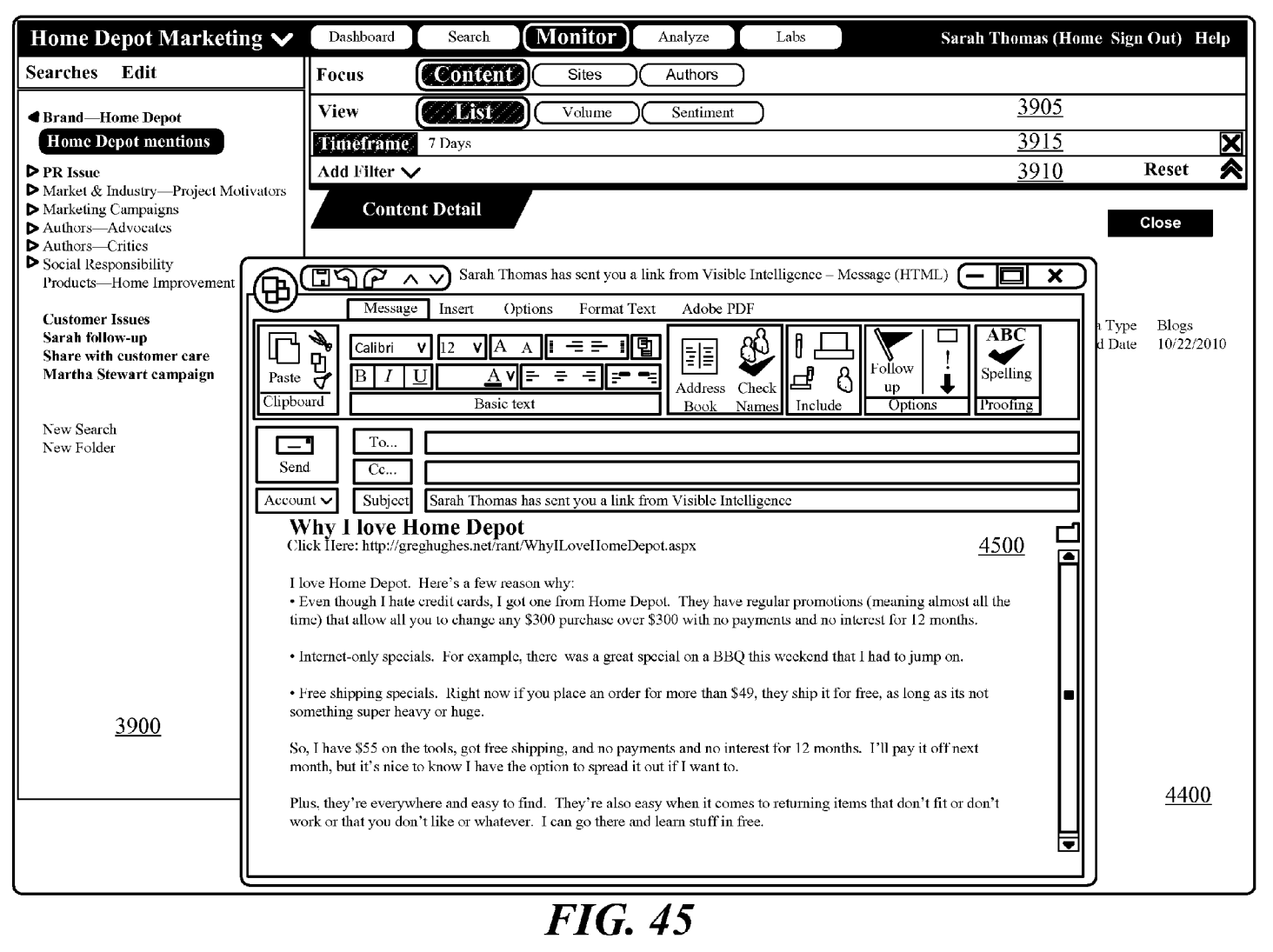

Referring to FIG. 45, selection of the "email" option from the actions menu 4410 causes an email application associated with the computing device by which the interface 3900 is generated to invoke an email message window 4500. Window 4500 enables the user to email the contents of message 4400 to the recipient of his/her choice.

Figure 47:
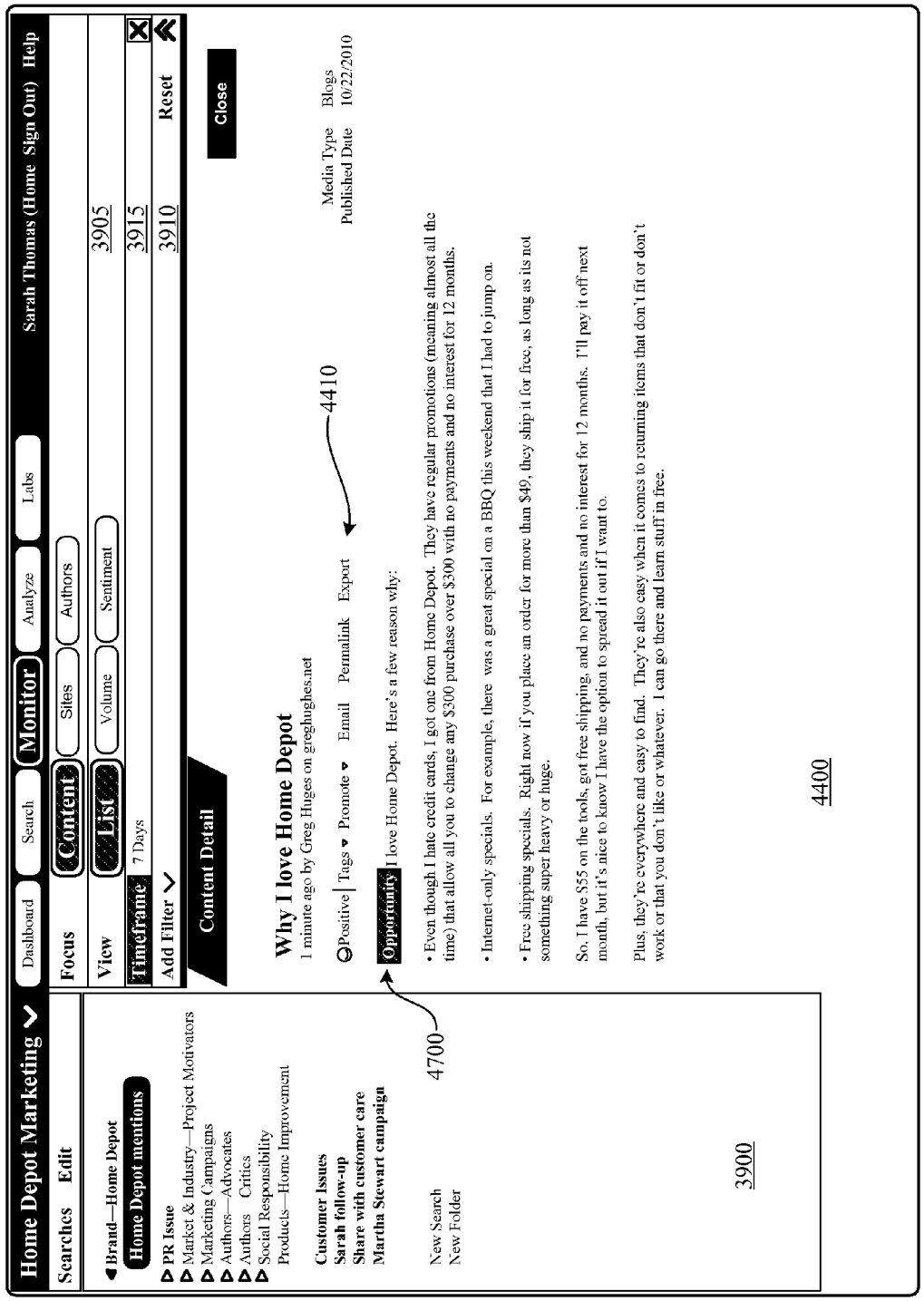
FIG. 47 illustrates a labeled message according to an embodiment.

Referring to FIG. 46, selection of the "tags" option from the actions menu 44111 invokes a tag menu 4600. Selection by the user of an option from the tag menu 4600 enables the user to label message 4400 in a manner designating the message as belonging to a particular pre-defined category or otherwise as requiring some type of follow-up action. For example, referring to FIG. 47, selection of the "opportunity" option from the tag menu 4600 causes a corresponding label 4700 to be displayed within message 4400.

Figure 48:
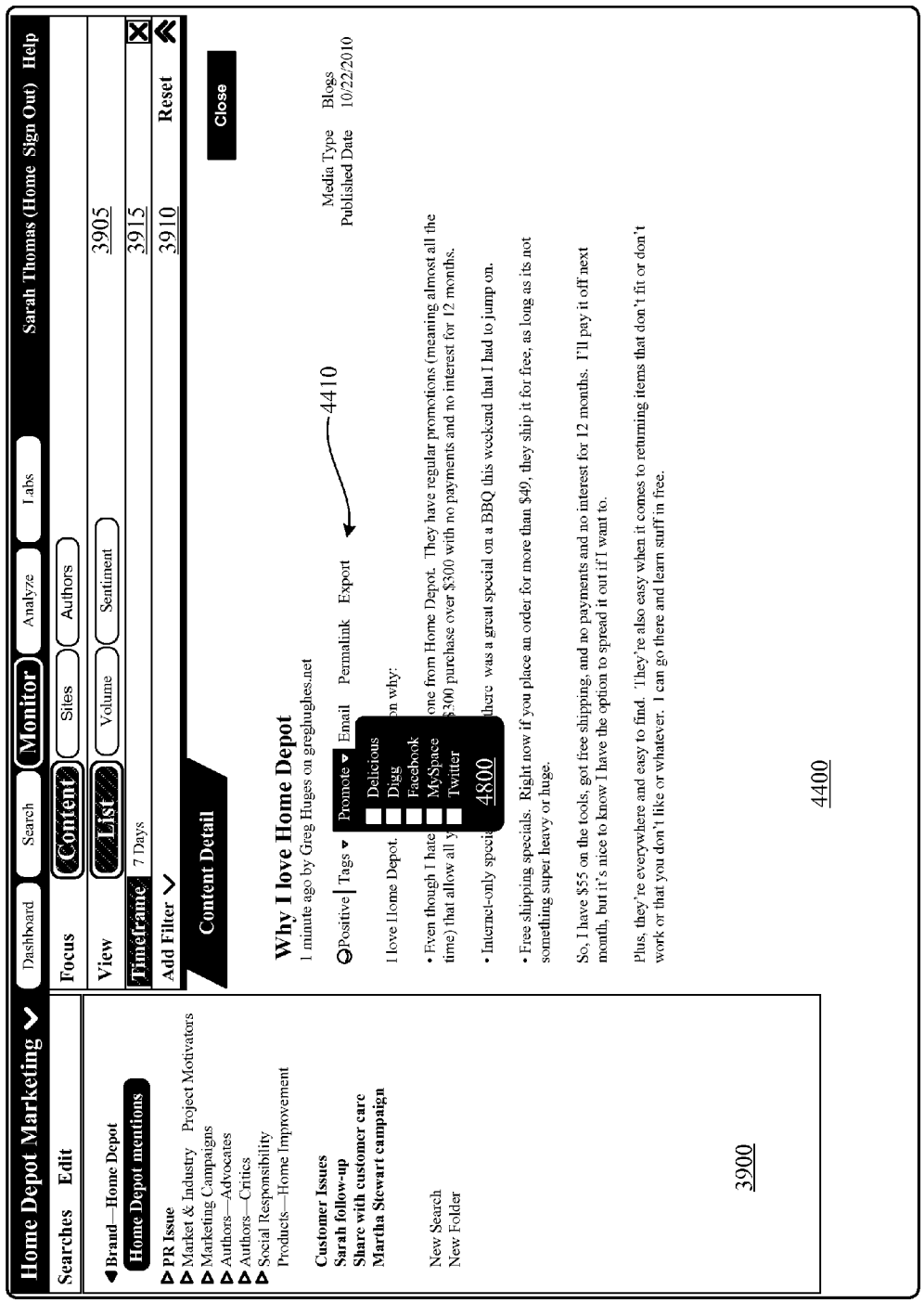
FIG. 48 shows an exemplary screenshot of a graphical user interface according to an embodiment.

Referring to FIG. 48, selection of the "promote" option from the actions menu 4410 invokes a promote menu 4800. Selection by the user of an option from the promote menu 4800 enables the user to post/tweet message 4400 in accordance with a social networking or other platform corresponding to the selected, promote-menu option.

Figure 49:
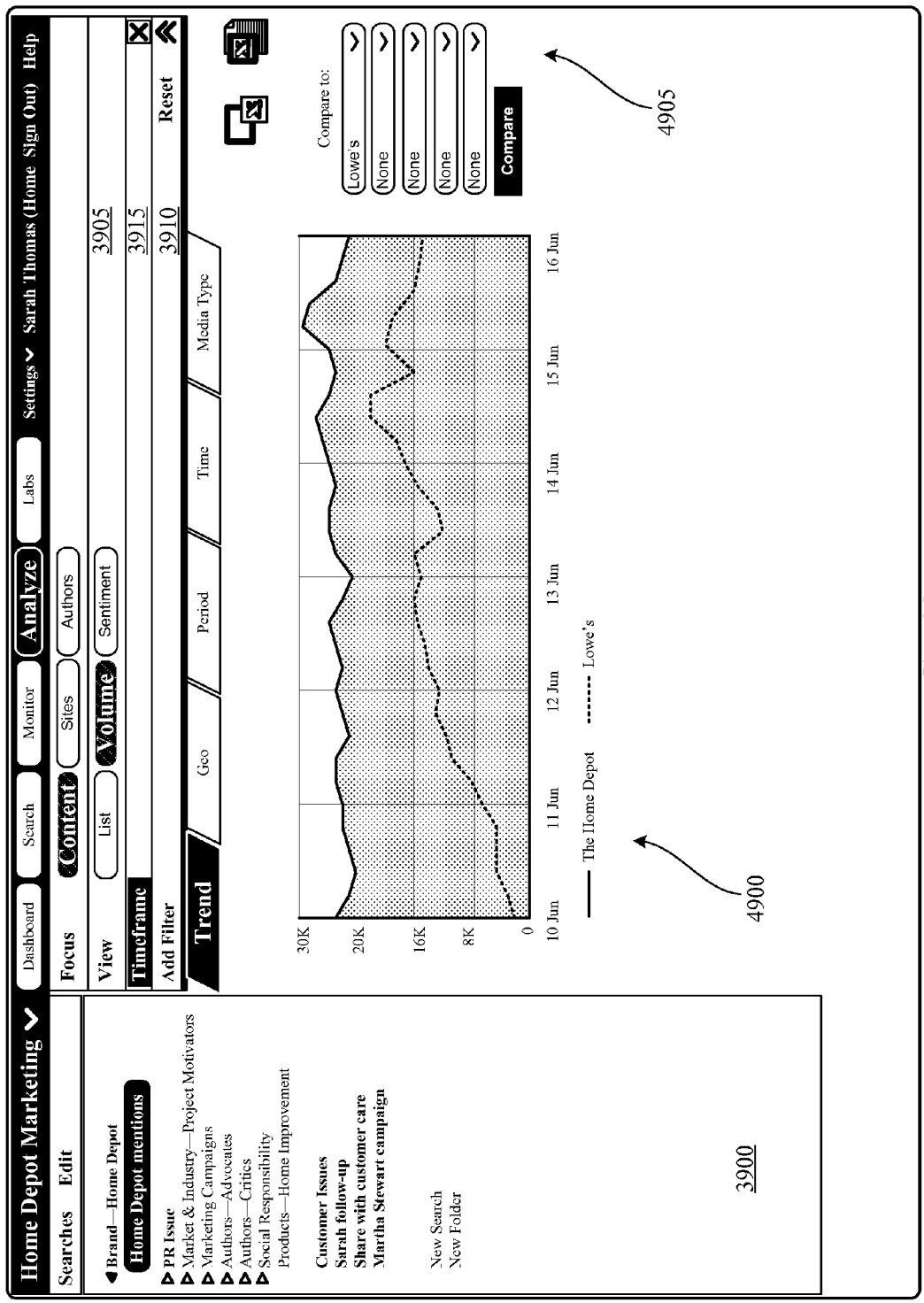
FIG. 49 shows an exemplary screenshot of a graphical riser interface according to an embodiment.

FIG. 49 is an exemplary screenshot of the graphical user interface 3900 according to an embodiment. In the example illustrated in FIG. 49, interface 3900 includes a comparison menu 4905 from which a user can select one or more search terms/phrases. Selection of an option from the comparison menu 4905 enables the simultaneous graphical illustration of content data pertaining to multiple search terms/phrases. As illustrated in FIG. 49, for example, selection from the view menu 3905 of the "volume" setting, the timeframe selector 3915 of the "7 days" setting, the filter menu 3910 of the "trend" setting, and the comparison menu 4905 of the "Lowe's" setting yields a graph 4900 illustrating a comparison over a seven-day span, of the number of times each user-selected search term/phrase has been mentioned, as determined by a system according to an embodiment described herein. This simultaneous illustration of data pertaining to multiple search terms/phrases may be configured by interface 3900 in a manner similar to that discussed above herein with regard to FIGS. 39-48 in connection with singular search terms/phrases.

Figure 50:
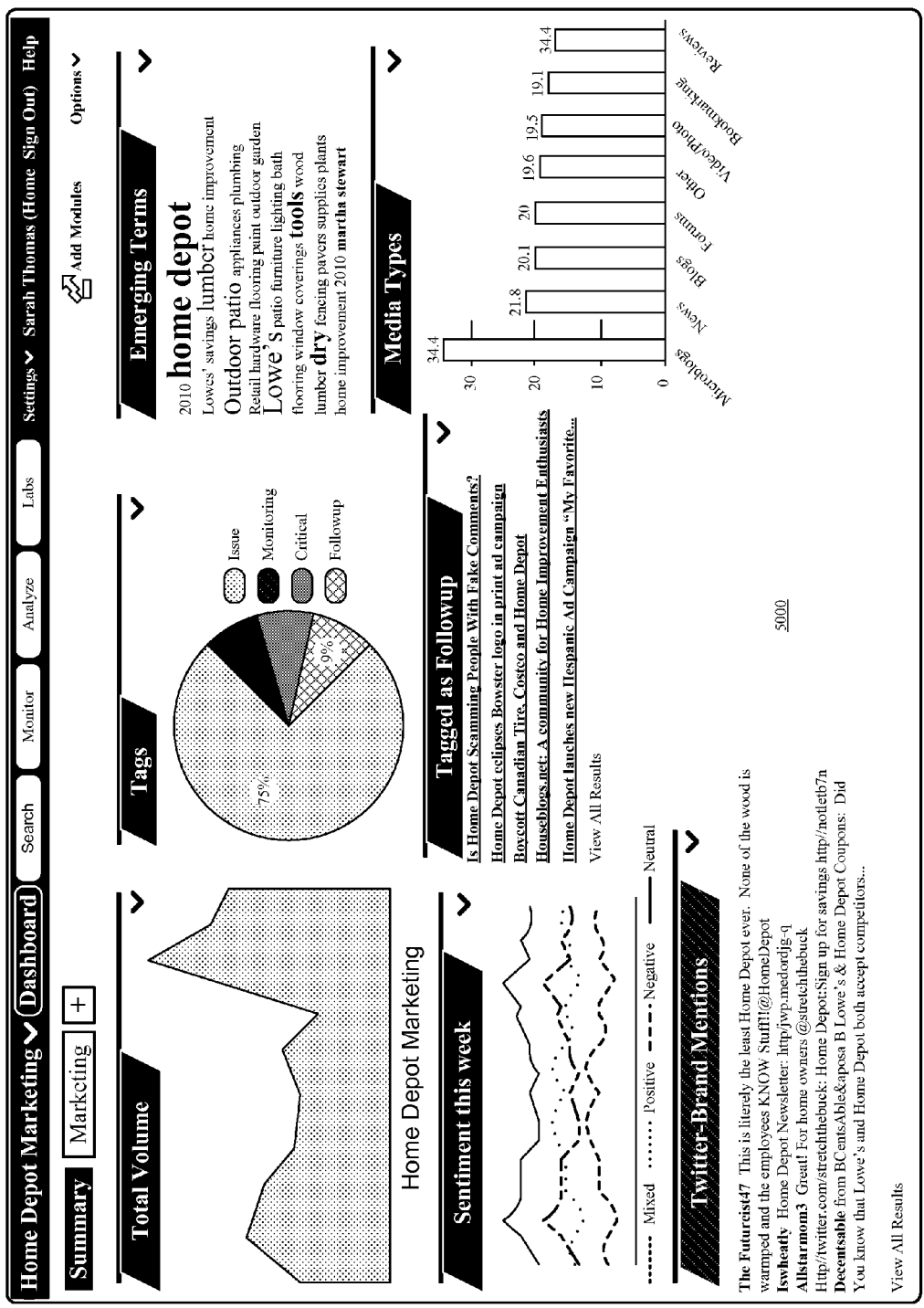
FIG. 50 shows an exemplary screenshot of a dashboard according to an embodiment of the invention.

FIG. 50 is an exemplary screenshot of a dashboard 5000 according to an embodiment of the invention. As illustrated in FIG. 50, dashboard 5000 may comprise a conglomeration of multiple ones of the graphical illustrations illustrated in and discussed with reference to FIGS. 39-49.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

A computing system configured to gather social media content, comprising:
 a memory;
 a content collection and ingestion system, stored in the memory and configured, executed on a computer processor, to communicate with one or more computing systems to direct a search of a content source using a received collection request and to ingest the results of the directed search into a data store; and
 a content management system, stored in the memory and configured, when executed on a computer processor, to display the ingested results on a display.

The embodiments of the invention in which an exclusive property or privilege is claimed are defined as follows:

1. At least one non-transitory computer-readable medium on which are stored instructions that, when executed by at least one processing device, enable the at least one processing device to perform a method, comprising the steps of:

receiving from a user a first keyphrase;
collecting consumer-generated media content including the first keyphrase using a plurality of robots to parse sites hosted on a network;
automatically categorizing the consumer-generated media content according to a plurality of characteristics of the consumer-generated media content;
automatically identifying a first set of posts of the content to the sites, each post of the first set being posted to the network within a first finite time period;
generating a graphical user interface configured to display a quantity of posts of the first set in a user-selectable format; and
automatically identifying a media type associated with each post of the first set, the identified media type being one of a plurality of predetermined media types,
wherein the format comprises a graph illustrating a quantity of the posts posted to the network during the first time period according to the identified media type of each of the posts, and
wherein the format comprises a map of at least one geographic region, each geographic region of the at least one geographic region being color coded according to a quantity of the posts posted to the network during the first time period.

2. The medium of claim 1, wherein the first time period comprises a plurality of sub-periods and the format comprises a graph illustrating a quantity of the posts posted to the network during each sub-period of the first time period.

3. The medium of claim 1, wherein the format comprises a graph illustrating a quantity of the posts posted to the network during the first time period and a user-selectable second finite time period, the second time period occurring prior to the first time period.

4. The medium of claim 1, wherein the method further comprises the steps of:
receiving from the user a second keyphrase; and
automatically identifying a second set of posts to the network, each post of the second set including the second keyphrase, each post of the second set being posted to the network within the first finite time period,
wherein the format comprises a graph illustrating quantities of the first-set and second-set posts posted to the network during the first time period.

5. The medium of claim 1, wherein the first time period is selectable by the user.

6. At least one non-transitory computer-readable medium on which are stored instructions that, when executed by at least one processing device, enable the at least one processing device to perform a method, comprising the steps of:
receiving from a user a first keyphrase;
collecting consumer-generated media content including the first keyphrase using a plurality of robots to parse sites hosted on a network;
automatically categorizing the consumer-generated media content according to a plurality of characteristics of the consumer-generated media content;
automatically identifying a first set of posts of the content to the sites, each post of the first set being posted to the network within a first finite time period;
automatically determining that each post of the first set includes one of a positive-type opinion, negative-type opinion and neutral-type opinion of the keyphrase;
in response to selection by the user from a menu, generating a graphical user interface in a user-selectable format configured to display in graphical form a quantity of posts of the first set according to the type of opinion included by each post of the quantity, wherein a robot, programmed to determine a site the source of the first set of posts and programmed to interact with the site as a user, posts an automatically selected response of a plurality of responses to the first set of posts, the posted response being selected based on the determined opinion and a plurality of characteristics of the first set of posts; and
automatically identifying a media type associated with each post of the first set, the identified media type being one of a plurality of predetermined media types,
wherein the format comprises a graph illustrating a quantity of the posts posted to the network during the first time period according to the identified media type of each of the posts, and
wherein the format comprises a map of at least one geographic region, each geographic region of the at least one geographic region being color coded according to a quantity of the posts posted to the network during the first time period.

7. The medium of claim 6, wherein the first time period is selectable by the user.

8. At least one non-transitory computer-readable medium on which are stored instructions that, when executed by at least one processing device, enable the at least one processing device to perform a method, comprising the steps of:
receiving from a user a first keyphrase;
automatically identifying a first set of posts to a network, each post of the first set including the first keyphrase, each post of the first set being posted to the network within a first finite time period;
generating a graphical user interface in a user-selectable format configured to display on a single page at least one post of the first set and a menu of user-selectable actions to be performed on the at least one post; and
automatically identifying a media type associated with each post of the first set, the identified media type being one of a plurality of predetermined media types,
wherein the format comprises a graph illustrating a quantity of the posts posted to the network during the first time period according to the identified media type of each of the posts, and
wherein the format comprises a map of at least one geographic region, each geographic region of the at least one geographic region being color coded according to a quantity of the posts posted to the network during the first time period.

9. The medium of claim 8, wherein the menu includes a selection that enables the user to e-mail the at least one post to a recipient chosen by the user.

10. The medium of claim 8, wherein the menu includes a selection that enables the user to select a category of the at least one post and display within the at least one post a label indicating the selected category.

11. The medium of claim 8, wherein the menu includes a selection that enables the user to select a social media outlet from a set of social media outlets and communicate the at least one post to the selected social media outlet.

12. The medium of claim 8, wherein the first time period is selectable by the user.

* * * * *